(12) United States Patent
Curtis et al.

(10) Patent No.: US 12,032,166 B2
(45) Date of Patent: Jul. 9, 2024

(54) WAVEGUIDE ILLUMINATOR

(71) Applicant: Magic Leap, Inc., Plantation, FL (US)

(72) Inventors: Kevin Richard Curtis, Boulder, CO (US); Bradley Jay Sissom, Boulder, CO (US); Hui-Chuan Cheng, Cooper City, FL (US); Miller Harry Schuck, III, Erie, CO (US); Samarth Bhargava, Saratoga, CA (US); Erik Heath Arend, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/571,366

(22) Filed: Jan. 7, 2022

(65) Prior Publication Data

US 2022/0206301 A1 Jun. 30, 2022

Related U.S. Application Data

(63) Continuation of application No. 16/215,477, filed on Dec. 10, 2018, now Pat. No. 11,256,093.
(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0076* (2013.01); *G02B 27/01* (2013.01);
(Continued)

(58) Field of Classification Search
CPC .................. G02B 27/0172; G02B 2027/0178
(Continued)

(56) References Cited

U.S. PATENT DOCUMENTS 6,023,373 A * 2/2000 Inoguchi ............ G02B 27/0172
349/11
6,134,051 A * 10/2000 Hayakawa ........... G02B 17/086
359/640
(Continued)

FOREIGN PATENT DOCUMENTS

CN 104155760 A 11/2014
CN 105487153 B 3/2018
(Continued)

OTHER PUBLICATIONS

International Search Report and Written Opinion, re PCT Application No. PCT/US18/064767, mailed Feb. 14, 2019.
(Continued)

*Primary Examiner* — Zachary W Wilkes
(74) *Attorney, Agent, or Firm* — KILPATRICK TOWNSEND & STOCKTON LLP

(57) ABSTRACT

An optical system for an augmented reality head mounted display eyepiece that is configured to deliver images to the eye wherein the optical system includes optics. The optics are disposed so as to receive light output from the light source. The optics further arranged with respect to a spatial light modulator such that the light received from the light source passes through the optics and illuminates the spatial light modulator. The light illuminating the spatial light modulator is redirected back through the optics and is coupled into at least one waveguide through at least one in-coupling optical element. At least a portion of the coupled light is ejected from at least one waveguide by at least one out-coupling optical element and directed to the eye of the user.

20 Claims, 45 Drawing Sheets

Related U.S. Application Data

(60) Provisional application No. 62/597,359, filed on Dec. 11, 2017, provisional application No. 62/624,109, filed on Jan. 30, 2018.

(52) U.S. Cl.
CPC ........ *G02B 27/0176* (2013.01); *G02B 6/0033* (2013.01); *G02B 2027/0112* (2013.01); *G02B 2027/015* (2013.01); *G02B 2027/0178* (2013.01)

(58) Field of Classification Search
USPC .......................................................... 359/630
See application file for complete search history.

(56) References Cited

U.S. PATENT DOCUMENTS

| | | |
|---|---|---|
| 6,222,677 B1 | 4/2001 | Budd et al. |
| 6,633,350 B2 | 10/2003 | Sasakura et al. |
| 6,850,221 B1 | 2/2005 | Tickle |
| 6,922,267 B2 | 6/2005 | Endo et al. |
| 7,206,107 B2* | 4/2007 | Levola ............... G02B 27/4272 359/566 |
| 7,418,170 B2 | 8/2008 | Mukawa et al. |
| 7,710,655 B2 | 5/2010 | Freeman et al. |
| 8,310,764 B2 | 11/2012 | Tanijiri |
| 9,664,905 B2 | 5/2017 | Bohn et al. |
| 9,779,512 B2 | 10/2017 | Tomlin et al. |
| 10,156,896 B2 | 12/2018 | Lee et al. |
| 10,302,946 B2* | 5/2019 | Aiki ........................ G02B 17/00 |
| 11,256,093 B2 | 2/2022 | Curtis et al. |
| 2002/0005921 A1 | 1/2002 | Sasakura et al. |
| 2002/0042020 A1 | 4/2002 | Gallagher et al. |
| 2002/0167733 A1 | 11/2002 | Roest |
| 2002/0191297 A1* | 12/2002 | Gleckman ........... G02B 27/0172 359/629 |
| 2005/0105868 A1 | 5/2005 | Arakida |
| 2006/0028436 A1 | 2/2006 | Armstrong |
| 2007/0081123 A1 | 4/2007 | Lewis |
| 2007/0159673 A1* | 7/2007 | Freeman ............... G02B 6/0028 359/19 |
| 2007/0177275 A1 | 8/2007 | McGuire, Jr. |
| 2011/0018903 A1 | 1/2011 | Lapstun et al. |
| 2011/0019258 A1 | 1/2011 | Levola |
| 2011/0181960 A1 | 7/2011 | Tanijiri |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0222384 A1 | 8/2013 | Futterer |
| 2013/0242262 A1 | 9/2013 | Lewis |
| 2013/0250207 A1 | 9/2013 | Bohn |
| 2014/0071539 A1 | 3/2014 | Gao |
| 2014/0177023 A1 | 6/2014 | Gao et al. |
| 2014/0218468 A1 | 8/2014 | Gao et al. |
| 2014/0240351 A1 | 8/2014 | Scavezze et al. |
| 2014/0267420 A1 | 9/2014 | Schowengerdt |
| 2014/0293434 A1 | 10/2014 | Cheng et al. |
| 2014/0300966 A1 | 10/2014 | Travers et al. |
| 2014/0306866 A1 | 10/2014 | Miller et al. |
| 2014/0320755 A1 | 10/2014 | Martinez et al. |
| 2014/0347736 A1 | 11/2014 | Liu et al. |
| 2015/0002528 A1 | 1/2015 | Bohn et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0293358 A1 | 10/2015 | de Matos Pereira Vieira et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0077338 A1* | 3/2016 | Robbins ............ G02B 27/4205 359/489.08 |
| 2016/0116739 A1 | 4/2016 | TeKolste et al. |
| 2016/0147068 A1* | 5/2016 | Wei .................... G02B 27/0172 359/633 |
| 2016/0154243 A1* | 6/2016 | Aiki ................... G02B 27/0176 359/633 |
| 2016/0161650 A1 | 6/2016 | Taraschi et al. |
| 2016/0067087 A1 | 10/2016 | Tedford et al. |
| 2017/0010466 A1 | 1/2017 | Klug et al. |
| 2017/0205618 A1 | 7/2017 | Basset et al. |
| 2017/0242264 A1 | 8/2017 | Sissom |
| 2017/0248750 A1 | 8/2017 | Curtis et al. |
| 2017/0255020 A1 | 9/2017 | Tarn et al. |
| 2017/0293145 A1 | 10/2017 | Miller et al. |
| 2017/0299869 A1 | 10/2017 | Urey et al. |
| 2017/0322418 A1 | 11/2017 | Lin et al. |
| 2018/0045965 A1 | 2/2018 | Schowengerdt |
| 2018/0052276 A1 | 2/2018 | Klienman et al. |
| 2019/0179149 A1 | 6/2019 | Curtis et al. |
| 2019/0278086 A1 | 9/2019 | Ofir |
| 2020/0142356 A1 | 5/2020 | Gilles et al. |
| 2020/0166759 A1 | 5/2020 | Yeoh et al. |
| 2020/0284967 A1 | 9/2020 | Schowengerdt et al. |
| 2020/0319461 A1 | 10/2020 | Schultz |
| 2020/0358036 A1 | 11/2020 | Yokoyama et al. |
| 2020/0409156 A1 | 12/2020 | Sissom et al. |
| 2021/0364808 A1 | 11/2021 | Koshelev et al. |
| 2022/0086419 A1 | 3/2022 | Qaderi |

FOREIGN PATENT DOCUMENTS

| | | |
|---|---|---|
| DE | 102016225016 A1 | 12/2017 |
| JP | 11337863 A | 12/1999 |
| JP | 2001-264682 | 9/2001 |
| JP | 2001264682 A * | 9/2001 |
| JP | 2003337298 A | 11/2003 |
| JP | 2005148468 A | 6/2005 |
| JP | 2009516862 A | 4/2009 |
| JP | 2013178549 A | 9/2013 |
| JP | 2015194654 A | 11/2015 |
| JP | 2016519327 A | 6/2016 |
| JP | 2016532161 A | 10/2016 |
| JP | 2017531840 A | 10/2017 |
| WO | 2005074299 | 8/2005 |
| WO | 2005088384 A1 | 9/2005 |
| WO | 2014159045 A1 | 10/2014 |
| WO | 2015001839 A1 | 1/2015 |
| WO | 2016054092 A1 | 4/2016 |
| WO | 2016179246 A1 | 11/2016 |
| WO | 2017147520 A1 | 8/2017 |
| WO | 2017147534 A1 | 8/2017 |
| WO | WO 2019/118357 | 6/2019 |
| WO | WO 2019/178060 | 9/2019 |
| WO | WO 2020/139752 | 7/2020 |
| WO | 2021072111 A1 | 4/2021 |
| WO | 2021242898 A1 | 12/2021 |

OTHER PUBLICATIONS

International Preliminary Report for Patentability, re PCT Application No. PCT/US18/064767, issued Jun. 16, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

(56) References Cited

OTHER PUBLICATIONS

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Application No. IN202047027052, "First Examination Report", Mar. 31, 2022, 6 pages.

Application No. JP2020-529490, "Office Action" and English translation, Oct. 17, 2022, 9 pages.

European Application No. 18889627.8, "Office Action", Jul. 27, 2023, 5 pages.

Israeli Application No. 274907, "Office Action", May 30, 2023, 9 pages.

JP2023-17328, "Office Action" and English translation, Jan. 24, 2024, 18 pages.

KR10-2020-7018765, "Office Action", Nov. 23, 2023, 9 pages, no translation available.

NZ764552, "First Examination Report", Jan. 3, 2024, 4 pages.

AU2018383595, "First Examination Report", Sep. 15, 2023, 3 pages.

PCT/US2023/026455, "International Search Report and Written Opinion", Oct. 3, 2023, 9 pages.

AU2018383595, "Second Examination Report", Apr. 5, 2024, 3 pages.

IL274907, "Office Action", Mar. 31, 2024, 5 pages.

NZ764552, "Second Examination Report", Apr. 29, 2024, 1 page.

* cited by examiner

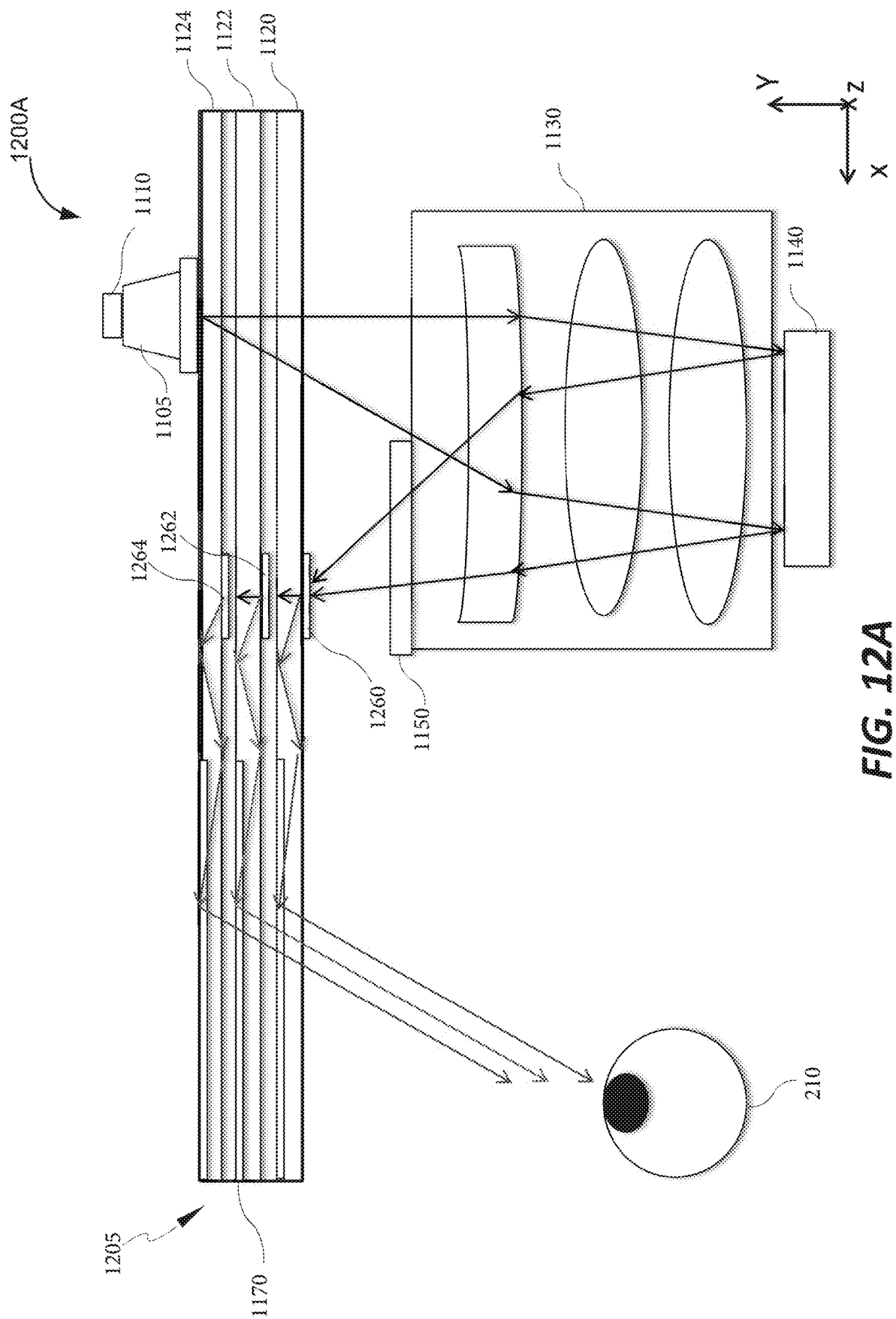

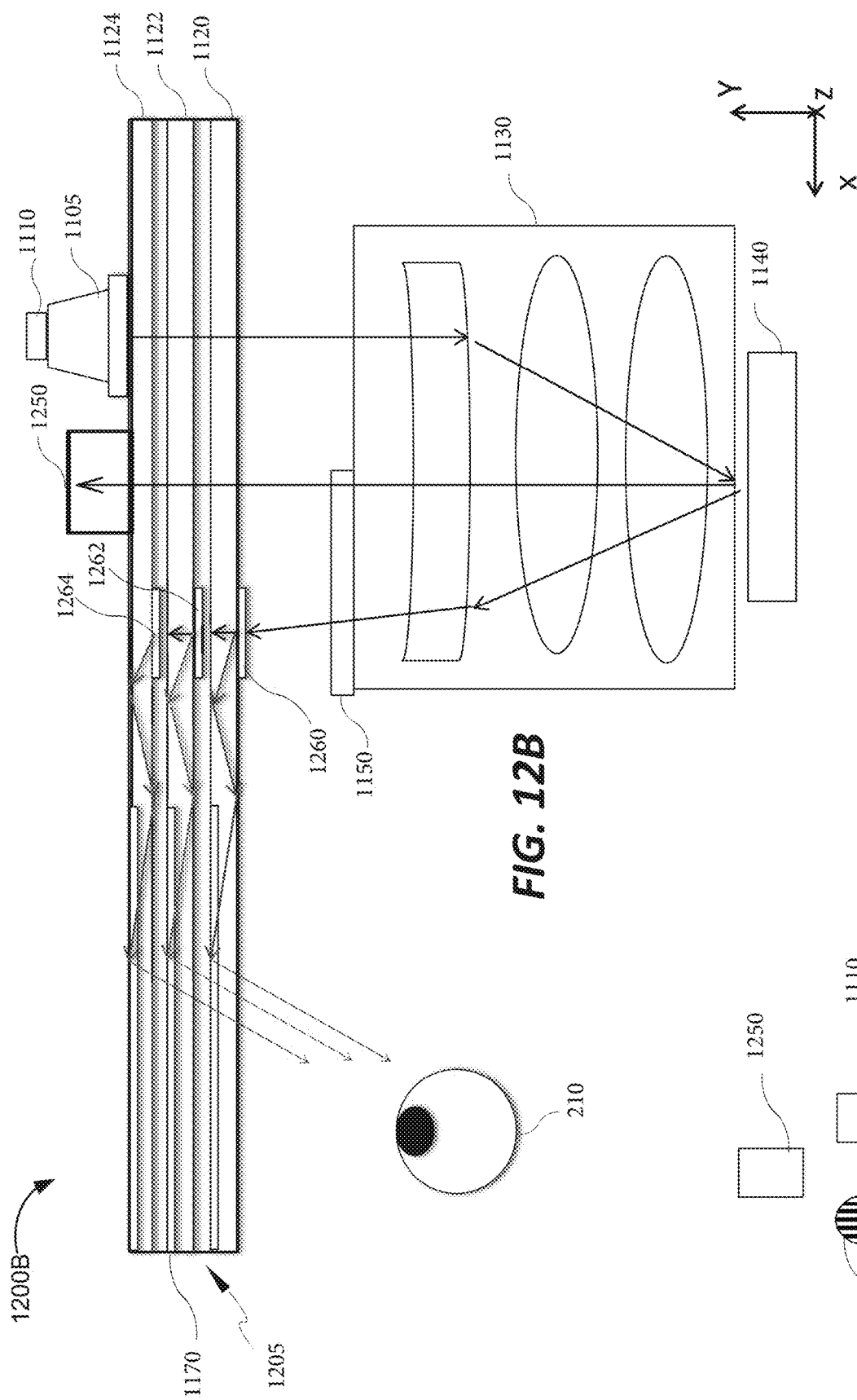

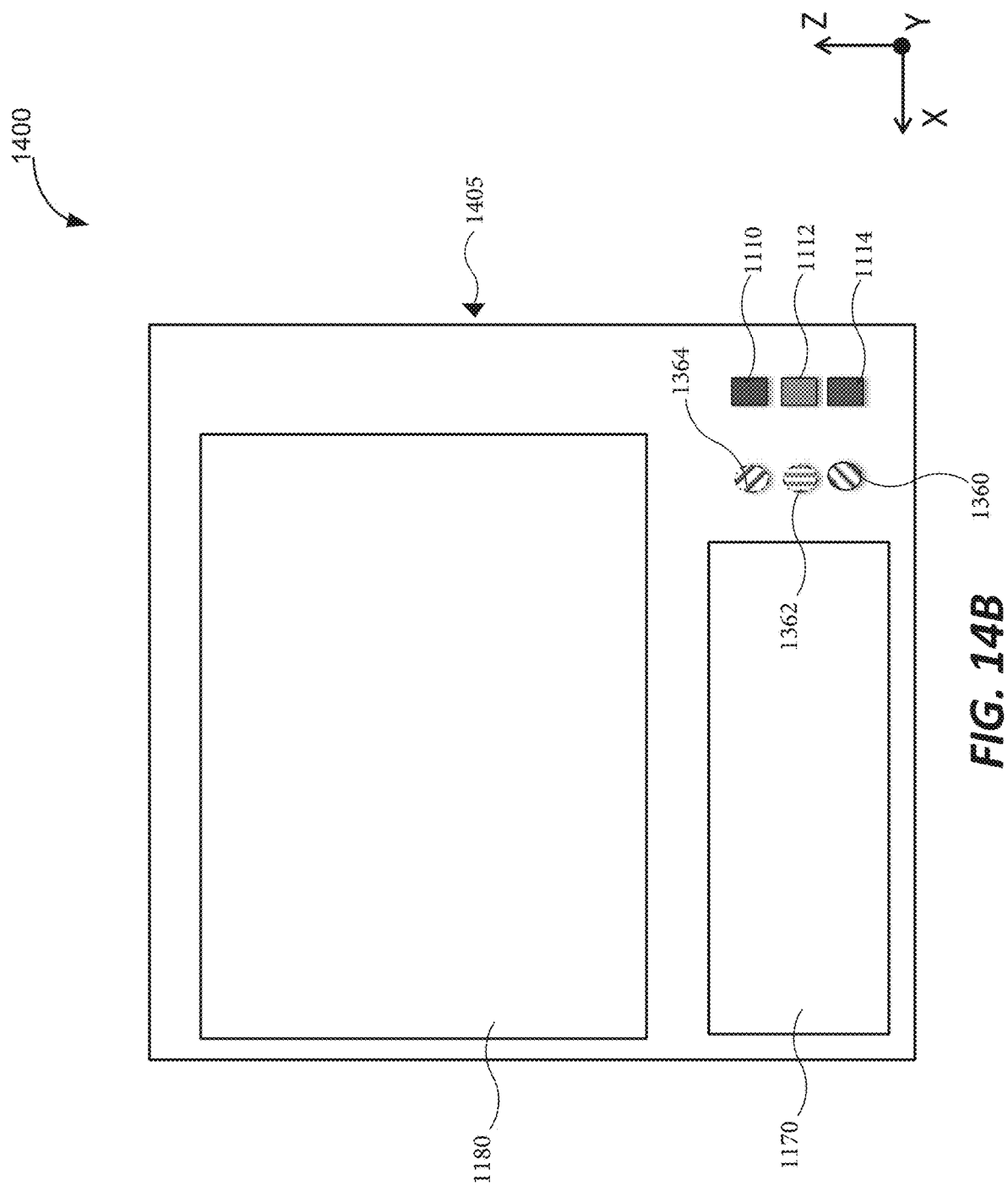

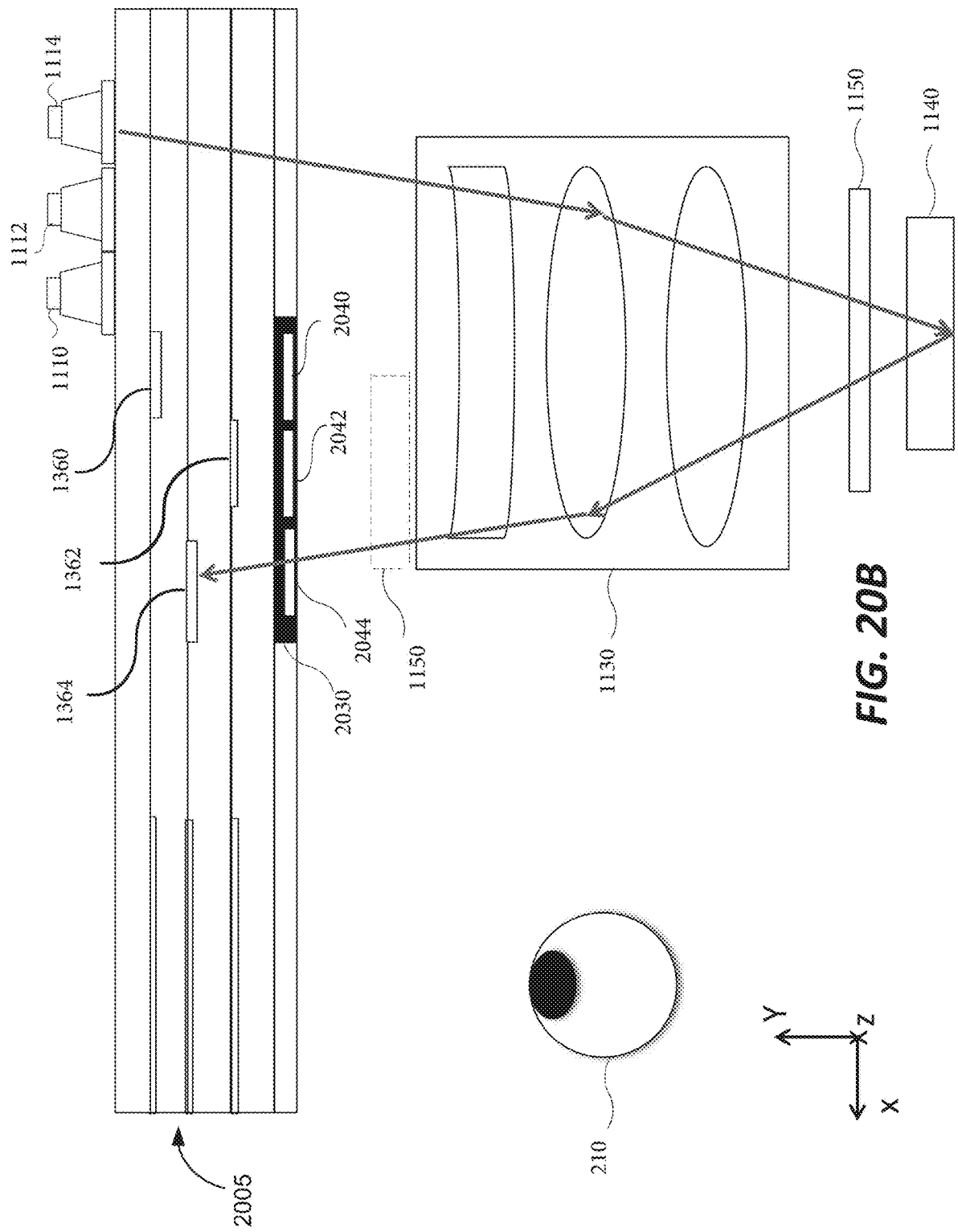

WAVEGUIDE ILLUMINATOR

CROSS-REFERENCE TO RELATED APPLICATIONS

This application is a continuation application of U.S. patent application Ser. No. 16/215,477 filed Dec. 10, 2018, now U.S. Pat. No. 11,256,093, issued Feb. 22, 2022, entitled "WAVEGUIDE ILLUMINATOR", which claims the benefit of priority under 35 U.S.C. § 119(e) to U.S. Provisional Patent Application No. 62/597,359 filed Dec. 11, 2017, entitled "WAVEGUIDE ILLUMINATOR" and U.S. Provisional Patent Application No. 62/624,109 filed Jan. 30, 2018, entitled "WAVEGUIDE ILLUMINATOR", the disclosures of each of which are hereby incorporated by reference herein in their entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263, and U.S. Provisional Application No. 62/597,359 filed on Dec. 11, 2017.

FIELD

The present disclosure relates to display systems having a common optics for both spatial light modulator illumination and image projection.

DESCRIPTION OF THE RELATED ART

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

Polarizing beam splitters may be used in display systems to direct polarized light to light modulators and then to direct this light to a viewer. There is a continuing demand to reduce the sizes of display systems generally and, as a result, there is also a demand to reduce the sizes of the constituent parts of the display systems, including constituent parts utilizing polarizing beam splitters.

SUMMARY

The systems, methods and devices of the disclosure each have several innovative aspects, no single one of which is solely responsible for the desirable attributes disclosed herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

Various examples of head mounted display systems having a common optics for both spatial light modulator illumination and image projection are described herein.

Examples

1. A head mounted display system configured to project light to an eye of a user to display augmented reality image content in a vision field of the user, the head-mounted display system comprising:
   a frame configured to be supported on a head of the user;
   at least one light source configured to output light;
   a spatial light modulator disposed to received light from the at least one light source;
   an eyepiece disposed on the frame, the eyepiece configured to direct light from the spatial light modulator into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising:
   (a) at least one waveguide;
   (b) at least one in-coupling optical element configured to in-couple light from the spatial light modulator into the at least one waveguide; and
   (c) at least one out-coupling optical element configured to couple light guided within the waveguide out of the waveguide and direct the light to the eye of the user; and
   optics having optical power, the optics disposed so as to receive light output from the light source, the optics arranged with respect to the spatial light modulator such that the light received from the light source passes through the optics and illuminates the spatial light modulator, wherein the head-mounted display system is configured such that light illuminating the spatial light modulator is redirected back through the optics and is coupled into the at least one waveguide through the at least one in-coupling optical element and at least a portion of the coupled light is ejected from the at least one waveguide by the at least one out-coupling optical element and directed to the eye of the user.

2. The head mounted display system of Example 1, wherein the at least one light source comprises a multi-color light source configured to emit different color light at different times.

3. The head mounted display system of any of the Examples above, wherein the at least one light source comprises a red, green, blue (RGB) light source configured to emit red color, green color, and blue color light at different times.

4. The head mounted display system of any of the Examples above, wherein the at least one light source comprises a cyan, magenta, yellow (CMY) light source configured to emit cyan color, magenta color, and yellow color light at different times.

5. The head mounted display system of any of the Examples above, comprising:
a plurality of laterally displaced light emitters configured to output light;
collection optics configured to collect the light from the plurality of light emitters;
a diffuser; and
a plurality of apertures proximal the diffuser.

6. The head mounted display system of any of the Examples above, further comprising a coupling optic disposed with respect to the light emitters to collect light output from the light source.

7. The head mounted display system of Example 6, wherein the coupling optic comprises a compound parabolic collector (CPC).

8. The head mounted display system of any of the Examples above, wherein the spatial light modulator comprises a reflective spatial light modulator.

9. The head mounted display system of any of the Examples above, wherein the spatial light modulator comprises a liquid crystal spatial light modulator.

10. The head mounted display system of any of the Examples above, wherein the spatial light modulator comprises a vertically aligned liquid crystal spatial light modulator.

11. The head mounted display system of any of the Examples above, wherein the spatial light modulator comprises a deflection-based spatial light modulator.

12. The head mounted display system of any of the Examples above, wherein the spatial light modulator comprises an array of movable mirrors.

13. The head mounted display system of any of the Examples above, further comprising a light dump, such that in the off state, light is directed by the array of movable mirrors to the light dump, and in the on-state light is directed to corresponding in-coupling optical elements.

14. The head mounted display system of any of the Examples above, wherein the at least one waveguide comprises material that is transparent to visible light having a refractive index sufficient to guide light in the waveguide by total internal reflection.

15. The head mounted display system of any of the Examples above, wherein the at least one waveguide comprises a stack of waveguides.

16. The head mounted display system of Example 15, wherein different waveguides of the stack of waveguides are configured to output light with different respective colors.

17. The head mounted display system of Example 15 or 16, wherein first, second, and third waveguides of the stack of waveguides are configured to output first, second, and third color light, respectively, the first, second, and third color light being red, blue, and green color light, respectively.

18. The head mounted display system of any of Examples 15 to 16, wherein different waveguides of the stack of waveguides are configured to output light with different wavefronts having different amounts of at least one of divergence, convergence, and collimation as if projected from different distances from the user's eye.

19. The head mounted display system of any of the Examples above, wherein the at least one waveguide is configured to in-couple light of a certain polarization.

20. The head mounted display system of any of the Examples above, wherein the in-coupling optical element comprises at least one of a diffractive optical element and a reflector.

21. The head mounted display system of any of the above Examples, wherein the at least one in-coupling optical element comprises a plurality of color selective in-coupling optical elements configured to in-couple different respective colors.

22. The head mounted display system of Example 21, wherein the plurality of in-coupling optical elements comprises a first in-coupling optical element and a second in-coupling optical element, the second in-coupling optical element disposed over the first in-coupling optical element such that light of a first color can be coupled by the first in-coupling optical element into a first waveguide to be guided therein and light of a second color different from the first color can pass through the first in-coupling optical element to the second in-coupling optical element and can be coupled by the second in-coupling optical element into a second waveguide to be guided therein.

23. The head mounted display system of Example 22, wherein the plurality of in-coupling optical elements comprises a third in-coupling optical element disposed over the first in-coupling optical element and second in-coupling optical element such that light of a third color different from the first color and the second color can pass through the first in-coupling optical element and the second in-coupling optical element to the third in-coupling optical element and can be coupled into a third waveguide to be guided therein.

24. The head mounted display system of Example 23, wherein the first color comprises one of red, green, and blue, wherein the second color comprises one of red, green, and blue different than said first color, and wherein the third color comprises one of red, green, or blue different from said first and second colors.

25. The head mounted display system of any of the above Examples, wherein the at least one in-coupling optical element comprises an in-coupling optical element configured to couple light of multiple colors into a waveguide of the at least one waveguide to guide the light therein.

26. The head mounted display system of any of the above Examples, wherein the at least one light source comprises a light source disposed with respect to the optics and the spatial light modulator to direct light to the in-coupling optical element configured to couple light of multiple colors into a waveguide of the at least one waveguide, the light source configured to emit different color light at different times.

27. The head mounted display system of any of the above Examples, wherein the at least one in-coupling optical element comprises an in-coupling optical element configured to couple red light, green light, and blue light into a waveguide of the at least one waveguide to guide the light therein.

28. The head mounted display system of any of the Examples above, wherein the at least one in-coupling optical element is configured to in-couple light of a predetermined polarization.

29. The head mounted display system of any of the above Examples, wherein the at least one in-coupling optical element comprises a plurality of in-coupling optical elements laterally displaced with respect to each other.

30. The head mounted display system of Example 29, wherein the plurality of in-coupling optical elements comprises a first in-coupling optical element configured to couple light of multiple colors into a first waveguide of the at least one waveguide to guide the light therein and a second in-coupling optical element configured to couple light of multiple colors into a second waveguide of the at least one waveguide to guide the light therein, the first in-coupling optical element and the second in-coupling optical element laterally displaced with respect to each other.

31. The head mounted display system of Examples 29 or 30, wherein the at least one light source comprises a first light source disposed with respect to the optics and the spatial light modulator to direct light to the first in-coupling optical element and a second light source disposed with respect to the optics and the spatial light modulator to direct light to the second in-coupling optical element.

32. The head mounted display system of Example 30, wherein the at least one light source comprises a first light source disposed with respect to the optics and the spatial light modulator to direct light into the first in-coupling optical element, the first light source configured to emit different color light at different times.

33. The head mounted display system of Example 32, wherein the at least one light source comprises a second light source disposed with respect to the optics and the spatial light modulator to direct light into the second in-coupling optical element, the second light source configured to emit different color light at different times.

34. The head mounted display system of Example 33, wherein the eyepiece is configured such that light out-coupled from the first waveguide and light out-coupled from said second waveguide have different amounts of at least one of convergence, divergence, and collimation and thus appear to originate from different depths.

35. The head mounted display system of Examples 31-34, wherein the eyepiece is configured such that light out-coupled from the first waveguide is collimated and light output from the second waveguide diverges.

36. The head mounted display system of Examples 31-34, wherein the eyepiece is configured such that light out-coupled from the first waveguide diverges a first amount and light out-coupled from the second waveguide diverge a second amount, where the second amount is different from the first amount.

37. The head mounted display system of any of the above Examples, wherein the at least one in-coupling optical element comprises an in-coupling optical element configured to couple red light, green light, and blue light into a waveguide to guide the light therein.

38. The head mounted display system of any of the above Examples, wherein the at least one light source comprises a light source disposed with respect to the optics and the spatial light modulator to direct light into the at least one in-coupling optical element configured to couple red light, green light, and blue light into a waveguide of the at least one waveguide, the at least one light source configured to emit different red, green, and blue color light at different times.

39. The head mounted display system of Examples 31, wherein the first light source is a first color light source and the second light source is a second color light source having a color different from the first color.

40. The head mounted display system of Examples 39, wherein the first light source is a red light source and the second color light source is one of a green light source and blue color light source.

41. The head mounted display system of any of the above Examples, wherein the at least one in-coupling optical element comprises a plurality of groups of in-coupling optical elements, each group comprising a plurality of color selective in-coupling optical elements configured to in-couple different respective colors, each group of the plurality of groups laterally displaced with respect to each other.

42. The head mounted display system of Example 41, wherein the plurality of in-coupling optical elements comprises a first in-coupling optical element and a second in-coupling optical element, the second in-coupling optical element disposed over the first in-coupling optical element such that light of a first color can be coupled by the first in-coupling optical element into a first waveguide to be guided therein and light of a second color different from the first color can pass through the first in-coupling optical element to the second in-coupling optical element and can be coupled by the second in-coupling optical element into a second waveguide to be guided therein.

43. The system of Example 42, wherein the plurality of in-coupling optical elements comprises a third in-coupling optical element disposed over the second in-coupling optical element such that a third color different from the first color and the second color can pass through the first in-coupling optical element and second in-coupling optical element to the third in-coupling optical element and can be coupled into a third waveguide to be guided therein.

44. The head mounted display system of Example 43, wherein the first color comprises one of red, green, and blue, wherein the second color comprises one of red, green, and blue different than said first color, and wherein the third color comprises one of red, green, or blue different from said first and second colors.

45. The head mounted display system of any of the above Examples, wherein the at least one in-coupling optical element comprises a first group of in-coupling optical elements and a second group of in-coupling optical elements, the first group of in-coupling optical elements comprising a plurality of color selective in-coupling optical elements configured to in-couple different respective colors and the second group of in-coupling optical elements comprising a plurality of color selective in-coupling optical elements configured to in-couple different respective colors, the first group and the second group laterally displaced with respect to each other.

46. The head mounted display system of Example 45, wherein the first plurality of in-coupling optical elements comprise a first in-coupling optical element and a second in-coupling optical element, the second in-coupling optical element disposed over the first in-coupling optical element such that light of a first color can be coupled by the first in-coupling optical element into a first waveguide to be guided therein and a second color different from the first color can pass through the first in-coupling optical element to the second in-coupling optical element and can be coupled by the second in-coupling optical element into a second waveguide to be guided therein.

47. The head mounted display system of Example 46, wherein the first plurality of in-coupling optical elements comprises a third in-coupling optical element disposed over the first in-coupling optical element and the second in-coupling optical element such that a third color different from the first color and the second color can pass through the first in-coupling optical element and the second in-coupling optical element to the third in-coupling optical element and can be coupled into a third waveguide to be guided therein.

48. The head mounted display system of Example 47, wherein the first color comprises one of red, green, and blue, wherein the second color comprises one of red, green, and blue different than said first color, and wherein the third color comprises one of red, green, or blue different from said first and second colors.

49. The head mounted display system of Example 48, wherein a second plurality of in-coupling optical elements comprises a fourth in-coupling optical element and a fifth in-coupling optical element, the fifth in-coupling optical element disposed over the fourth in-coupling optical element such that light of a fourth color can be coupled by the fourth in-coupling optical element into a fourth waveguide to be guided therein and a fifth color different from the first color can pass through the fourth in-coupling optical element to the fifth in-coupling optical element and can be coupled by the second in-coupling optical element into a fifth waveguide to be guided therein.

50. The head mounted display system of Example 49, wherein the second plurality of in-coupling optical elements comprises a sixth in-coupling optical element disposed over the fourth in-coupling optical element and fifth in-coupling optical element such that a sixth color different from the first color and the second color can pass through the fourth in-coupling optical element and the fifth in-coupling optical element to the sixth in-coupling optical element and can be coupled into a sixth waveguide to be guided therein.

51. The head mounted display system of Example 50, wherein the eyepiece is configured such that light out-coupled from the first waveguide, the second waveguide, and the third waveguide have different amounts of at least one of convergence, divergence, and collimation than light out-coupled from the fourth waveguide, the fifth waveguide, and the sixth waveguide and thus appear to originate from different depths than the light output from the fourth waveguide, the fifth waveguide, and the sixth waveguide.

52. The head mounted display system of Example 51, wherein the eyepiece is configured such that the light out-coupled from the first waveguide, the second waveguide, and the third waveguide is collimated and the light output from the fourth waveguide, fifth waveguide, and the sixth waveguide diverges.

53. The head mounted display system of Example 52, wherein the eyepiece is configured such that the light out-coupled from the first waveguide, the second waveguide, and the third waveguide diverges and the light output from the fourth waveguide, the fifth waveguide, and the sixth waveguide diverges a different amount.

54. The head mounted display system of any of Examples 45-53, wherein the at least one light source comprises a first source disposed with respect to the optics and the spatial light modulator to direct light into the first group of in-coupling optical elements, the first light source being configured to emit different color light at different times.

55. The head mounted display system of any of Examples 45-54, wherein the at least one light source comprises a second light source disposed with respect to the optics and the spatial light modulator to direct light into the second group of in-coupling optical elements, the second light source also being configured to emit different color light at different times.

56. The head mounted display system of any of the Examples above, wherein the at least one out-coupling optical element comprises a diffractive optical element.

57. The head mounted display system of any of the Examples above, wherein the at least one out-coupling element is configured to increase dimensions of an eyebox along at least one first axis.

58. The head mounted display system of Example 57, further comprising an orthogonal pupil expander comprising at least one light redirecting element in or on the at least one waveguide that is configured to increase dimensions of the eyebox along a second axis that is orthogonal to the at least one first axis.

59. The head mounted display system of Example 58, wherein the at least one light redirecting element comprises a diffractive optical element.

60. The head mounted display system of any of the above Examples, wherein at least a portion of the at least one waveguide extends between the at least one light source and the optics, light from the at least one light source that is directed through the optics passing through the portion of the at least one waveguide to the optics.

61. The head mounted display system of any of the above Examples, wherein the at least one waveguide has a first side and a second side opposite the first side, the optics and the spatial light modulator disposed on the first side such that light from the spatial light modulator is directed onto the first side.

62. The head mounted display system of Example 61, wherein the at least one light source is disposed on the first side such that light from the at least one light source is incident on the first side prior to passing through the optics to the spatial light modulator.

63. The head mounted display system of Example 61, wherein the at least one light source is disposed on the second side such that light from the at least one light source is incident on the second side prior to passing through the optics to the spatial light modulator.

64. The head mounted display system of Example 63, wherein the at least one waveguide is disposed between the at least one light source and the optics.

65. The head mounted display system of any of the above Examples, further comprising a light source in-coupling optical element disposed with respect to a portion of the at least one waveguide proximal to the at least one light source so as to receive light from the at least one light source and to couple light from the at least one light source into the portion of the at least one waveguide so as to be guided therein.
66. The system of Example 65, further comprising an out-coupling optical element with respect to the portion of the at least one waveguide proximal the light source that is configured to direct light guided in the portion of the at least one waveguide out of the portion of the at least one waveguide through the optics and to the spatial light modulator.
67. The head mounted display system of Example 66, wherein the head mounted display system is configured such that at least a portion of the light coupled into the optics from the portion of the at least one waveguide proximal the at least one light source is incident on the spatial light modulator, passes through the optics again, is incident onto a second portion of the at least one waveguide, guided therein again, out-coupled therefrom and directed to the eye of the user.
68. The head mounted display system of any of Examples 65 to 67, further comprising an isolator to reduce cross-talk from the portion of the at least one waveguide proximal to the light source into the second portion of the at least one waveguide.
69. The head mounted display system of Example 68, wherein the isolator comprises one of an opaque surface and reflective surface.
70. The system of Example 58, wherein the isolator is disposed in the at least one waveguide.
71. The head mounted display system of any Examples 65-70, wherein the at least one waveguide has a first side and a second side opposite the first side, the optics and the spatial light modulator disposed on the first side of the at least one waveguide.
72. The head mounted display system of Example 71, wherein the at least one light source is disposed on the first side of the at least one waveguide such that light from the at least one light source is incident on the first side of the at least one waveguide to be guided therein and light guided in the portion of the at least one waveguide is coupled out of the first side of the at least one waveguide and to the optics and the spatial light modulator on the first side.
73. The head mounted display system of Example 71, wherein the at least light source is disposed on the second side of at least one waveguide such that light from the at least one light source is incident on the second side of the at least one waveguide prior to passing through the optics to the spatial light modulator.
74. The head mounted display system of Examples 71 or 73, wherein the at least one waveguide is disposed between the at least one light source and the optics.
75. The head mounted display system of any of the above Examples, further comprising at least one waveguide optically coupled to the at least one light source to receive light from the at least one light source, to guide light from the at least one light source therein, and to couple light guided therein into the optics such that at least a portion of the light coupled into the optics from the at least one waveguide is incident on the spatial light modulator, passes through the optics again and is incident onto the at least one waveguide, guided therein, out-coupled therefrom and directed to the eye of the user.
76. The head mounted display system of Example 75, further comprising an in-coupling element disposed on the at least one waveguide to receive light from the light source and couple light from the light source into the at least one waveguide to be guided therein.
77. The head mounted display system of Example 76, further comprising an out-coupling element disposed on the at least one waveguide to receive the light guided within the at least one waveguide from the light source and couple the light guided in the at least one waveguide out of the at least one waveguide and through the optics to the spatial light modulator.
78. The head mounted display system of any of Examples 75 to 77, further comprising an isolator to reduce cross-talk between the at least one waveguide and the at least one waveguide.
79. The head mounted display system of Example 78, wherein the isolator comprises at least one of an opaque and reflective surface.
80. The head mounted display system of Example 78 or 79, wherein the isolator is disposed in or on the at least one waveguide.
81. The head mounted display system of any Examples 75-80, wherein the at least one waveguide has a first side and a second side opposite said first side, the optics and the spatial light modulator disposed on the first side of the at least one waveguide.
82. The head mounted display system of Example 81, wherein the at least one light source is disposed on the first side of the at least one waveguide such that light from the at least one light source is incident on the first side of the at least one waveguide to be guided therein and light guided in the at least one waveguide is coupled out of the first side of the at least one waveguide to the optics and the spatial light modulator on the first side.
83. The head mounted display system of Example 81, wherein the at least one light source is disposed on the second side of at least one waveguide such that light from the at least one light source is incident on the second side of the at least one waveguide to be guided therein and light guided in the at least one light guide is coupled out of the first side of the at least one waveguide to the optics and the spatial light modulator on the first side.
84. The head mounted display system of Examples 81 or 83, wherein the at least one waveguide is disposed between the at least one light source and the optics.
85. The head mounted display system of any of the above Examples, wherein the optics comprises one or more lenses.
86. The head mounted display system of any of the above Examples, wherein the optics comprises a plurality of lenses.
87. The head mounted display system of any of the above Examples, wherein the optics has positive power.
88. The head mounted display system of any of the above Examples, wherein the optics comprises one or more refractive optical elements.
89. The head mounted display system of any of the above Examples, wherein the spatial light modulator is configured to modulate polarization.

90. The head mounted display system of any of the above Examples, further comprising an analyzer in an optical path between the spatial light modulator and the eye of the user.
91. The head mounted display system of Example 90, wherein the analyzer is disposed in an optical path between the optics and the at least one in-coupling optical element.
92. The head mounted display system of any of the above Examples, further comprising a polarizer disposed between the at least one light source and the spatial light modulator.
93. The head mounted display system of any of the above Examples, wherein the at least one light source comprises a polarized light source.
94. The head mounted display system of any of the Examples above, wherein a polarizer is disposed between the optics and the spatial light modulator.
95. The head mounted display system of 94, wherein the polarizer is disposed directly on the spatial light modulator.
96. The head mounted display system of any of the Examples above, where the polarizer comprises a wire grid polarizer.
97. The head mounted display system of Example 90, wherein the analyzer is a circular polarizer.
98. The head mounted display system of any of the above Examples, further comprising a variable optical element with adjustable optical power.
99. The head mounted display system of Example 98, wherein the variable optical element comprises a lens or mirror.
100. The head mounted display system of Example 98 or 99, wherein the variable optical element is configured to have a first state and second states wherein in the first state the variable optical element has a different optical power than when in the second state.
101. The head mounted display system of Example 100, wherein the variable optical element has a negative optical power in the first state and has zero optical power in the second state.
102. The head mounted display system of Example 100, wherein the variable optical element has a positive optical power in the first state and has zero optical power in the second state.
103. The head mounted display system of Example 100, wherein the variable optical element has a first negative optical power in the first state and has a second different negative optical power in the second state.
104. The head mounted display system of Example 100, wherein the variable optical element has a first positive optical power in the first state and has a second different positive optical power in the second state.
105. The head mounted display system of Example 100, wherein the variable optical element has a first negative optical power in the first state and has a second positive optical power in the second state.
106. The head mounted display system of Example 98, wherein the variable optical element comprises a liquid lens.
107. The head mounted display system of any of the Examples above, further comprising an adjustable dimmer comprising optical elements that provide variable attenuation of light that is transmitted therethrough.
108. The head mounted display system of any of the Examples above, further comprising a prescription lens configured to provide refractive correction of the eye of the user.
109. The head mounted display system of any of the Examples above, further comprising a static lens disposed in the path between the at least one waveguides and the user's eye.
110. The head mounted display system of Example 91, wherein the analyzer is configured to also serve as a polarizer to light propagating from the light source to the optics.
111. The head mounted display system of any of the Examples above, further comprising a color filter array disposed on a side of the waveguide proximate the user, wherein the color filter array comprises a plurality of different color filters.
112. The head mounted display system of 111, wherein the color filter array comprises an absorbing material disposed between the color filters, configured to reduce propagation and reflection of stray light.
113. The head mounted display system of any of the Examples above, wherein a polarizer may be disposed in an optical path of the light source and configured to transmit light of a first polarization and reflect light of a second polarization, wherein a portion of the reflected light of the second polarization directed toward the light source obtains the first polarization.
114. The head mounted display system of Example 113, wherein a portion of the reflected light of the second polarization directed toward the light source obtains the first polarization by reflecting off coupling optics disposed to collect light from the light sources.
115. The head mounted display system of any of the Examples above, further comprising a quarter wave plate.
116. The head mounted display system of any of the Examples above, further comprising a compensator configured to provide more consistent orthogonal rotation of the light.
117. The head mounted display system of any of the Examples above, wherein the optics and spatial light modulator are tilted relative to on another.
118. The head mounted display system of any of the Examples above, wherein the coupling optics, optics, and spatial light modulator are tilted relative to the eyepiece.
119. The head mounted display system of any of the Examples above, wherein the coupling optics, optics, and spatial light modulator are tilted relative to the eyepiece.
120. The head mounted display system of any of the Examples above, light from the light source is configured to be recycled or reclaimed.
121. The head mounted display system of any of the Examples above, further comprising a polarizer configured to transmit light from said light source having a first polarization to said optics and reflect light having a second different polarization back toward said light source.
122. The head mounted display system of any of the Examples above, further comprising a coupling element between said light source and said polarizer that converts at least some of said light of said second polarization reflected by said polarizer into light of said first polarization.

123. The head mounted display system of any of the Examples above, where said light source comprises a plurality of laterally displaced light emitters configured to output light.
124. The head mounted display system of any of the Examples above, further comprising collection optics or a coupling element configured to collect the light from the plurality of light emitters.
125. The head mounted display system of any of the Examples above, further comprising a diffuser in an optical path between said light source and said optics.
126. The head mounted display system of any of the Examples above, further comprising one or more apertures between said light source and said optics.
127. The head mounted display system of any of the Examples above, further comprising a plurality of apertures between said light source and said optics.
128. The head mounted display system of any of the Examples above, further a diffuser and a plurality of apertures between said light source and said optics, said diffuser proximal said apertures.
129. The head mounted display system of any of the Examples above, wherein said light source comprises one or more laser diodes.
130. The head mounted display system of any of the Examples above, further comprising a coupling optic disposed with respect to the light source to collect light output from the light source.
131. The head mounted display system of Example 130, wherein the coupling optic comprises a compound parabolic collector (CPC).
132. The head mounted display system of any of the Examples above, further comprising a collection optics disposed with respect to the light source to collect light output from the light source.
133. The head mounted display system of any of the Examples above, wherein said collection optics comprised one or more lenses.
134. The head mounted display system of any of the Examples above, wherein said collection optics comprised a plurality of lenses.
135. The head mounted display system of any of the Examples above, further comprising a quarter wave retarder between the light source and optics.
136. The head mounted display system of any of the Examples above, wherein a polarizer is affixed to the spatial light modulator.
137. The head mounted display system of any of the Examples above, wherein a polarizer is adhered to the spatial light modulator with adhesive.
138. The head mounted display system of any of the Examples above, wherein a polarizer is adhered to the spatial light modulator using a mechanical fixture.
139. The head mounted display system of any of the Examples above, wherein a compensator is affixed to the spatial light modulator.
140. The head mounted display system of any of the Examples above, wherein a compensator is adhered to the spatial light modulator with adhesive.
141. The head mounted display system of any of the Examples above, wherein a compensator is adhered to the spatial light modulator using a mechanical fixture.
142. The head mounted display system of any of the Examples above, wherein a retarder is affixed to the spatial light modulator.
143. The head mounted display system of any of the Examples above, wherein a retarder is adhered to the spatial light modulator with adhesive.
144. The head mounted display system of any of the Examples above, wherein a retarder is adhered to the spatial light modulator using a mechanical fixture.
145. The head mounted display system of any of the Examples above, wherein a quarter wave retarder is affixed to the spatial light modulator.
146. The head mounted display system of any of the Examples above, wherein a quarter wave retarder is adhered to the spatial light modulator with adhesive.
147. The head mounted display system of any of the Examples above, wherein a quarter wave retarder is adhered to the spatial light modulator using a mechanical fixture.
148. The head mounted display system of any of the Examples above, where the polarizer comprises a wire grid polarizer.
149. The head mounted display system of any of the Examples above, further comprising a circular polarizer between said spatial light modulator and said in-coupling optical element.
150. The head mounted display system of Example 149, wherein the circular polarizer comprises a linear analyzer and a quarter wave retarder.
151. The head mounted display system of any of the Examples above, further comprising single polarizer between the optics and the at least one waveguide and between the light source and the optics.
152. The head mounted display system of any of the Examples above, wherein said light dump comprises absorbing material.
153. The head mounted display system of any of the Examples above, wherein said light dump comprises absorbing material surrounding filters of a filter array.
154. The head mounted display system of any of the Examples above, said light source is disposed laterally with respect to said at least one waveguide such that light from said light source is directed into said optics without passing through said at least one waveguide.
155. The head mounted display system of any of the Examples above, wherein said light source is disposed on a transparent layer that extends laterally with respect to said at least one waveguide such that light from said light source is directed into said optics without passing through said at least one waveguide.
156. The head mounted display system of any of the Examples above, wherein said light source is disposed on a transparent layer that is closer to a side of said at least one waveguide closer to said environment in front of said user than a side of said at least one waveguide closer to said user's eye, said transparent layer extending laterally with respect to said at least one waveguide such that light from said light source is directed into said optics without passing through said at least one waveguide.
157. The head mounted display system of any of the Examples above, wherein said light source is disposed on a transparent layer that is closer to a side of said at least one waveguide closer to said user's eye than a side of said at least one waveguide closer to said environment in front of said user, said transparent layer extending laterally with respect to said at least one waveguide such that light from said light source is directed into said optics without passing through said at least one waveguide.

158. The head mounted display system of any of the Examples above, wherein transparent layer comprises a cover glass.
159. The head mounted display system of any of the Examples above, further comprises a plurality of color filters laterally displaced with respect to each other, said color filters aligned laterally with respect to a plurality of in-coupling optical elements that are laterally displaced with respect to each other such that light passing through respective color filters is incident on respective in-coupling optical elements.
160. The head mounted display system of any of the Examples above, the plurality of color filters comprising a color filter array.
161. The head mounted display system of any of the Examples above, further comprising a polarizer disposed in an optical path between said spatial light modulator and said optics.
162. The head mounted display system of any of the Examples above, further comprising an analyzer disposed in an optical path between said spatial light modulator and said optics.
163. The head mounted display system of any of the Examples above, further comprising a compensator disposed in an optical path between said spatial light modulator and said optics.
164. The head mounted display system of any of the Examples above, further comprising a retarder disposed in an optical path between said spatial light modulator and said optics.
165. The head mounted display system of any of the Examples above, further comprising a quarter wave retarder disposed in an optical path between said spatial light modulator and said optics.
166. The head mounted display system of any of the Examples above, further comprising a first circular polarizer between said at least one waveguide and said optics having optical power.
167. The head mounted display system of Example 166, wherein said first circular polarizer is between said light source and said optics having optical power.
168. The head mounted display system of any of the Examples above, further comprising a second circular polarizer between said optics having optical power and said spatial light modulator.
169. The head mounted display system of Example 168, further comprising a retarder between said second circular polarizer and said spatial light modulator.
170. The head mounted display system of Example 168 or 169, further comprising a third circular polarizer between said second circular polarizer and said spatial light modulator.
171. The head mounted display system of Example 170, further comprising a retarder between said second and third circular polarizers.
172. The head mounted display system of any of the Examples above, further comprising a compensator between said optics having optical power and said spatial light modulator.
173. The head mounted display system of any of Examples 168 to 171, further comprising a compensator between said second circular polarizer and said spatial light modulator.
174. The head mounted display system of any of Examples 170 to 171, further comprising a compensator between said third circular polarizer and said spatial light modulator.
175. The head mounted display system of any of the Examples above, further comprising a cover glass between said optics having optical power and said spatial light modulator.
176. The head mounted display system of any of Examples 168 to 174, further comprising a cover glass between said second circular polarizer and said spatial light modulator.
177. The head mounted display system of any of Examples 170 to 174, further comprising a cover glass between said third circular polarizer and said spatial light modulator.
178. The head mounted display system of any of Examples 172 to 174, further comprising a cover glass between said compensator and said spatial light modulator.
179. The head mounted display system of any of the Examples above, further comprising at least one optical surface that is tilted with respect to said at least one waveguide to redirect light reflected from said optical surface.
180. The head mounted display system of any of the Examples above, further comprising at least one optical surface that is tilted with respect to said spatial light modulator to redirect light reflected from said optical surface.
181. The head mounted display system of any of the Examples above, further comprising at least one optical surface that is tilted with respect to at least one polarizer or retarder to redirect light reflected from said optical surface.
182. The head mounted display system of any of the Examples above, further comprising at least one optical surface having a normal that is tilted with respect to an optical axis of said optics having optical power to redirect light reflected from said optical surface.
183. The head mounted display system of any of Examples 179 to 182, wherein said at least one optical surface that is tilted redirects said reflected light away from an in-coupling optical element of said at least one waveguide.
184. The head mounted display system of any of Examples 179 to 183, wherein said at least one optical surface that is tilted redirects said reflected light such that less of said reflected light is coupled into said at least one waveguide and guided therein.
185. The head mounted display system of any of Examples 179 to 184, wherein said at least one optical surface that is tilted redirects said reflected light such less of said reflected light is directed to the user's eye.
186. The head mounted display system of any of Examples 179 to 185, wherein said at least one optical surface that is tilted redirects at least some said reflected light to said light source.
187. The head mounted display system of any of Examples 179 to 186, further comprising a light dump to receive at least some of said reflected light from said at least one optical surface that is tilted.
188. The head mounted display system of any of any of Examples 179 to 187, wherein said at least one optical surface that is tilted is on said cover glass.
189. The head mounted display system of any of Examples 179 to 188, wherein said at least one optical surface that is tilted is on one or more of the following: at least one retarder, at least one polarizer, or at least one compensator.

190. The head mounted display system of any of the Examples above, wherein said cover glass is wedge-shaped.
191. The head mounted display system of any of the Examples above, wherein at least one retarder, at least one polarizer, or at least one compensator is wedge-shaped.
192. The head mounted display system of any of the Examples above, further comprising a polarization rotator disposed with respect to said light source to rotate the polarization of light emitted therefrom.
193. The head mounted display system of Examples 166 or 167, further comprising a polarization rotator disposed between said light source and said first circular polarizer.
194. The head mounted display system of any of the Examples above, wherein said at least one in-coupling optical element comprises first and second in-coupling optical elements, said head mounted display system further comprising first and second color filters associated with said first and second in-coupling optical elements, respectively.
195. The head mounted display system of Example 194, wherein the first color filter transmits more light of a first color than the second color filter and the second color filter transmits more light of the second color than the first color.
196. The head mounted display system of Examples 194 or 195, wherein said at least one waveguide comprises first and second waveguides, and wherein the first in-coupling optical element couples more light of a first color than the second color filter into said first waveguide and the second in-coupling optical element couples more light of the second color than the first color into said second waveguide.
197. The head mounted display system of any of Examples 194-196, wherein the first and second color filters are laterally aligned with the respective first and second in-coupling optical elements.
198. The head mounted display system of any of Examples 194-197, further comprising first and second light sources, wherein the first and second light sources are disposed to direct light through the first and second color filters respectively, to the first and second in-coupling optical elements, respectively.
199. The head mounted display system of any of Examples 194-197, further comprising first and second light sources, wherein the first and second color filters are disposed in first and second optical paths between the first and second light sources and the first and second in-coupling optical elements, respectively.
200. The head mounted display system of Examples 198 or 199, wherein the first and second light sources comprise first and second color light sources configured to emit first and second colors, respectively.
201. The head mounted display system of Examples 198 or 199, wherein the first and second light sources comprise broad band color light sources configured to emit both said first and second colors.

BRIEF DESCRIPTION OF THE DRAWINGS

FIG. 12A is a side view of an augmented reality display system including a multi-color light source (e.g., time multiplexed RGB LEDs or laser diodes), a spatial light modulator, optics for illuminating the spatial light modulator and projecting an image of the spatial light modulator to the eye, and a stack of waveguides, different waveguides including different color-selective in-coupling optical elements as well as out-coupling optical elements.
FIG. 12B is a side view of the augmented reality display system of FIG. 12A further including a MEMS (micro-electro-mechanical) based SLM such as an array of movable mirrors (e.g., Digital Light Processing (DLP™) technology) and a light dump.

FIG. 12C is a top view of a portion of the augmented reality display system of FIG. 12B schematically illustrating the lateral arrangement of one of the in-coupling optical elements and the light dump as well as the light source.

FIG. 14B is a top view of the display system illustrated in FIG. 14A showing the laterally displaced in-coupling optical elements and light sources.

FIG. 20B shows the augmented reality display system of FIG. 20A with the analyzer located between the optics and the spatial light modulator.

DETAILED DESCRIPTION

Figure 1:
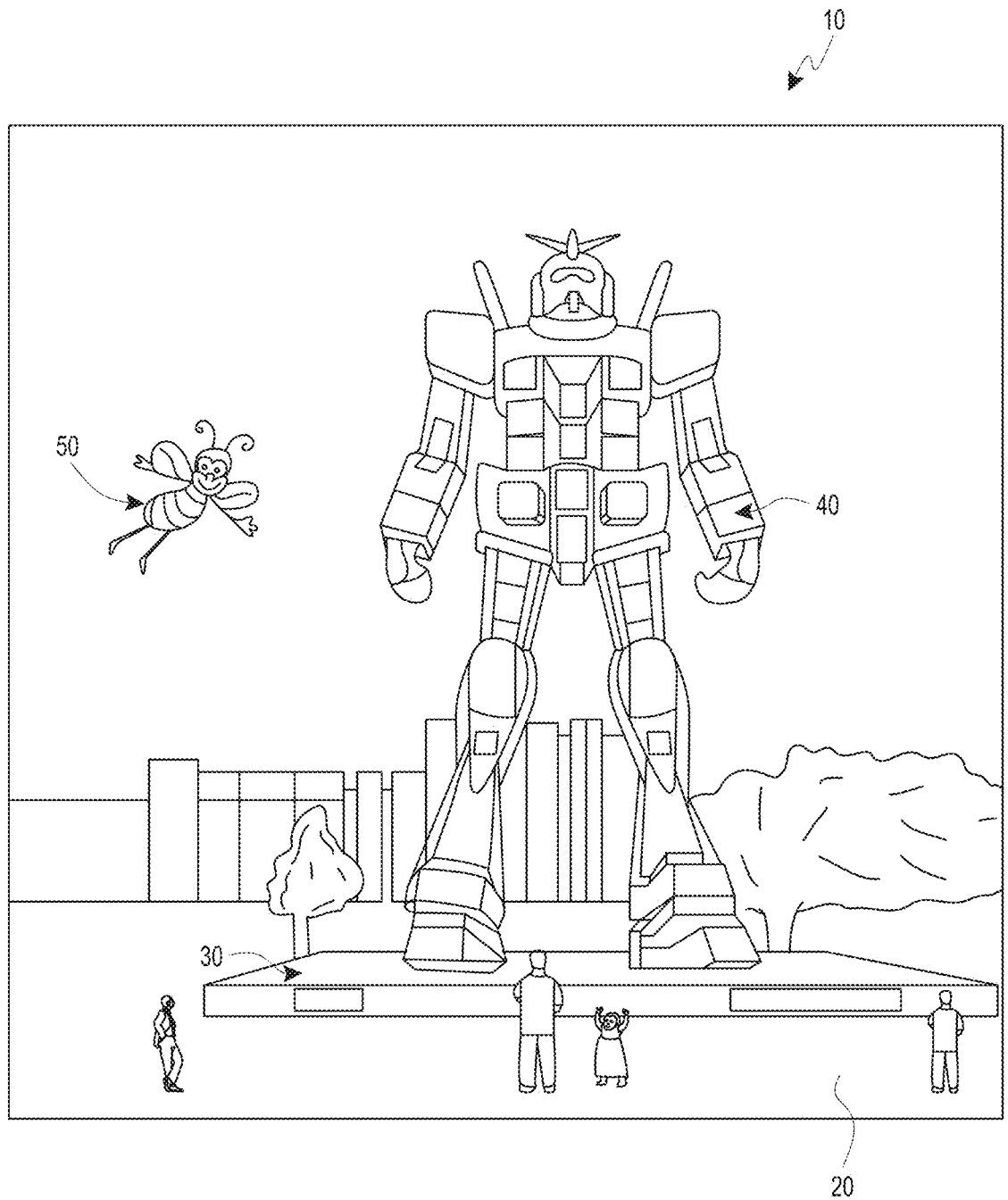
FIG. 1 illustrates a user's view of augmented reality (AR) through an AR device.

Reference will now be made to the drawings, in which like reference numerals refer to like parts throughout. Unless indicated otherwise, the drawings are schematic not necessarily drawn to scale.

Figure 2:
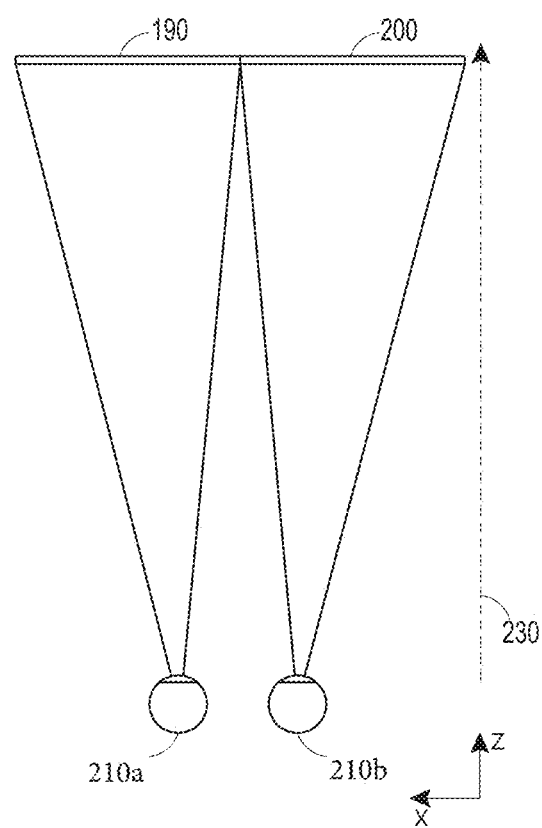
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210a, 210b—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210a, 210b by a distance 230 on a z-axis. The z-axis is parallel to the optical axis of the viewer with their eyes fixated on an object at optical infinity directly ahead of the viewer. The images 190, 200 are flat and at a fixed distance from the eyes 210a, 210b. Based on the slightly different views of a virtual object in the images presented to the eyes 210a, 210b, respectively, the eyes may naturally rotate such that an image of the object falls on corresponding points on the retinas of each of the eyes, to maintain single binocular vision. This rotation may cause the lines of sight of each of the eyes 210a, 210b to converge onto a point in space at which the virtual object is perceived to be present. As a result, providing three-dimensional imagery conventionally involves providing binocular cues that may manipulate the vergence of the eyes 210a, 210b, and that the human visual system interprets to provide a perception of depth.

Figure 3A:
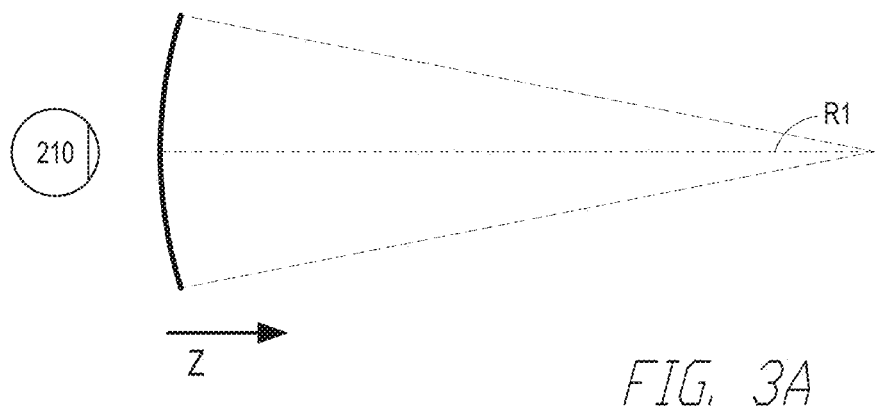
FIGS. 3A-3C illustrate relationships between radius of curvature and focal radius.
Figure 3B:
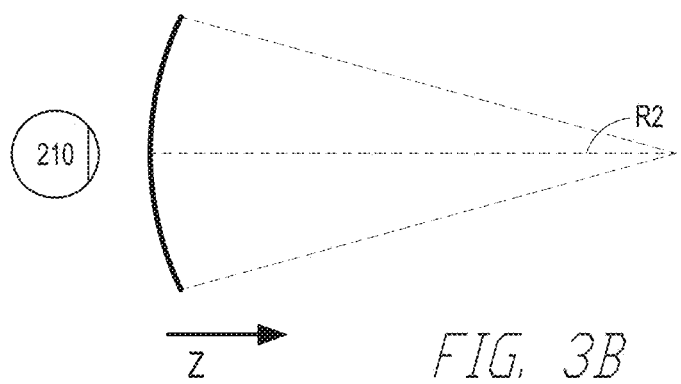
Figure 3C:
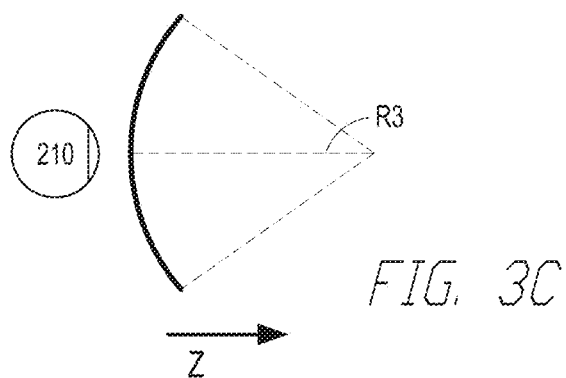

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other FIGS. herein, the discussions regarding eye 210 may be applied to both eyes 210a and 210b.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
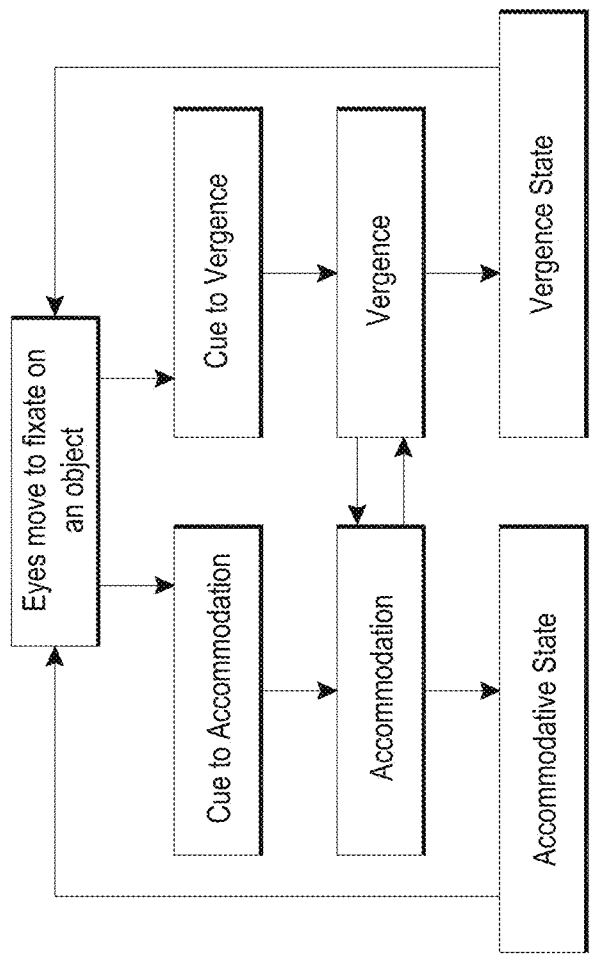
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
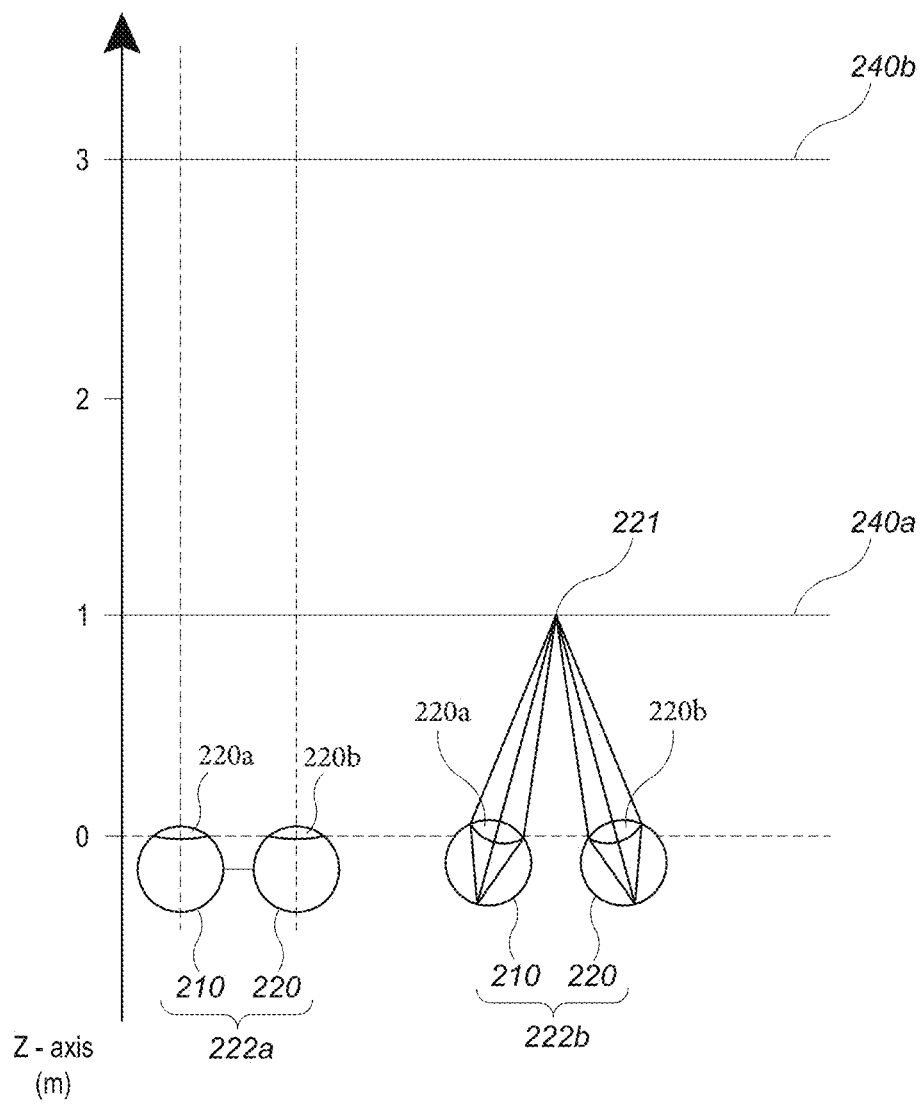
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 220a, 220b.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210a, 210b, are illustrated. For a given depth plane 240, vergence cues may be provided by the displaying of images of appropriately different perspectives for each eye 210a, 210b. In addition, for a given depth plane 240, light forming the images provided to each eye 210a, 210b may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
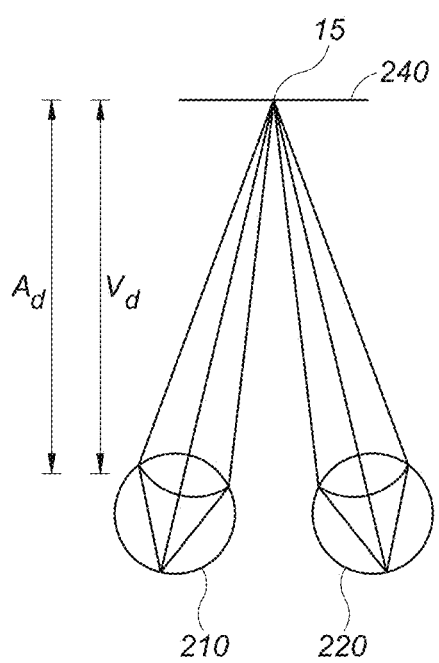
FIG. 4C illustrates an example of a representation of a top-down view of a user viewing content via a display system.
Figure 4D:
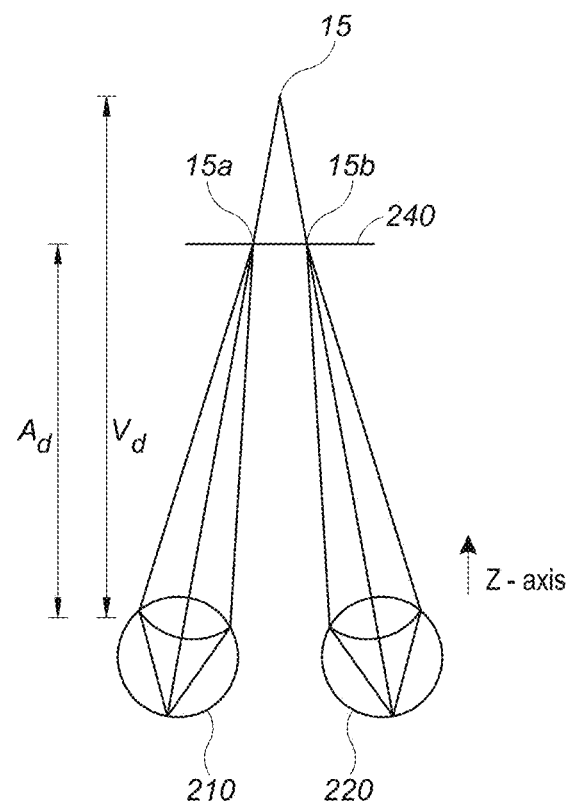
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210a, 210b. The images may cause the eyes 210a, 210b to assume a vergence state in which the eyes converge on a point 15 on a depth plane 240. In addition, the images may be formed by a light having a wavefront curvature corresponding to real objects at that depth plane 240. As a result, the eyes 210a, 210b assume an accommodative state in which the images are in focus on the retinas of those eyes. Thus, the user may perceive the virtual object as being at the point 15 on the depth plane 240.

It will be appreciated that each of the accommodative and vergence states of the eyes 210a, 210b are associated with a particular distance on the z-axis. For example, an object at a particular distance from the eyes 210a, 210b causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210a, 210b may be displayed with wavefront divergence corresponding to depth plane 240, and the eyes 210a, 210b may assume a particular accommodative state in which the points 15a, 15b on that depth plane are in focus. However, the images displayed to the eyes 210a, 210b may provide cues for vergence that cause the eyes 210a, 210b to converge on a point 15 that is not located on the depth plane 240. As a result, the accommodation distance corresponds to the distance from the exit pupils of the eyes 210a, 210b to the depth plane 240, while the vergence distance corresponds to the larger distance from the exit pupils of the eyes 210a, 210b to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$–$A_d$) and may be characterized using diopters.

In some embodiments, it will be appreciated that a reference point other than exit pupils of the eyes 210a, 210b may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
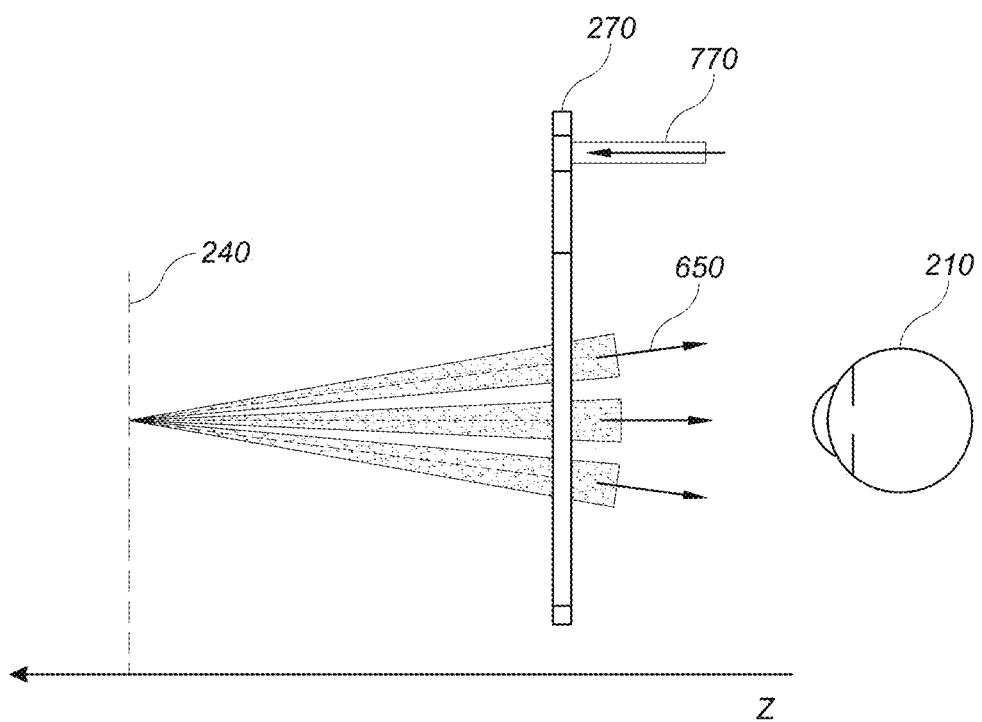
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 6:
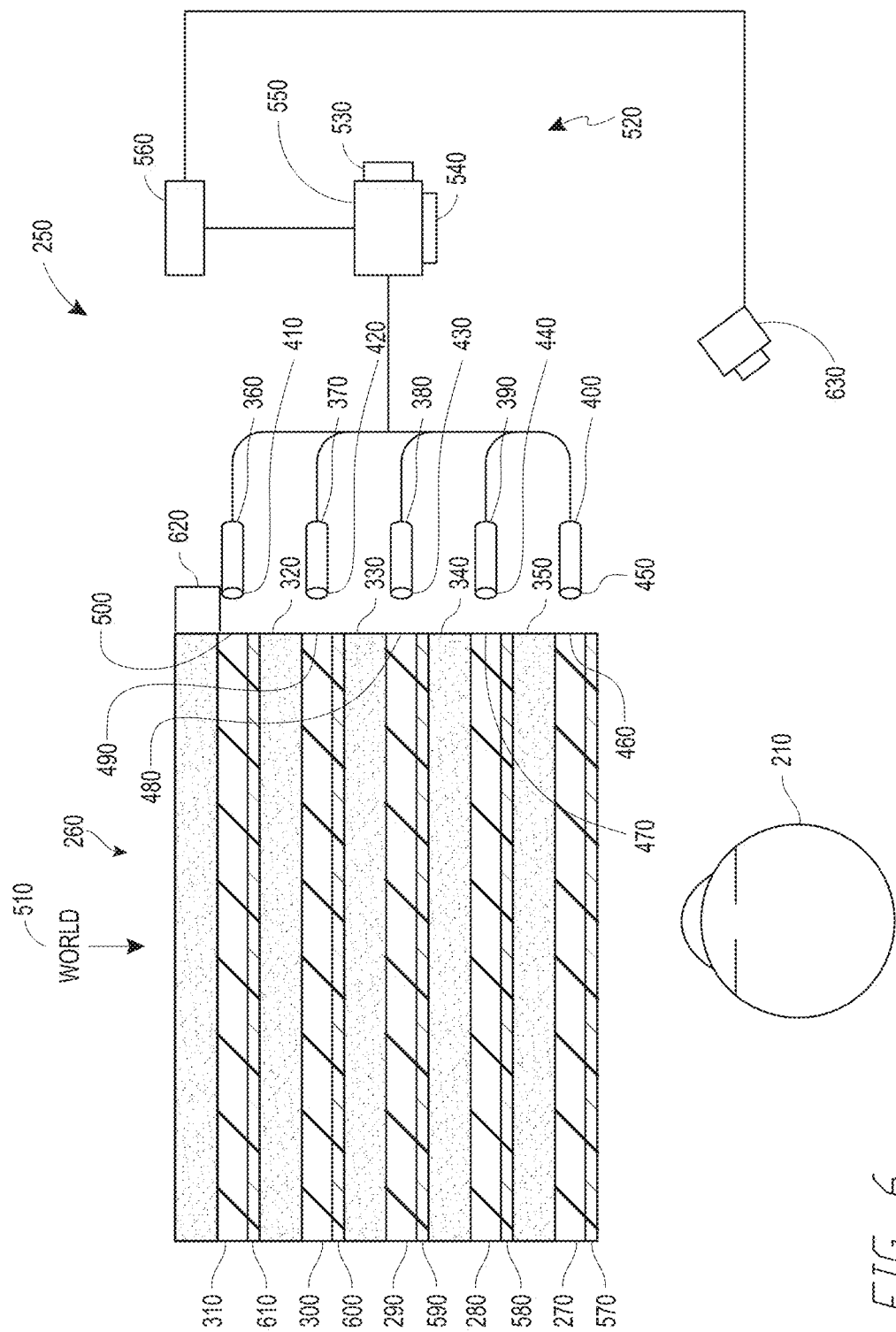
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include features 320, 330, 340, 350 between the waveguides. In some embodiments, the features 320, 330, 340, 350 may be one or more lenses. The waveguides 270, 280, 290, 300, 310 and/or the features (e.g., lenses) 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into one or more (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which includes a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or more waveguides of the waveguides 270, 280, 290, 300, 310. In some other embodiments, the illustrated image injection devices 360, 370, 380, 390, 400 may schematically represent one or more scanning fibers or one or more bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Although referred to as "out-coupling optical element" through the specification, the out-coupling optical element need not be an optical element and may be a non-optical element. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same one or more depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
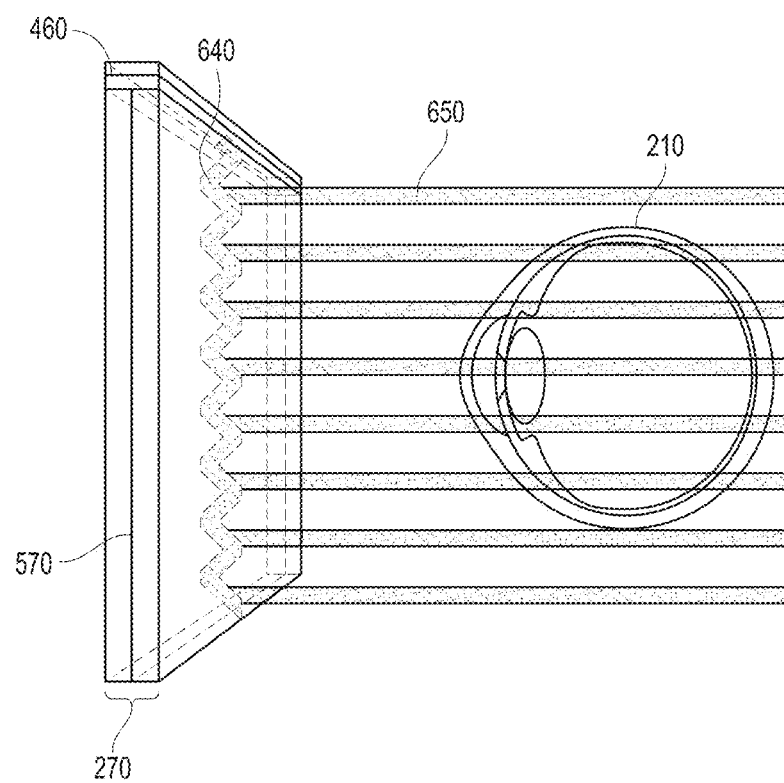
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
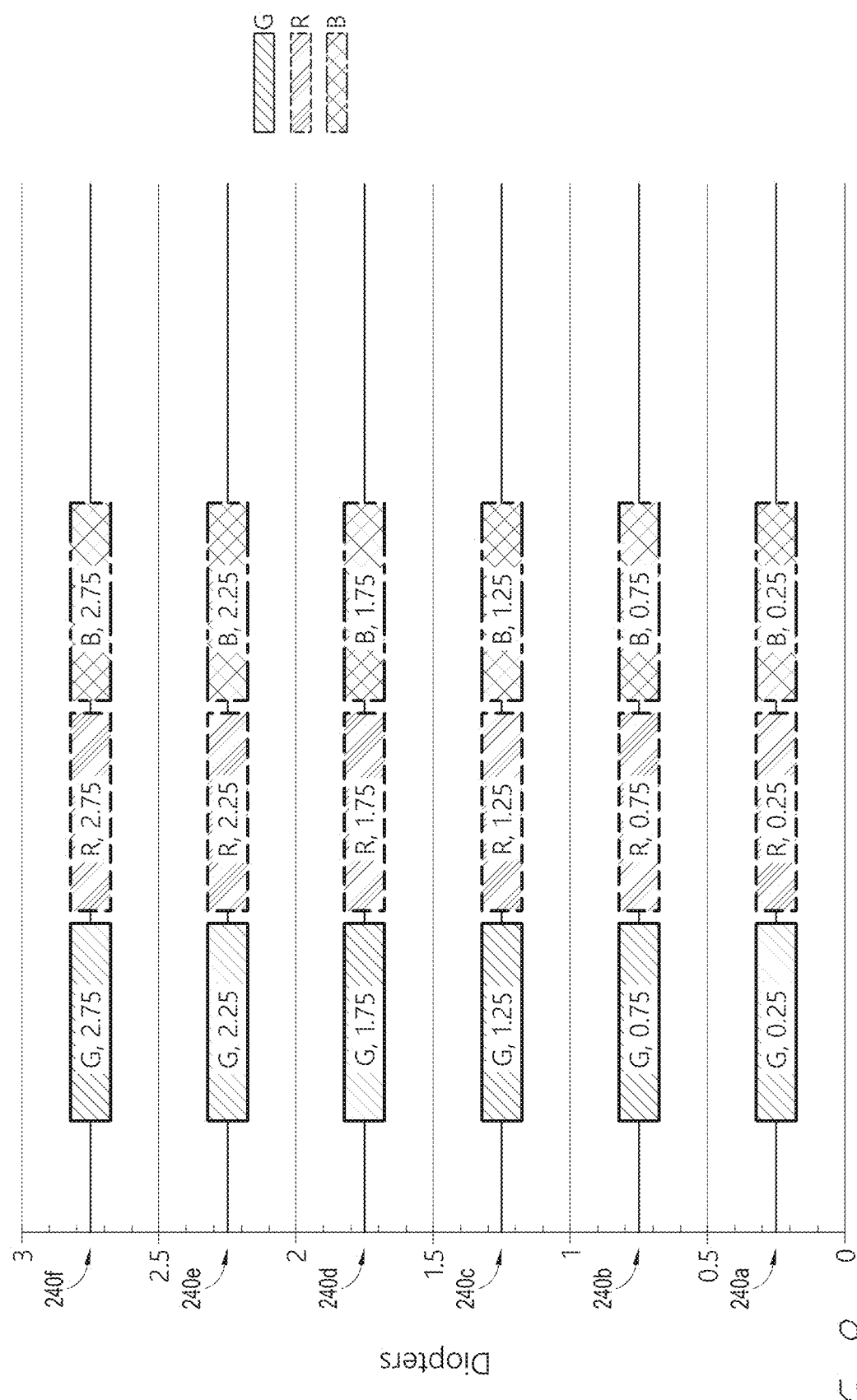
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the FIG. by different numbers for diopters (dpt) following the letters G, R, and B. Just as examples, the numbers following each of these letters indicate diopters (1/m), or inverse distance of the depth plane from a viewer, and each box in the FIGS. represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the FIGS. including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the eye 210, e.g., for imaging and/or user stimulation applications.

Figure 9A:
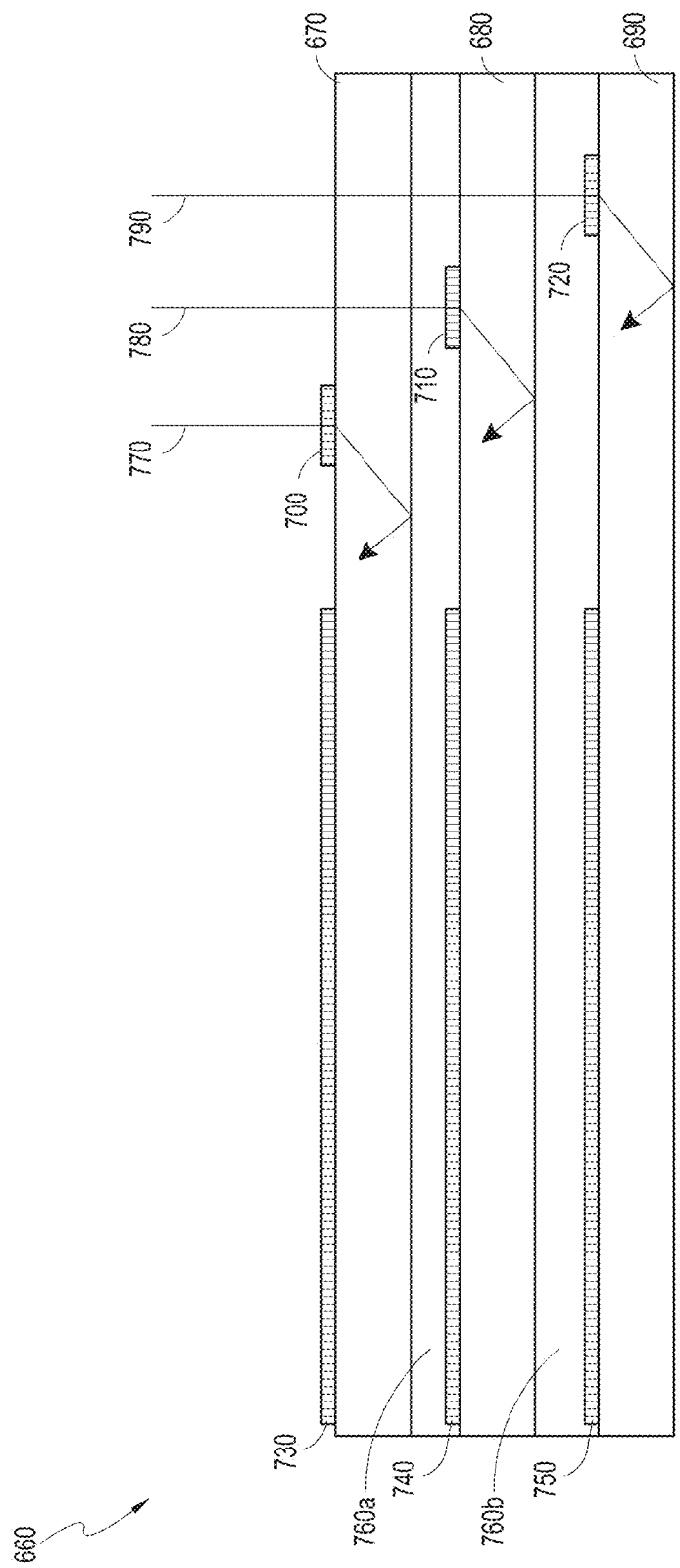
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. Although referred to as "in-coupling optical element" through the specification, the in-coupling optical element need not be an optical element and may be a non-optical element. FIG. 9A illustrates a cross-sectional side view of an example of a set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
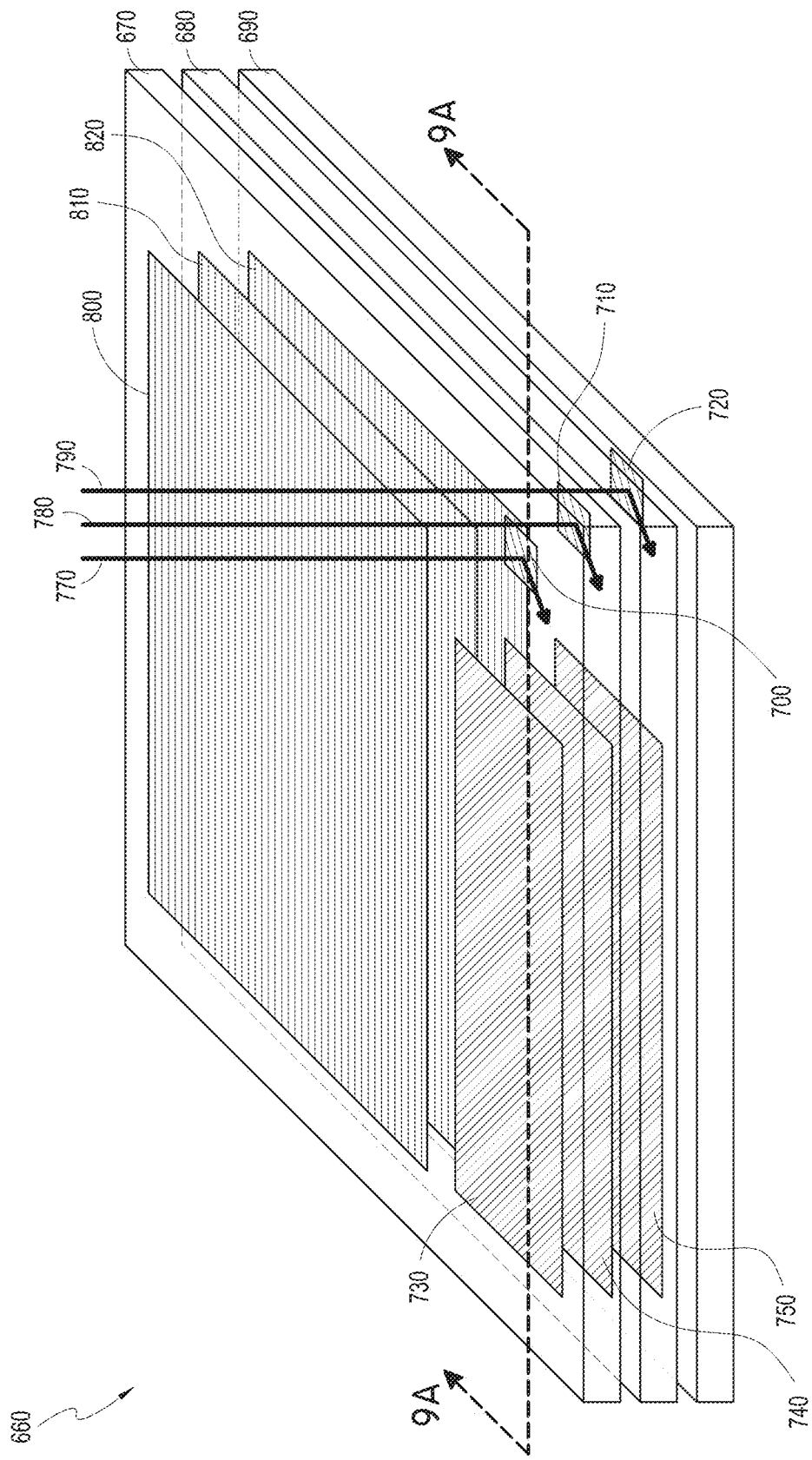
FIG. 9B illustrates a perspective view of an example of the one or more stacked waveguides of FIG. 9A.

With reference now to FIG. 9B, a perspective view of an example of the stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in the eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
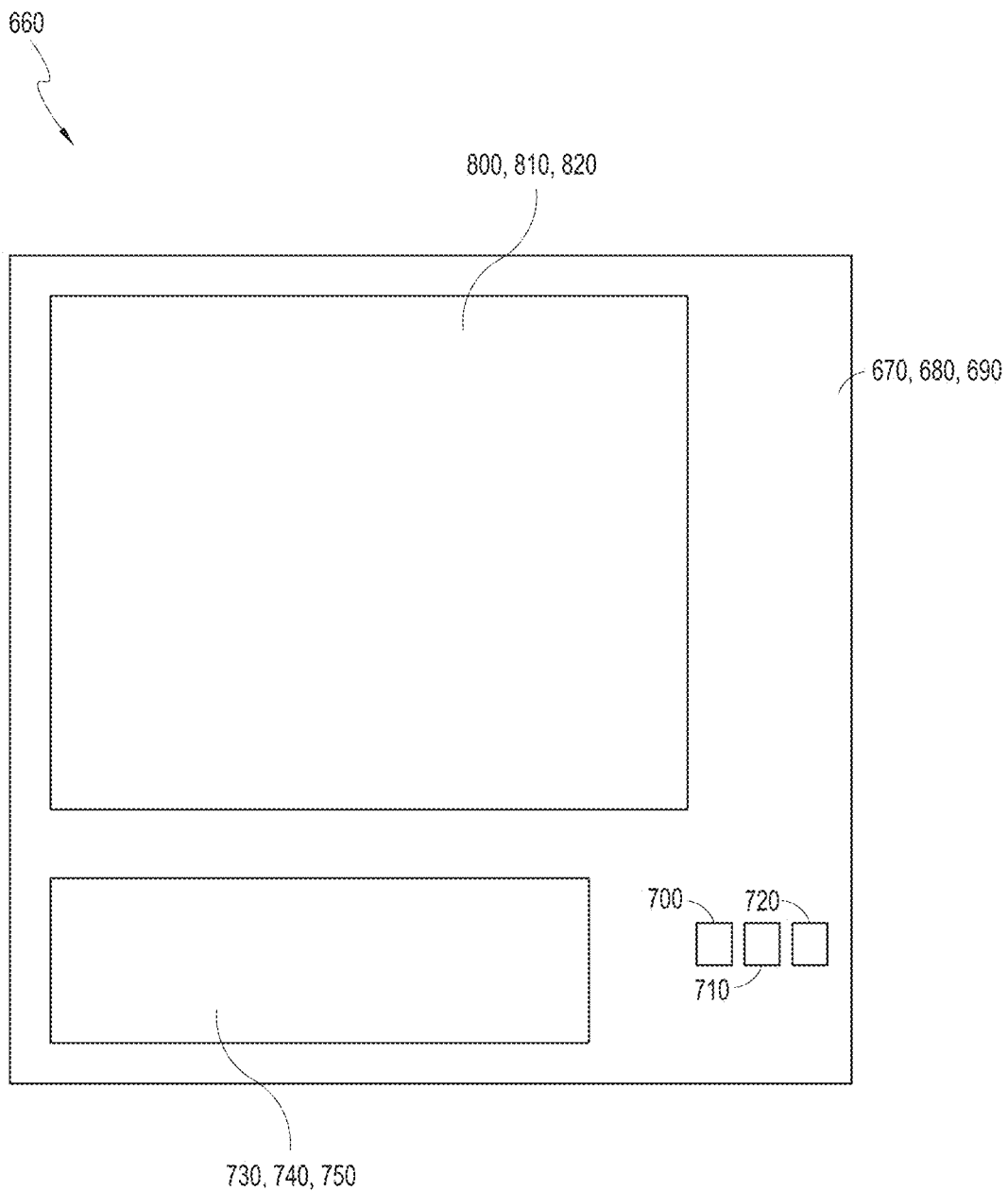
FIG. 9C illustrates a top-down plan view of an example of the one or more stacked waveguides of FIGS. 9A and 9B.

FIG. 9C illustrates a top-down plan view of an example of the stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably nonoverlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
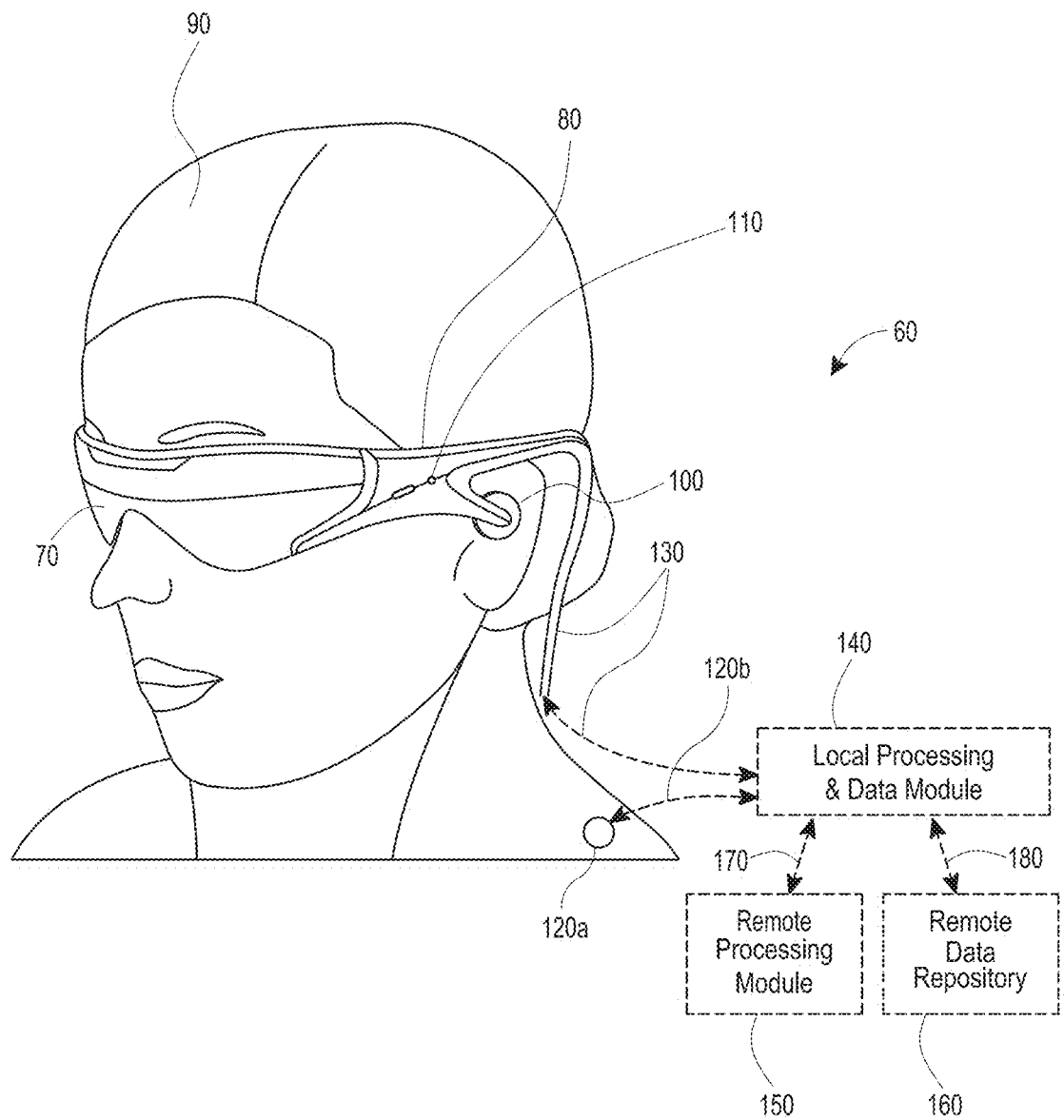
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Figure 10:
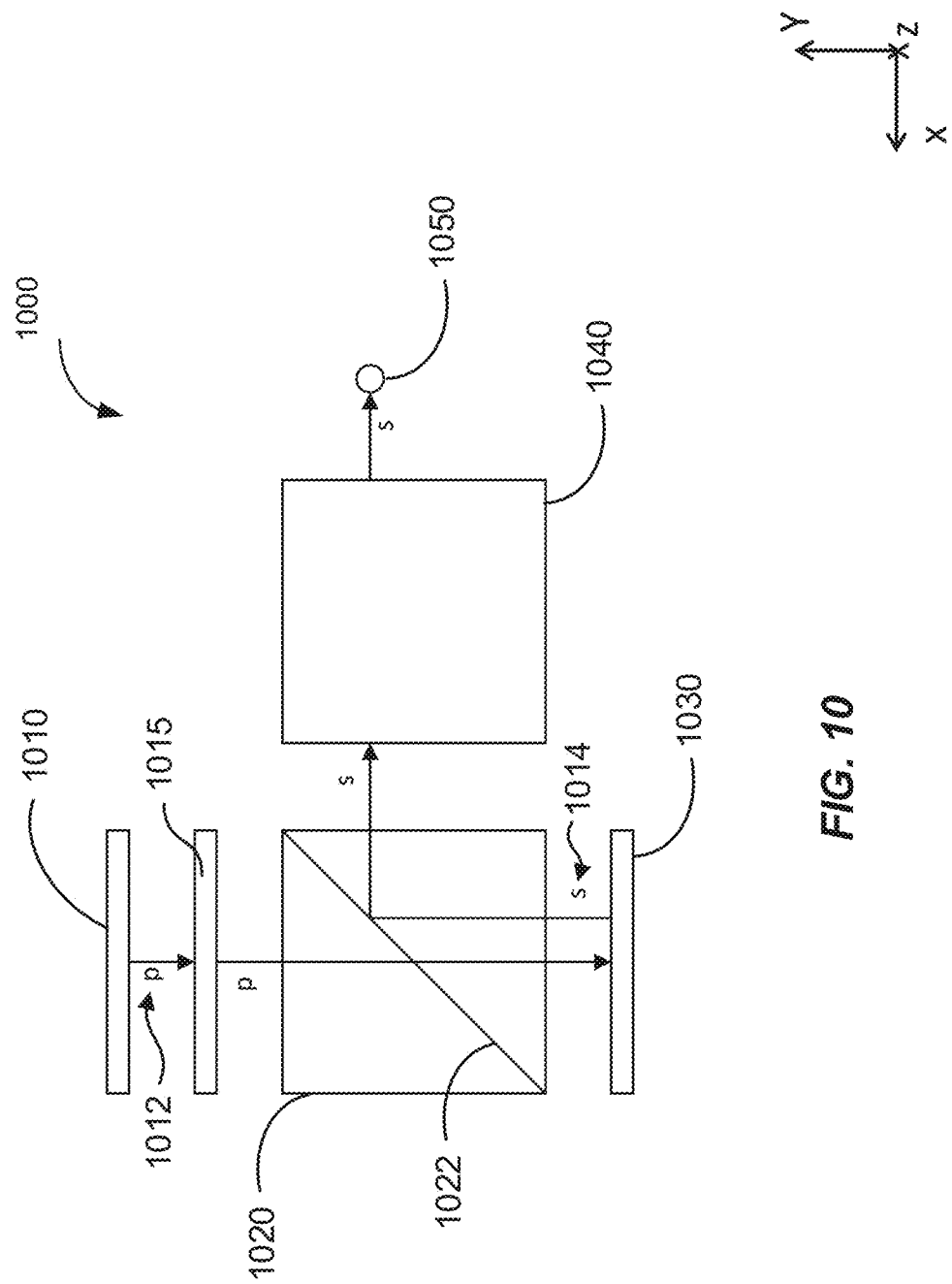
FIG. 10 is a side view of a projector assembly including a polarizing beam splitter with a light source injecting light into one side of the beamsplitter and projection optics receiving light from another side of the beamsplitter.

FIG. 10 is a schematic diagram illustrating a projector assembly 1000 that utilizes a polarization beamsplitter (PBS) 1020 to illuminate a spatial light modulator (SLM) 1030 and redirect the light from the SLM 1030 through projection optics 1040 to an eyepiece (not shown). The projector assembly 1000 includes an illumination source 1010, which can include, for example, light emitting diodes (LEDs), lasers (e.g., laser diodes), or other type of light source. This light may be collimated by collimating optics. The illumination source 1010 can emit polarized, unpolarized, or partially polarized light. In the illustrated design, the illumination source 1010 may emit light 1012 polarized having a p-polarization. A first optical element 1015 (e.g., a pre-polarizer) is aligned to pass light with the first polarization (e.g., p-polarization).

This light is directed to the polarizing beam splitter 1020. Initially, light passes through an interface 1022 (e.g., a polarizing interface) of the PBS 1020, which is configured to transmit light of the first polarization (e.g., p-polarization). Accordingly, the light continues to and is incident on the spatial light modulator 1030. As illustrated, the SLM 1030 is a reflective SLM configured to retro-reflect the light incident and selectively modulate the light. The SLM 1030, for example, includes one or more pixels that can have different states. The light incident on respective pixels may be modulated based on the state of the pixel. Accordingly, the SLM 1030 can be driven to modulate the light so as to provide an image. In this example, the SLM 1030 may be a polarization based SLM that modulates the polarization of the light incident thereon. For example, in an on state, a pixel of the SLM 1030 changes input light from a first polarization state (e.g., p-polarization state) to a second polarization state (e.g., s-polarization state) such that a bright state (e.g., white pixel) is shown. The second polarization state may be the first polarization state modulated (e.g., rotated) by 90°. In the on state, the light having the second polarization state is reflected by the interface 1022 and propagates downstream to the projector optics 1040. In an off state, the SLM 1030 does not change the polarization state of the light incident thereon, for example, does not rotate the input light from the first polarization state, thus a dark state (e.g., black pixel) is shown. In the off state, the light having the first polarization state is transmitted through the interface 1022 and propagates upstream back to the illumination source 1010 and not to a user's eye.

After reflection from the SLM 1030, a portion of the light 1014 (e.g., the modulated light) is reflected from the interface 1022 and exits the PBS 1020 to be directed to the user's eye. The emitted light passes through the projector optics 1040 and is imaged onto an in-coupling grating (ICG) 1050 of an eyepiece (not shown).

Figure 11A:
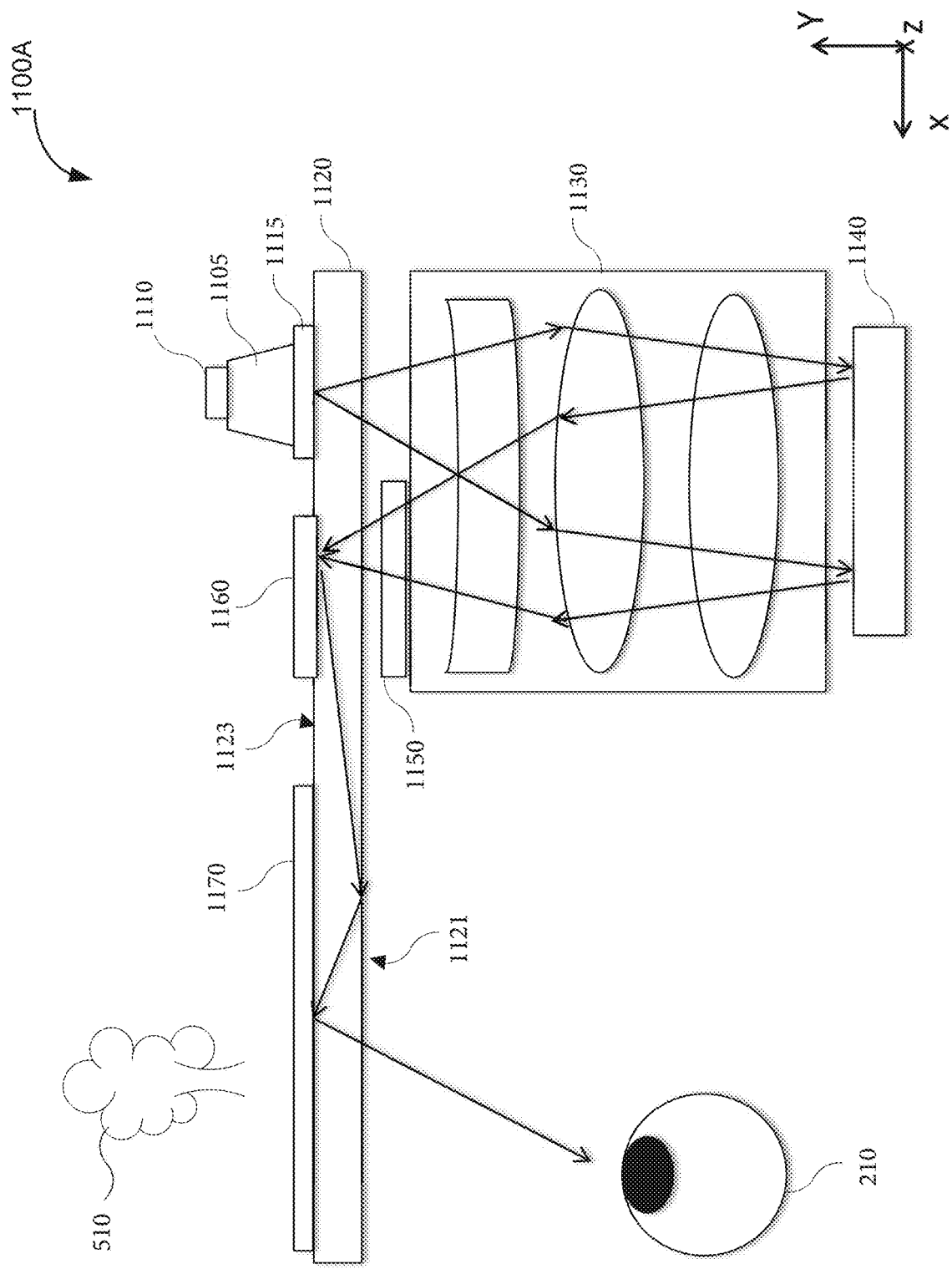
FIG. 11A is a side view of an augmented reality display system including a light source, a spatial light modulator, optics for illuminating the spatial light modulator and projecting an image of the spatial light modulator (SLM), and a waveguide for outputting image information to a user. The system includes an in-coupling optical element for coupling light from the optics into the waveguide as well as an out-coupling optical element for coupling light out of the waveguide to the eye.

FIG. 11A is illustrates a system (e.g., an augmented reality display system) 1100A for presenting images to the user's eye 210 and for viewing the world 510 that has an alternative configuration to that shown in FIG. 10. The system 1100 includes a light source 1110, a spatial light modulator (SLM) 1140, and a waveguide 1120 arranged such that light from the light source 1110 illuminates the SLM 1140, and light reflected from the SLM 1140 is coupled into the waveguide 1120 to be directed to the eye 210. The system 1100A includes optics 1130 disposed to both illuminate the SLM 1140 and project an image of the SLM 1140. Light from the light source 1110, for example, propagates in a first direction through the optics 1130 onto the SLM 1140 thereby illuminating the SLM 1140. Light reflected from the SLM 1140 propagates again through the optics 1130 in a second direction opposite the first direction and is directed to the waveguide 1120 and coupled therein.

The light source 1110 may include light emitting diodes (LEDs), lasers (e.g., laser diodes), or other type of light source. The light source 1110 may be a polarized light source, however the light source 1110 need not be so limited. In some implementations, a polarizer 1115 may be positioned between the light source 1110 and the SLM 1140. As illustrated, the polarizer 1115 is between the light source 1110 and the waveguide 1120. This polarizer 1115 may also be a light recycler, transmitting light of a first polarization and reflecting light of a second polarization back to the light source 1110. Such a polarizer 1115 may be, for example, a wire grid polarizer. A coupling optic 1105, such as a non-imaging optical element (e.g., cone, compound parabolic collector (CPC, lenses)), may be disposed with respect to the light source 1110 to receive light output from the light source 1110. The coupling optic 1105 may collect the light from the light source 1110 and may, in some cases, reduce the divergence of light emitted from the light source 1110. The coupling optic 1105 may, for example, collimate the light output from the light source 1110. The coupling optic 1105 may collect light that matches the angular spectrum field of view of the system 1100A. Accordingly, the coupling optic 1105 may match an angular spectrum of the light output by the light source 1110 with the field of view of the system 1100A. The coupling optic 1105 may have an asymmetric profile to operate on the light emitted from the light source 1110 asymmetrically. For example, the coupling optic 1105 may reduce the divergence a different amount in orthogonal directions (e.g., x and z directions). Such asymmetry in the coupling optic 1105 may address asymmetry in the light emitted from the light source 1110 which may include, for example, a laser diode that emits a wider range of angles of light in one direction (e.g., x or z) as opposed to the orthogonal direction (e.g., z or x, respectively).

As discussed above, the system 1100A includes optics 1130 configured to illuminate the SLM 1140 that is disposed in an optical path between the light source 1110 and the SLM 1140. The optics 1130 may include transmissive optics that transmits light from the light source 1110 to the SLM 1140. The optics 1130 may also be configured to project an image of the SLM 1140 or formed by the SLM 1140 into the waveguide 1120. An image may be projected into the eye of the eye 210. In some designs, the optics 1130 may include one or more lenses or optical elements having optic power. The optic 1130 may, for example, have positive optical power. The optics 1130 may include one or more refractive optical elements such as refractive lenses. Other types of optical elements may also possibly be used.

The SLM 1140 may be reflective, modulating and reflecting light therefrom. The SLM 1140 may be a polarization based SLM configured to modulate polarization. The SLM 1140 may, for example, include a liquid crystal (LC) SLM (e.g., a liquid crystal on silicon (LCOS) SLM). The LC SLM may, for example, include twisted nematic (TN) liquid crystal. The SLM 1140 may be substantially similar to the SLM 1030 with reference to FIG. 10. The SLM 1140 may, for example, include one or more pixels that are configured to selectively modulate light incident on the pixel depending on the state of the pixel. For some types of SLMs 1140, the pixel may, for example, modulate the beam incident thereon by altering the polarization state such as rotating the polarization (e.g., rotating the orientation of linearly polarized light).

As discussed above, the SLM 1140 may be a LCOS SLM 1140. In a cross-polarizer configuration, the LCOS SLM 1140 may be nominally white. When a pixel is off (e.g., 0 voltage), it has a bright state, and when the pixel is on (e.g., voltage above a threshold turn on voltage), it has a dark state. In this cross-polarization configuration, leakage is minimized when a pixel is on and it has a dark state.

In a parallel-polarizer configuration, the LCOS SLM 1140 is nominally black. When a pixel is off (e.g., 0 voltage), it has a dark state, and when the pixel is on (e.g., voltage above a threshold turn on voltage), it has a bright state. In this parallel-polarizer configuration, leakage is minimized when a pixel is off and it has a dark state. The dark state may be (re)optimized using rub direction and compensator angle. Compensator angle may refer to an angle of a compensator which may be between the optics 1130 and the SLM 1140, for example, as illustrated in FIG. 20B.

Dynamic range and throughput for parallel-polarizer configurations may be different than that of cross-polarizer configurations. Further, parallel-polarizer configurations may be optimized for contrast differently than cross-polarizer configurations.

The system 1100A includes the waveguide 1120 for outputting image information to the eye 210. The waveguide 1120 may be substantially similar to waveguides 270, 280, 290, 300, 310, 670, 680, and 690 discussed above. The waveguide 1120 may include substantially transparent material having a refractive index sufficient to guide light therein. As illustrated, the waveguide 1120 may include a first side 1121 and a second side 1123 opposite the first side 1121 and corresponding upper and lower major surfaces as well as edges there around. The first and second major 1121, 1123 surface may be sufficiently flat such that image information may be retained upon propagating light from the SLM 1140 to the eye 210 such than an image formed by the SLM 1140 may be injected into the eye. The optics 1130 and the SLM 1140 may be positioned on the first side 1121 of the waveguide 1120. The light source 1110 may be disposed on the second side 1123 such that light from the light source 1110 is incident on the second side 1123 prior to passing through the waveguide 1120 and through the optics 1130 to the SLM 1140. Accordingly, the waveguide 1120 may be disposed between the light source 1110 and the optics 1130. Additionally, at least a portion of the waveguide 1120 may extend between the light source 1110 and the optics 1130, whereby light passes through the portion of the waveguide 1120 to the optics 1130. Light emitted from the light source 1110 can therefore be directed through the waveguide 1120, into and through the optics 1130 and incident on the SLM 1140. The SLM 1140 reflects the light back through the optics 1130 and to the waveguide 1120.

The system 1100A also includes an in-coupling optical element 1160 for coupling light from the optics 1130 into the waveguide 1120. The in-coupling optical element 1160 may be disposed on a major surface (e.g., an upper major surface 1123) of the waveguide 1120. In some designs, the in-coupling optical element 1160 may be disposed on the lower major surface 1121 of the waveguide 1120. In some designs, the in-coupling optical element 1160 may be disposed in the body of the waveguide 1120. While illustrated on one side or corner of the waveguide 1120, the in-coupling optical element 1160 may be disposed in/on other areas of the waveguide 1120. The in-coupling optical element 1160 may be substantially similar to the in-coupling optical elements 700, 710, 720 described above with reference to FIGS. 9A, 9B, and 9C. The in-coupling optical element 1160 may be a diffractive optical element or a reflector. Other structures may be used as the in-coupling optical element 1160. The in-coupling optical element 1160 may be configured to direct the light incident thereon into the waveguide 1120 at a sufficiently large grazing angle (e.g., greater than the critical angle) with respect to the upper and lower major surfaces 1123, 1121 of the waveguide 1120 to be guided therein by total internal reflection. Further, the in-coupling optical element 1160 may operate on a wide range of wavelengths and thus be configured to couple light of multiple colors into the waveguide 1120. For instance, the in-coupling optical element 1160 may be configured to couple red light, green light, and blue light into the waveguide 1120. The light source 1110 may emit red, green, and blue color light at different times.

The system 1100A includes a light distributing element 1170 disposed on or in the waveguide 1120. The light distributing element 1170 may be substantially similar to the light distributing elements 730, 740, and 750 described above with respect to FIG. 9B. For instance, the light distributing element 1170 may be an orthogonal pupil expander (OPE). The light distributing element 1170 may be configured to spread the light within the waveguide 1120 by turning the light propagating in the x direction, for example, toward the z direction illustrated in the top view FIG. 11B. The light distributing element 1170 may, thus, be configured to increase dimensions of the eyebox along the z-axis; see FIG. 11B. The light distributing element 1170 may, for example, include one or more diffractive optical elements configured to diffract the light propagating within the waveguide 1120 incident the diffractive optical elements so as to redirect that light, for example, in a generally orthogonal direction. Other configurations are possible.

Figure 11B:
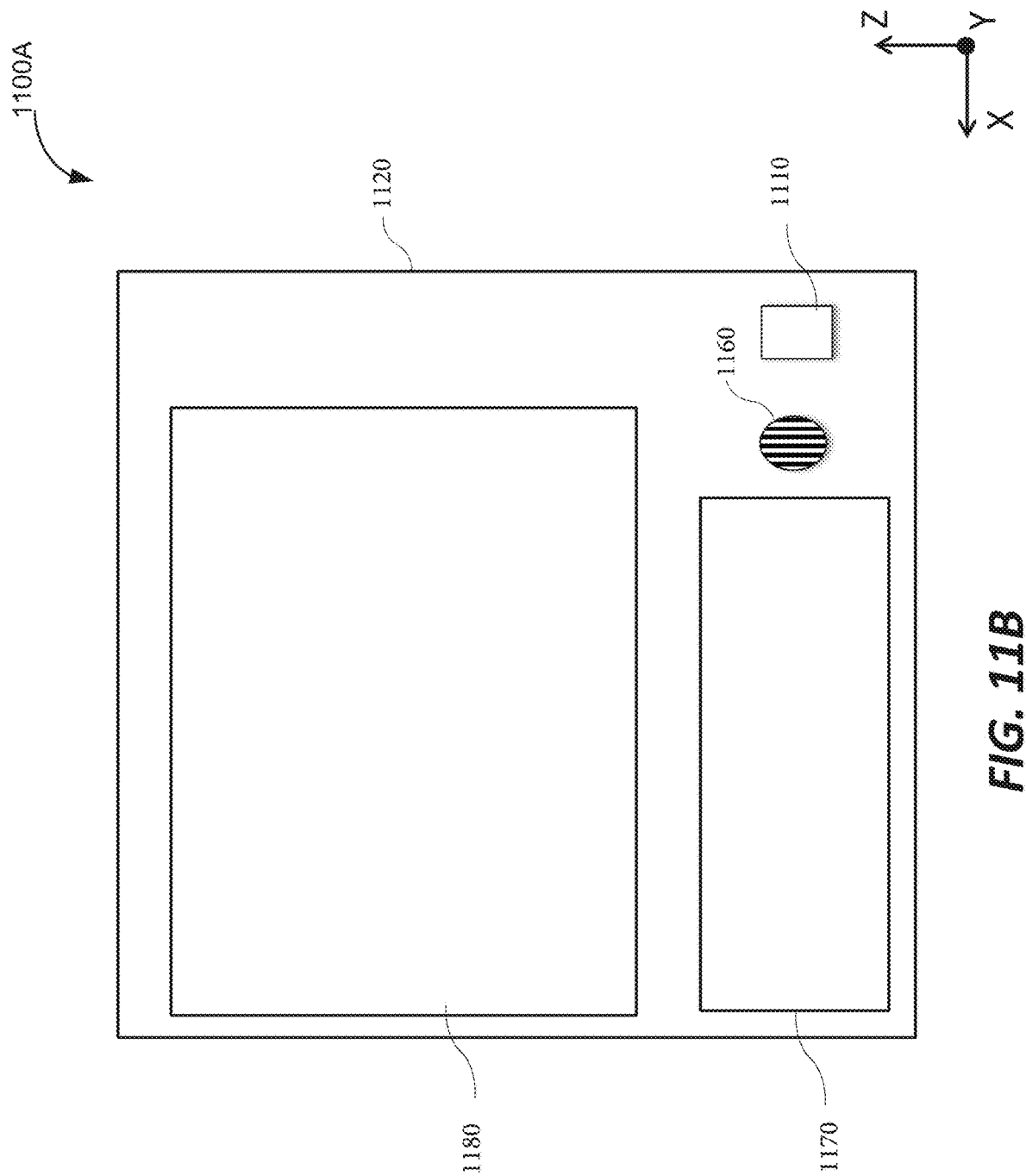
FIG. 11B is a top view of the augmented reality display system illustrated in FIG. 11A showing the waveguide with the in-coupling optical element and the out-coupling optical elements as well as the light source disposed thereon. The top view also shows an orthogonal pupil expander.

As shown in FIG. 11B, the system 1100A may also include an out-coupling optical element 1180 for coupling light out of the waveguide 1120 to the eye 210. The out-coupling optical element 1180 may be configured to redirect light propagating within the waveguide 1120 by total internal reflection (TIR) at an angle more normal to the upper and/or lower major surfaces 1123, 1121 of the waveguide 1120 such that the light is not guided within the waveguide 1120. Instead, this light is direct out of the waveguide 1120 through, for example, the lower major surface 1121. The out-coupling optical element 1180 may, for example, include one or more diffractive optical elements configured to diffract the light propagating within the waveguide 1120 incident the diffractive optical element so as to redirect that light, for example, out of the waveguide 1120. Other configurations are possible.

FIG. 11B also shows the location of the in-coupling optical element 1160 laterally disposed with respect to the light distributing optical element (e.g., orthogonal pupil expander) 1170 and the out-coupling optical element 1180. FIG. 11B also shows the location of the light source 1110 laterally disposed with respect to the in-coupling optical element 1160, the light distributing optical element (e.g., orthogonal pupil expander) 1170, and the out-coupling optical element 1180.

In operation, the light source 1110 of the system 1100A emits light into the coupling optic 1105 and through the polarizer 1115. This light may therefore be polarized, for example, linearly polarized in a first direction. This polarized light may be transmitted through the waveguide 1120, entering the second major surface of the waveguide 1120 and exiting the first major surface of the waveguide 1120. This light may propagate through the optics 1130 to the SLM 1140. The optics 1130 quasi-collimates and/or selects the light from the light source 1110 to thereby illuminate the SLM 1140, which may include a polarization based modulator that modulates the polarization of light incident thereon such as by selectively rotating the orientation of the modulator on a pixel by pixel basis depending on the state of the pixel. For example, a first pixel may be in a first state and rotate polarization while a second pixel may be in a second state and not rotate polarization. The light between the coupling optic 1105 and the optics 1130 may fairly uniformly illuminate the SLM 1140. After being incident on the SLM 1140, the light is reflected back through the optics 1130. The optics 1130 may be configured to project images from the SLM 1140 into the waveguide 1120 and ultimately into the eye 210 so that the image is visible to the eye 210. In some designs, the retina of the eye 210 is the optical conjugate to the SLM 1140 and/or images formed by and/or on the SLM 1140. The power of the optics 1130 may facilitate the projection of the image on the SLM 1140 into the eye 210 and onto the retina of the eye 210. In some implementations, optical power, for example, provided by the out-coupling optical element 1180 may assist in and/or affect the image ultimately formed in the eye 210. The optics 1130 acts as a projection lens as light reflected from the SLM 1140 travels through the optics toward the waveguide 1120. The optics may function roughly as a Fourier transform of the image on the SLM 1140 to a plane in the waveguide 1120 near the in-coupling optical elements 1160. Together, both passes through the optics 1130 (a first from the light source 1110 to the SLM 1140, and a second from the SLM 1140 to the waveguide 1120) may act to roughly image pupils of the coupling optic 1105. The alignment and orientation of the light source 1110 (possibly also coupling optic 1105 and/or the polarizer 1115), the optics 1130, the SLM 1140 are such that light from the light source 1110 that is reflected from the SLM 1140 is directed onto the in-coupling optical element 1160. The pupil associated with the coupling optic 1105 may be aligned with the in-coupling optical element 1160. The light may pass through the analyzer 1150 (e.g., a polarizer) in an optical path between the SLM 1140 and the eye 210. As depicted in FIG. 11A, an analyzer (e.g., polarizer) 1150 may be disposed in an optical path between the optics 1130 and the in-coupling optical element 1160. The analyzer 1150 may, for example, be a linear polarizer having an orientation to transmit light of the first polarization (p-polarization) and block light of the second polarization (s-polarization) or vice versa. The analyzer 1150 may be a clean-up polarizer and further block light of a polarization that is blocked by another polarizer between the SLM 1140 and the analyzer 1150 or within the SLM 1140. The analyzer 1150 may, for example, be a circular polarizer that acts as an isolator to mitigate reflections from the waveguide 1120, specifically the in-coupling optical element 1160, back toward the SLM 1140. The analyzer 1150 may, as any of the polarizers disclosed herein, include wire grid polarizers such as an absorptive wire grid polarizer. Such polarizers may offer appreciable absorption of unwanted light and therefore increased contrast. Some such polarizers can be made to include one or more dielectric layers on top of the wires and/or multilayer films. In some implementations the SLM 1140 may be a liquid crystal on silicon (LCOS) SLM and may include LC cells and a retarder (e.g., compensator). In some implementations, the analyzer 1150 may be a compensator intended to provide a more consistent polarization rotation (e.g., of 90°) of the SLM 1140 for different angles of incidence and different wavelengths. A compensator may be used to improve contrast of the display by improving the rotation polarization for rays that are incident across a spread of angles and wavelengths. The SLM 1140 may include, for example, a TN LCOS that is configured to rotate incident light of a first polarization (e.g., s-polarization) to a second polarization (e.g., p-polarization) for a first pixel to produce a bright pixel state as the light will pass through the analyzer 1150. Conversely, the SLM 1140 may be configured to not rotate incident light of the first polarization (e.g., s-polarization) to the second polarization (e.g., p-polarization) for a second pixel such that the reflected light remains the first polarization to produce a dark pixel state as the light will be attenuated or blocked by the analyzer 1150. In such a configuration, the polarizer 1115 closer along the optical path to the light source 1110 may be oriented different (e.g., orthogonal) to the analyzer 1150 farther along the optical path from the light source 1110. Other, for example, opposite, configurations are possible.

The light is then deflected, for example, turned by the in-coupling optical element 1160, so as to be guided in the waveguide 1120 where it propagates by TIR. The light then impinges on the light distributing element 1170 turning the light in another direction (e.g., more towards the z direction) causing an increase in dimensions of an eyebox along the direction of the z-axis as shown in FIG. 11B. The light is thus deflected toward the out-coupling optical element 1180 which causes the light to be directed out of the waveguide 1120 toward the eye 210 (e.g., the users eye as shown). Light being coupled out by different portions of the out-coupling optical element 1180 along the z direction causes an increase in dimensions of the eyebox along at least the direction parallel to the z-axis as defined in FIG. 11B. Notably, in this configuration, the optics 1130 are used both for illuminating the SLM 1140 and projecting an image onto the in-coupling optical element 1160. Accordingly, the optics 1130 may act as projection optics distributing light from the light source 1110 (e.g., uniformly) as well as imaging optics providing an image of the SLM 1140 and/or of an image formed by the SLM 1140 into the eye. The system 1100A in FIGS. 11A/B may in some instances be more compact than the system 1000 in FIG. 10. In some cases, not employing the PBS 1020 shown in FIG. 10 can possibly reduce cost and/or size of the system. Additionally, without the PBS 1020, the system can be more symmetric and is easier to design by shortening the back focal length of the optics 1130.

Figure 11C:
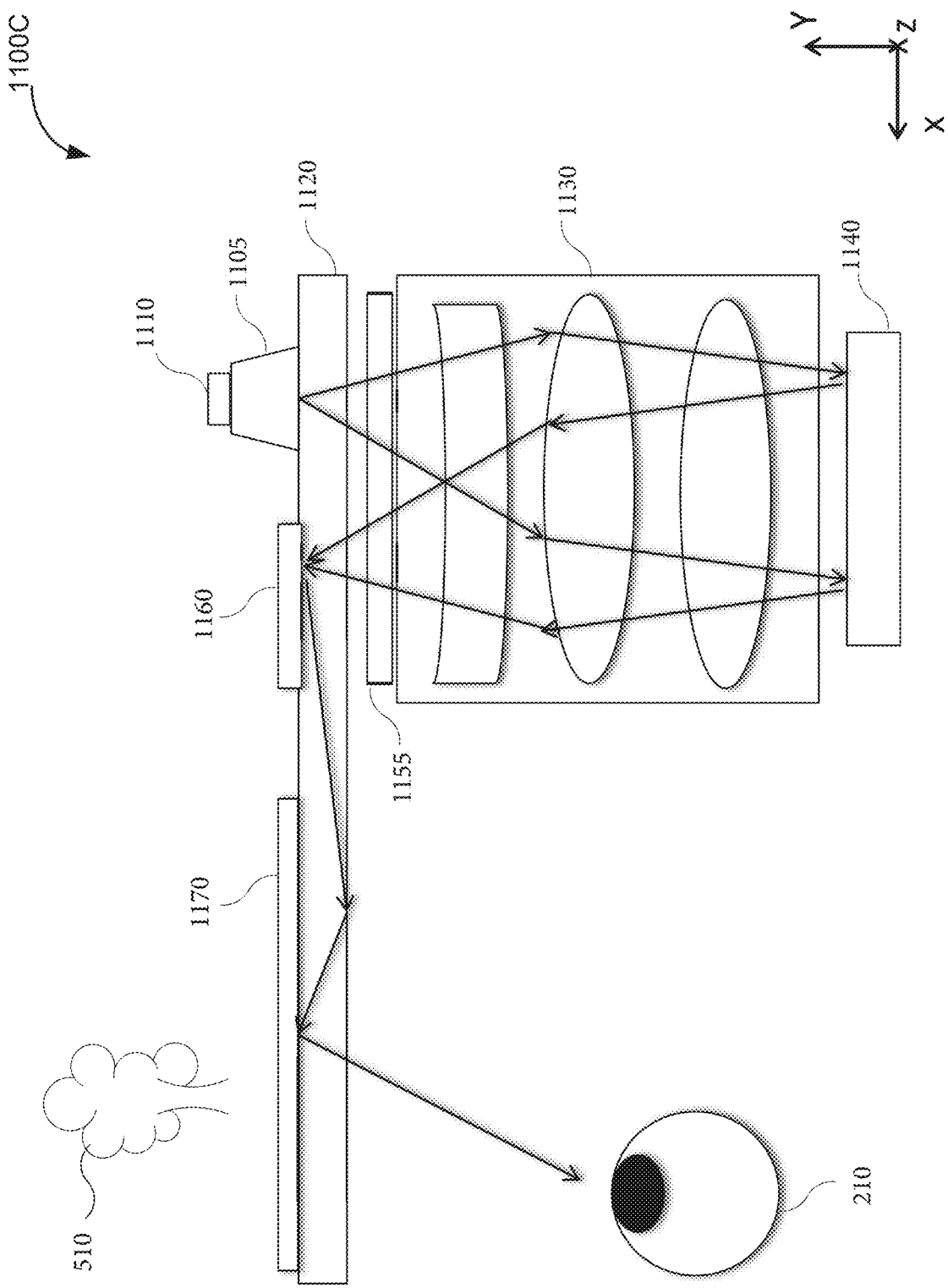
FIG. 11C is a side view of the augmented reality display system of FIG. 11A with a shared polarizer/analyzer and polarization based spatial light modulator (e.g., a liquid crystal on silicon SLM).

As referred to above, alternative configurations are possible. With reference to FIG. 11C, for example, in some designs, a system 1100C may be configured to pass light having a polarization not rotated by the SLM 1140. In one implementation, for example, the SLM 1140 be a liquid crystal (LC) based SLM and may include vertically aligned (VA) LC on silicon (LCoS). The SLM 1140 may have a first pixel that is in a first state that does not rotate the polarization and a second pixel that is in a second state that rotates the polarization. In the configuration illustrated in FIG. 11C, a singled shared analyzer/polarizer 1155 is utilized. This analyzer 1155 may transmit light of a first polarization (e.g., s-polarization) and attenuate or reduce transmission of a second polarization (e.g., p-polarization). Accordingly, light (e.g., s-polarized light) incident on a first pixel in the first state that does not rotate the polarization orientation is reflected from the SLM 1140 and passes through the analyzer 1155 to the waveguide 1120. Conversely, light (e.g., s polarized light) incident on the second pixel in the second state that rotates the polarization orientation is reflected from the SLM 1140 and attenuated, reduced, or not passed through the analyzer 1155 to the waveguide 1120. This configuration, may thereby permit the polarizer 1115 and the analyzer 1150 shown in FIG. 11A to be incorporated into a shared optical element, the analyzer 1155 shown in FIG. 11C, thereby possibly simplifying the system 1100 of FIGS. 11A/B by reducing the number of optical components. The analyzer 1155 may be disposed between the waveguide 1120 and the optics 1130. In other implementations, a separate analyzer/polarizer and analyzer/polarizer may be used such as shown in system 1100 of FIGS. 11A/B. FIGS. 11A and 11B illustrate the polarizer 1115 between the light source 1110 and the waveguide 1120, and the analyzer 1140 between the optics 1130 and the waveguide 1120.

A wide variety of other configurations may be employed that utilize the optics 1130 for both illumination of the SLM 1140 and imaging of the image formed by the SLM 1140. For example, although FIGS. 11A-11C show a single waveguide 1120, one or more waveguides such as a stack of waveguide (possibly different waveguides for different color light) may be used. FIG. 12A, for example, illustrates a cross-sectional side view of an example system 1200A including a stack 1205 including waveguides 1120, 1122, 1124 that each includes an in-coupling optical element 1260, 1262, 1264. The waveguides 1120, 1122, 1124 may each be configured to output light of one or more different wavelengths, or one or more different ranges of wavelengths. The stack 1205 may be substantially similar to the stack 260 and 660 (FIGS. 6 and 9A) and the illustrated waveguides 1120, 1122, 1124 of the stack 1205 may correspond to part of the waveguides 670, 680, 690, however, the stack 1205 and waveguides 1120, 1122, 1124 need not be so limited. As illustrated in FIG. 12A, the in-coupling optical elements 1260, 1262, 1264 may be, for example, associated with, included in or on the waveguides 1120, 1122, 1124, respectively. The in-coupling optical elements 1260, 1262, 1264 may be color selective and may primarily divert or redirect certain wavelengths into the corresponding waveguides 1120, 1122, 1124 to be guided therein. As illustrated, because the in-coupling optical elements 1260, 1262, 1264 are color selective, the in-coupling optical elements 1260, 1262, 1264 need not be laterally displaced and may be stacked over each other. Wavelength multiplexing may be employed to couple the particular color into the corresponding waveguide. For example, the red in-coupling optical element may in-couple red light into the waveguide designated for propagating red light while not in-coupling blue or green light, which is coupled instead into the other waveguides by the other blue and green color selective waveguides, respectively.

In some implementations, the light source 1110 may be a multi-color light source capable of emitting different colored light at different times. For instance, the light source 1110 may emit red, green, and blue (RGB) light and may be configured to, at a first time period emit red and not more than negligible amounts of green and blue, at a second time period emit green and not more than negligible amounts of red and blue, and at a third time period emit blue and not more than negligible amounts of red and green. These cycles can be repeated and the SLM 1140 can be coordinated so as to produce the suitable pattern of pixel states for the particular color (red, green, or blue) to provide the proper image color component for a given image frame. The different waveguides 1120, 1122, 1124 of the stack 1205 may each be configured to output light with different respective colors. For example, as depicted in FIG. 12A, the waveguides 1120, 1122, 1124 may be configured to output blue, green, and red color light respectively. Of course, other colors are possible, for example, the light source 1110 may emit other colors and the color selective in-coupling optical element 1260, 1262, 1264, out-coupling optical element etc., can be configured for such other colors. Additionally, individual red, green, and blue emitters may be located close enough in proximity to effectively function as a single pupil light source. The red, green, and blue emitters may be combined with lenses and dichroic splitters to form a single red, green, and blue pupil source. The multiplexing of a single pupil may be extended beyond, or in addition to, color selectivity and may include the use of polarization sensitive gratings and polarization switching. These color or polarization gratings can also be used in combination with multiple display pupils to increase the number of layers that can be addressed.

The different in-coupling optical elements 1260, 1262, 1264 in the different waveguides 1120, 1122, 1124 may be disposed over and/or under and aligned laterally with respect to each other (e.g., in the x and z directions shown in FIG. 12A) as opposed to being laterally displaced with each other and not aligned. Accordingly, in some implementations, for example, the different in-coupling optical elements 1260, 1262, 1264 can be so configured such that light of a first color can be coupled by the in-coupling optical element 1260 into waveguide 1120 to be guided therein and light of a second color different from the first color can pass through the in-coupling optical element 1260 to the next in-coupling optical element 1262 and can be coupled by the in-coupling optical element 1262 into the waveguide 1122 to be guided therein. Light of a third color different from the first color and the second color can pass through in-coupling optical elements 1260 and 1262 to the in-coupling optical element 1264 and can be coupled into the waveguide 1124 to be guided therein. Additionally, the in-coupling optical elements 1260, 1262, 1264 may be polarization selective. For example, the different in-coupling optical elements 1260, 1262, 1264 can be so configured such that light of a certain polarization either is coupled into the waveguide by a corresponding polarization selective in-coupling optical element 1260, 1262, 1264 or passes through the in-coupling optical element 1260, 1262, 1264.

Depending on the configuration, the SLM 1140 may include a polarization based SLM that modulates the polarization. The system 1200A can include polarizers and/or analyzers so as to modulate the light injected into the stack 1205 on a pixel by pixel basis, for example, depending on the state of the respective pixel (e.g., whether the pixel rotates the polarization orientation or not). Various aspects of such systems that employ polarization based SLMs are discussed above and any one of such features may be employed in combination with any other features described herein. Other designs, however, are still possible.

For example, a deflection-based SLM 1140 may be employed. For example, the SLM 1140 may include one or more moveable optical elements such as moveable mirror that can reflect and/or deflect light along different directions depending on the state of the optical element. The SLM 1140 may, for example, include one or more pixels including such optical elements such as micro-mirrors or reflectors. The SLM 1140 may incorporate, for example, Digital Light Processing (DLP™) technology which uses digital micro-mirror devices (DMD). An example of a system 1200B that uses such a deflection-based SLM 1140 is shown in FIG. 12B. The system 1200B includes a deflection based SLM 1140 as well as a light dump 1250. The light dump 1250 may include an absorbing material or structure that is configured to absorb light. The deflection-based SLM 1140 may include one or more micro moveable mirrors that can be selectively tilted to deflect light in different directions. For example, the deflection based SLM 1140 may be configured to deflect light from the light source 1110 incident thereon to the in-coupling optical elements 1260, 1262, 1264 when a given pixel is in a bright state. As discussed above, this light will thus be coupled by one of the in-coupling optical elements 1260, 1262, 1264, for example, depending on the color of light, into one of the respective waveguides 1120, 1122, 1124 and directed to the eye 210. Conversely, when a given pixel is in a dark state, light from the light source 1110 may be deflected to the light dump 1250 and the light is not coupled by one of the in-coupling optical elements 1260, 1262, 1264 into one of the respective waveguides 1120, 1122, 1124 and directed to the eye 210. The light may instead be absorbed by absorbing material comprising the light dump 1250. In some implementations, the analyzer 1150 may be a polarizer (e.g., "clean-up" polarizer) used to eliminate undesired reflections from the in-coupling optical elements 1260, 1262, 1264. This polarizer may be useful as the optics 1130 may include plastic optical elements, which have birefringence and may alter polarization. A "clean-up" polarizer may attenuate or remove light (e.g., reflections) having unwanted polarization from being directed onto the waveguides 1120, 1122, 1124. Other types of light conditioning elements may be disposed between the SLM 1140 and the waveguides 1120, 1122, 1124 such as between the optics 1130 and the waveguides 1120, 1122, 1124. For example, such a light conditioning element may also include a circular polarizer (i.e., linear polarization and retarder such as a quarter waveplate). The circular polarizer may reduce the amount of reflection from the waveguides 1120, 1122, 1124 or in-coupling optical elements 1260, 1262, 1264 that are again incident on the waveguides 1120, 1122, 1124 and coupled therein. Reflected light may be circular polarized and may possess a circular polarization opposite to that of the incident light (e.g., right-handed circularly polarizer light is converted to left-handed circular polarized light, or vice versa, upon reflection). The retarder in the circular polarizer may convert the circular polarized light to linearly polarized light, such as of the orthogonal polarization of the polarizer, which is attenuated, e.g., absorbed, by the linear polarizer in the circular polarizer. The clean-up polarizer may be used with a polarization independent modulator such as a DMD. As mentioned above, the clean-up polarizer may be useful for suppressing reflections and/or improving coupling of light into the in-coupling optical elements 1260, 1262, 1264 with optimal polarization states.

FIG. 12B illustrates a side or cross-sectional view of such the system 1200B, while FIG. 12C shows a top view of the lateral arrangement of the in-coupling optical element 1264, the light dump 1250, and the light source 1110. The SLM 1140 would be configured, depending on the state of the particular pixel, to reflect, deflect, and/or direct the light from the light source 1110 to either the lateral location of the in-coupling optical element 1264 (as well as the other in-coupling optical elements 1260, 1262) or the light dump 1250.

In certain designs, the light dump 1250 may include an energy harvesting system. The light dump 1250 may, for example, include an optical energy conversion element that is configured to convert optical energy into electrical energy. The optical energy conversion element may include, for example, a solar cell. The optical energy conversion element may include, for example, a photovoltaic detector that produces electrical output when light is incident thereon. The optical energy conversion element may be electrically connected to electrical components, for example, conductive electrical lines to direct the electrical output so as to provide the power to the system 1200B and/or possibly charge one or more batteries.

Figure 13A:
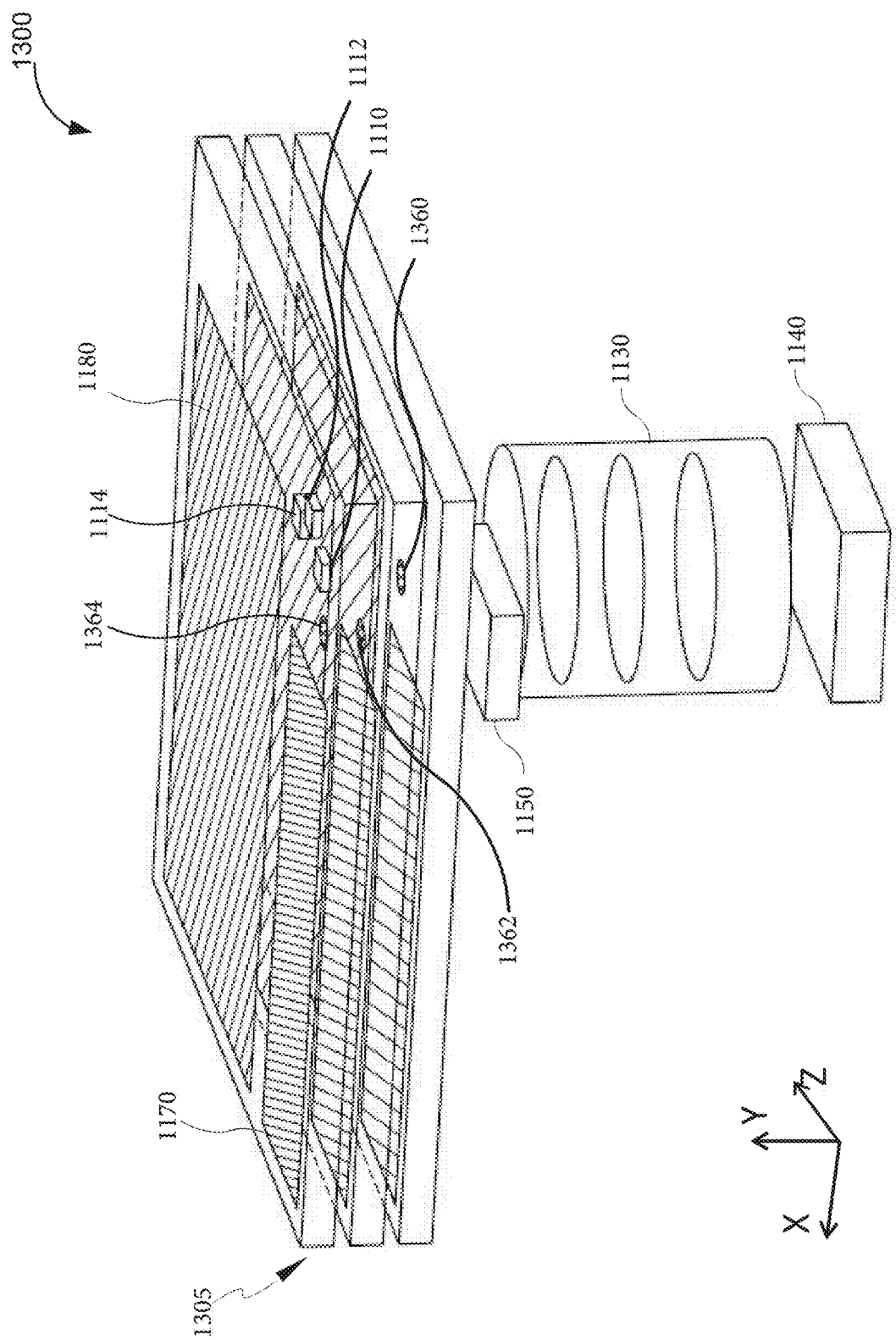
FIG. 13A is a perspective view of an augmented reality display system including a stack of waveguides, different waveguides including different in-coupling optical elements, wherein the in-coupling optical elements are displaced laterally with respect to each other. One or more light sources, also laterally displaced with respect to each other are disposed to direct light to respective in-coupling optical elements by passing light through optics, reflecting light off a spatial light modulator and passing the reflected light again through the optics.
Figure 13B:
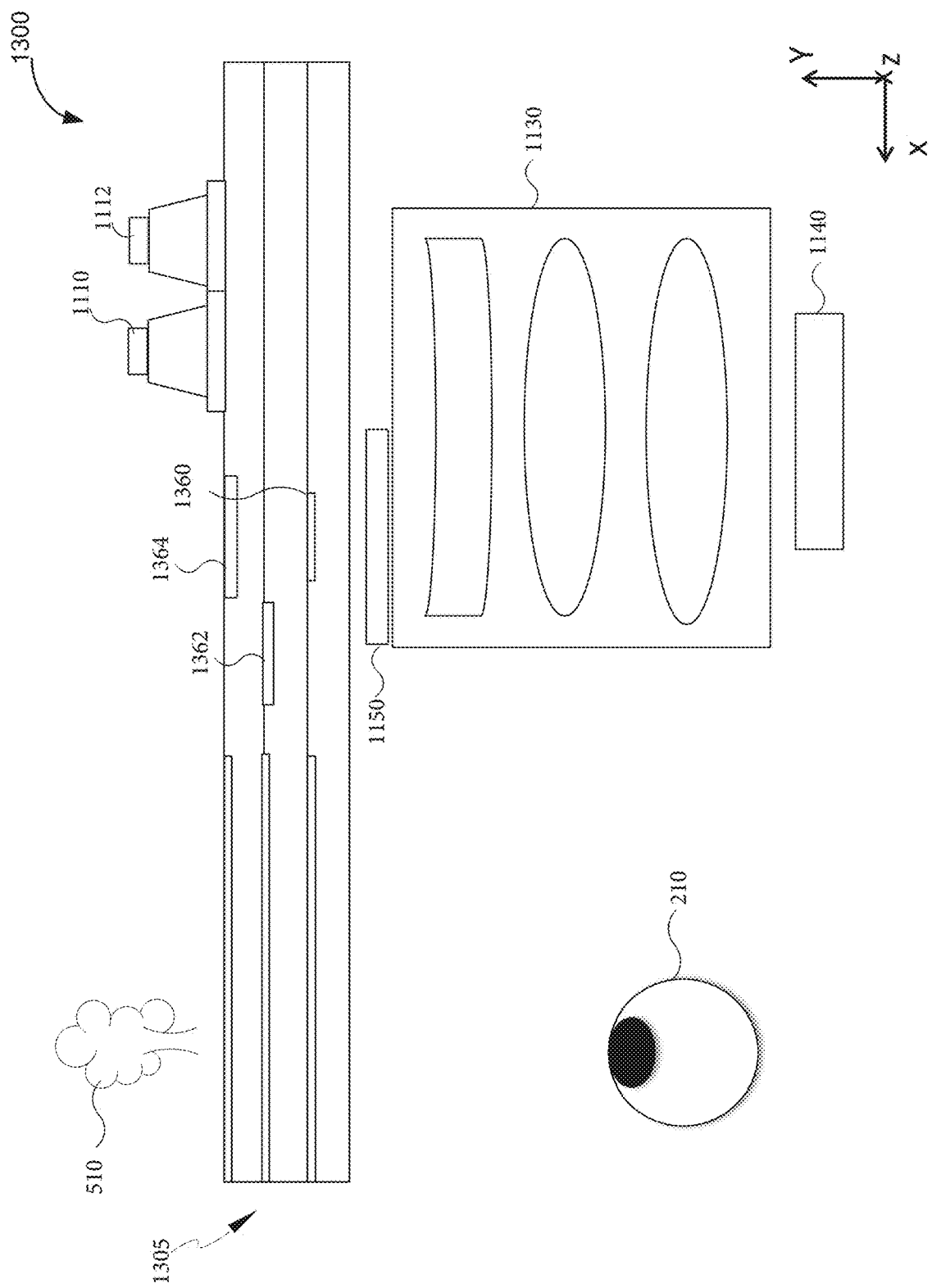
FIG. 13B is a side view of the example illustrated in FIG. 13A showing the lateral displaced in-coupling optical elements and light sources as well as the optics and the spatial light modulator.
Figure 13C:
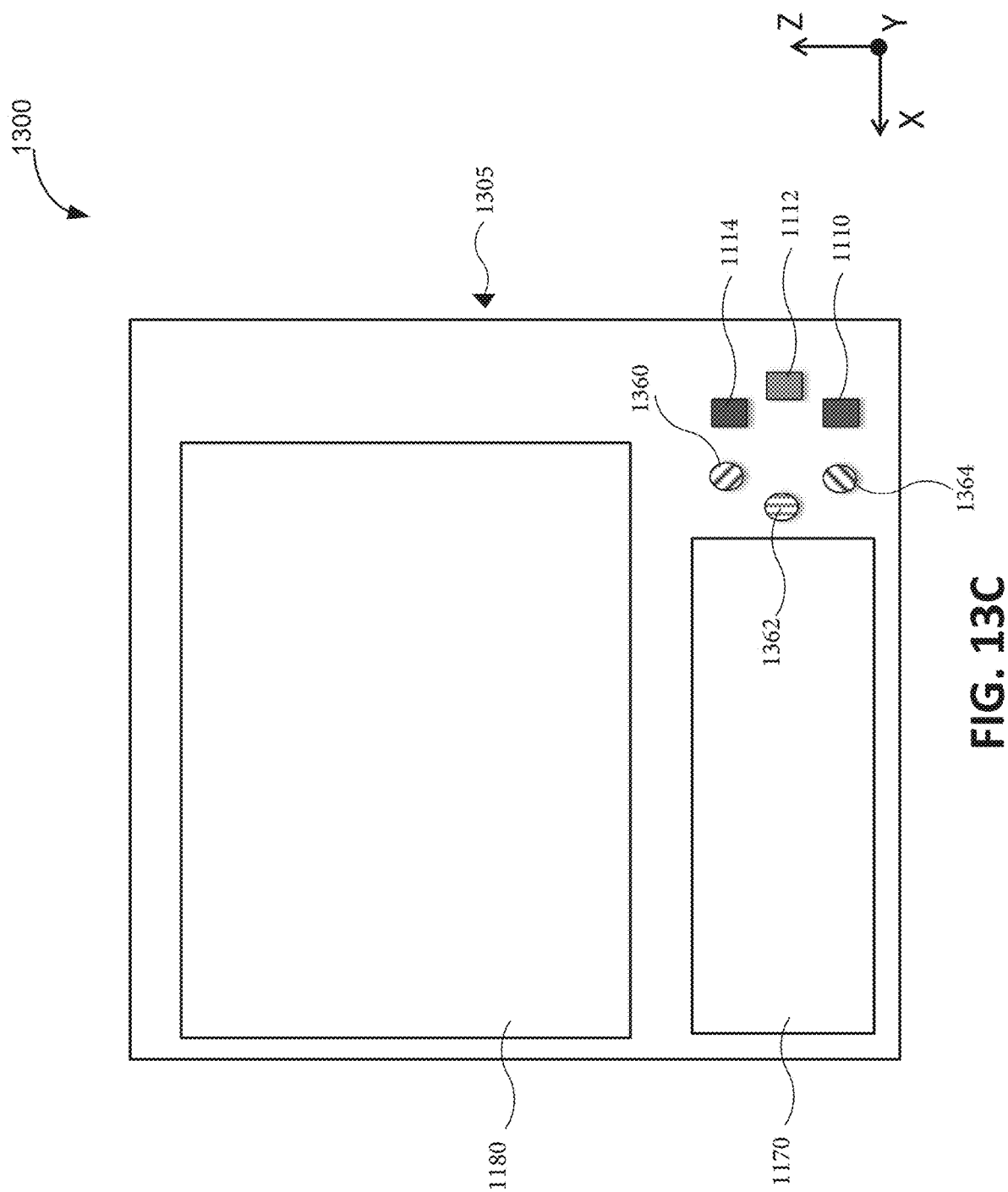
FIG. 13C is a top view of the augmented reality display system illustrated in FIGS. 13A and 13B showing one or more laterally displaced in-coupling optical elements and the associated one or more laterally displaced light sources.

Laterally displaced, non-color selective or broadband or multi-colored in-coupling optical elements may be used in certain designs. FIG. 13A, for example, is a perspective view of a system 1300 including a stack 1305 including waveguides. The stack 1305 may be substantially similar to the stack 1205 with reference to FIG. 12A. Each waveguide in the stack 1305 may include in-coupling optical elements 1360, 1362, 1364, however, in contrast to the design shown in FIG. 12A, the in-coupling optical elements 1360, 1362, 1364 are displaced laterally with respect to each other. As illustrated in FIGS. 13A, 13B, and 13C, light sources 1110, 1112, 1114, are also laterally displaced with respect to each other and may be disposed to direct light to respective in-coupling optical elements 1360, 1362, 1364 by passing light through optics 1130, reflecting light off the SLM 1140 and passing the reflected light again through the optics 1130. The system 1300 of FIG. 13B is depicted such that light source 1114 is located behind light source 1110 and therefore is not illustrated in FIG. 13B. The light sources 1110, 1112, 1114 may correspond to in-coupling optical elements 1360, 1362, 1634 respectively. In one design, for example, the light sources 1110, 1112, 1114 and corresponding in-coupling optical element 1360, 1362, 1364 are disposed roughly equidistant from (symmetrically about) a center of the optics 1130 along a common (optical) axis. The common (optical) axis may intersect the center of the optics 1130. In one design, for example, the light sources 1110, 1112, 1114 and corresponding in-coupling optical element 1360, 1362, 1364 are not disposed equidistant from (symmetrically about) the center of the optics 1130 along the common (optical) axis.

The in-coupling optical elements 1360, 1362, 1364 may be configured to couple light of multiple colors into their respective waveguides. Accordingly, these in-coupling optical elements 1360, 1362, 1364 may be referred to herein as broadband, multi-color, or non-color selective in-coupling optical elements 1360, 1362, 1364. For example, in some cases each one of these in-coupling optical elements 1360, 1362, 1364 is configured to in-couple red, green, and blue color light into the associated waveguide in which the in-coupling optical element 1360, 1362, 1364 is included and such that such colored light is guided within the waveguide by TIR. Such a broadband in-coupling optical element 1360, 1362, 1364 may, for example, operate across a wide range of wavelengths in, for example, the visible range or select wavelengths or wavelength regions spread across, for example, the visible range. Accordingly, such broadband or multi-color or non-color selective in-coupling optical elements 1360, 1362, 1364 may be configured to turn a variety of different colors (e.g., red, green, and blue) of light into a waveguide to be guided therein by TIR. Although red, green, blue colors (RGB) are referred to herein such as in connection with the light source, in-coupling optical elements, waveguides, etc., other colors or colors system could additionally or alternatively be used, such as for example but not limited to magenta, cyan, yellow (CMY).

As illustrated in FIG. 13A the light sources 1110, 1112, 1114 are shown above the uppermost waveguide and displaced with respect to each other (e.g., in the x and z direction). Similarly, three in-coupling optical elements 1360, 1362, 1364 are shown on three respective waveguides and are displaced with respect to each other (e.g., in the x, y, and z directions). FIG. 13B is a side view of the system 1300 illustrated in FIG. 13A showing the in-coupling optical elements 1360, 1362, 1364 laterally spatially displaced with respect to each other (e.g., in the x and z direction) as well as some of the light sources 1110, 1112, 1114 laterally displaced with respect to each other (e.g., in the x and z direction). FIG. 13B also shows the optics 1130 and the SLM 1140.

FIG. 13C is a top view of the augmented reality display system illustrated in FIGS. 13A and 13B showing the in-coupling optical elements 1360, 1362, 1364 and the associated light sources 1110, 1112, 1114. In this design, the in-coupling optical elements 1360, 1362, 1364 and the associated light sources 1110, 1112, 1114 are disposed in a ring-like pattern about a center point of a common (optical) axis. As illustrated, the light sources 1110, 1112, 1114 and corresponding in-coupling optical elements 1360, 1362, 1364 are disposed roughly equidistant about the center point of the common (optical) axis, however, this need to be the case. In some designs, this center point may correspond to the center of the optics 1130 along a common (optical) axis that intersects the center of the optics 1130 and/or a location along an optical axis of the optics 1130). Also as a result, the non-color selective in-coupling optical elements 1360, 1362, 1364 as well as the light sources 1110, 1112, 1114 are laterally displaced with respect to each other (e.g., in the x and z directions).

Figure 14A:
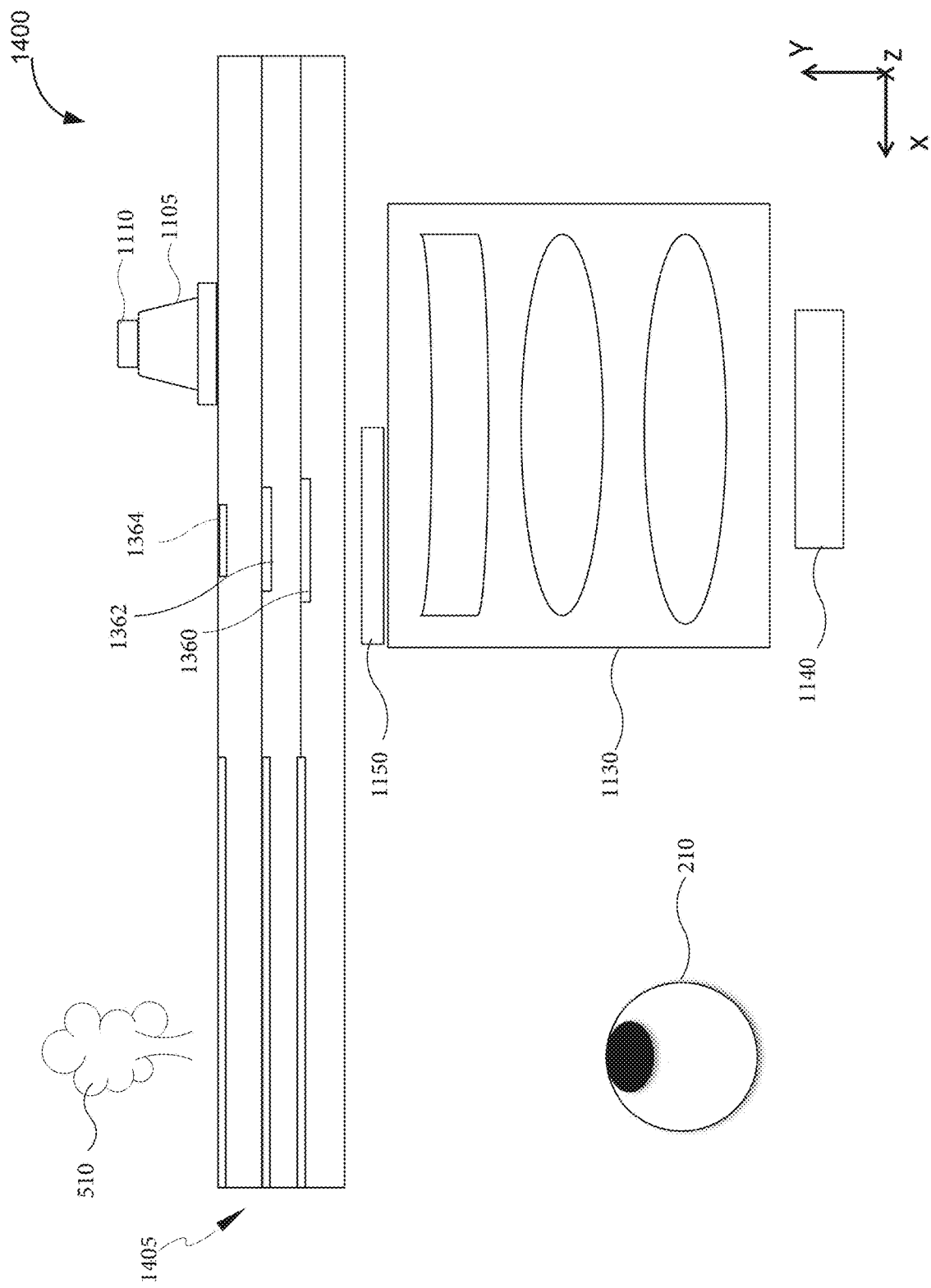
FIG. 14A is a side view of an augmented reality display system including a waveguide stack, different waveguides including different in-coupling optical elements, where the in-coupling optical elements are laterally displaced with respect to each other (the lateral displacement occurring in the z direction in this example).
Figure 14C:
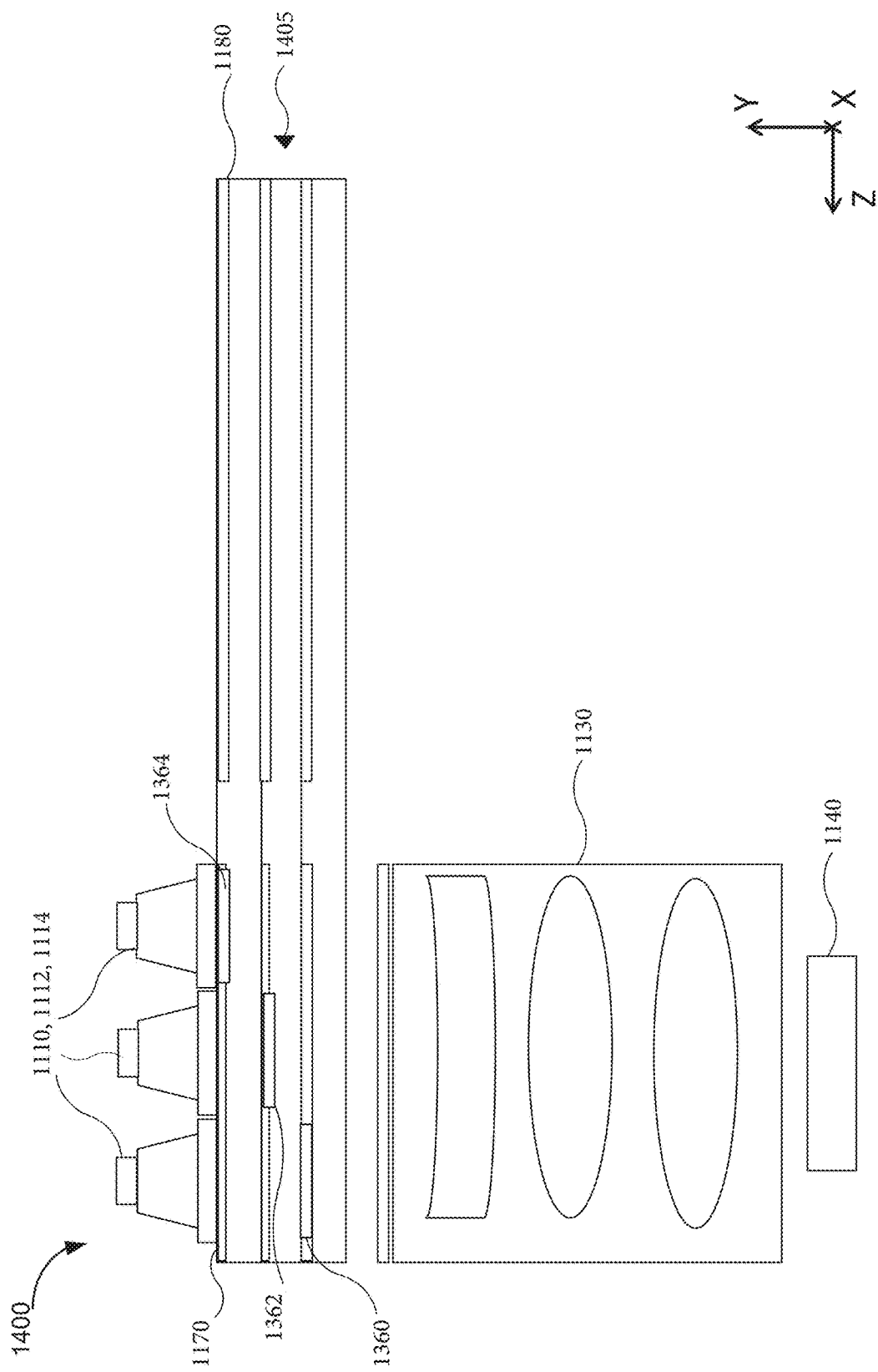
FIG. 14C is an orthogonal-side view of the display system illustrated in FIGS. 14A and 14B.

Other arrangements of lateral placements are possible. FIGS. 14A-14C illustrates an alternative configuration of a system 1400 including a stack 1405 including waveguides where the in-coupling optical elements 1360, 1362, 1364 as well as the light sources 1110, 1112, 1114 are laterally displaced with respect to each other. FIG. 14A is a side view while FIG. 14B is a top view of the system 1400 illustrated in FIG. 14A showing the laterally displaced in-coupling optical elements 1360, 1362, 1364 and light sources 1110, 1112, 1114. FIG. 14C is an orthogonal-side view of the system 1400 illustrated in FIGS. 14A and 14B.

The side views of FIGS. 14A and 14C show how the in-coupling optical elements 1360, 1362, 1364 are disposed on separate waveguides within the stack 1405 such that light can be coupled by the respective laterally displaced in-coupling optical element 1360, 1362, 1364 into the corresponding waveguide. The in-coupling optical elements 1360, 1362, 1364 are shown disposed in an upper major surface of the waveguides in FIGS. 14A and 14C. However, the in-coupling optical elements 1360, 1362, 1364 can alternatively be disposed on the lower major surface of the respective waveguides or in the bulk of the waveguides. A wide variety of configurations are possible.

As shown in the top view of FIG. 14B, the in-coupling optical elements 1360, 1362, 1364 are disposed in a column, laterally displaced along with respect to each other along the z direction but not along the x direction. Similarly, the light sources 1110, 1112, 1114 are disposed in a column, also laterally displaced with respect to each other along the z direction but not along the x direction. The in-coupling optical elements 1360, 1362, 1364 are laterally displaced with respect to the light sources 1110, 1112, 1114 in the x direction.

Figure 15:
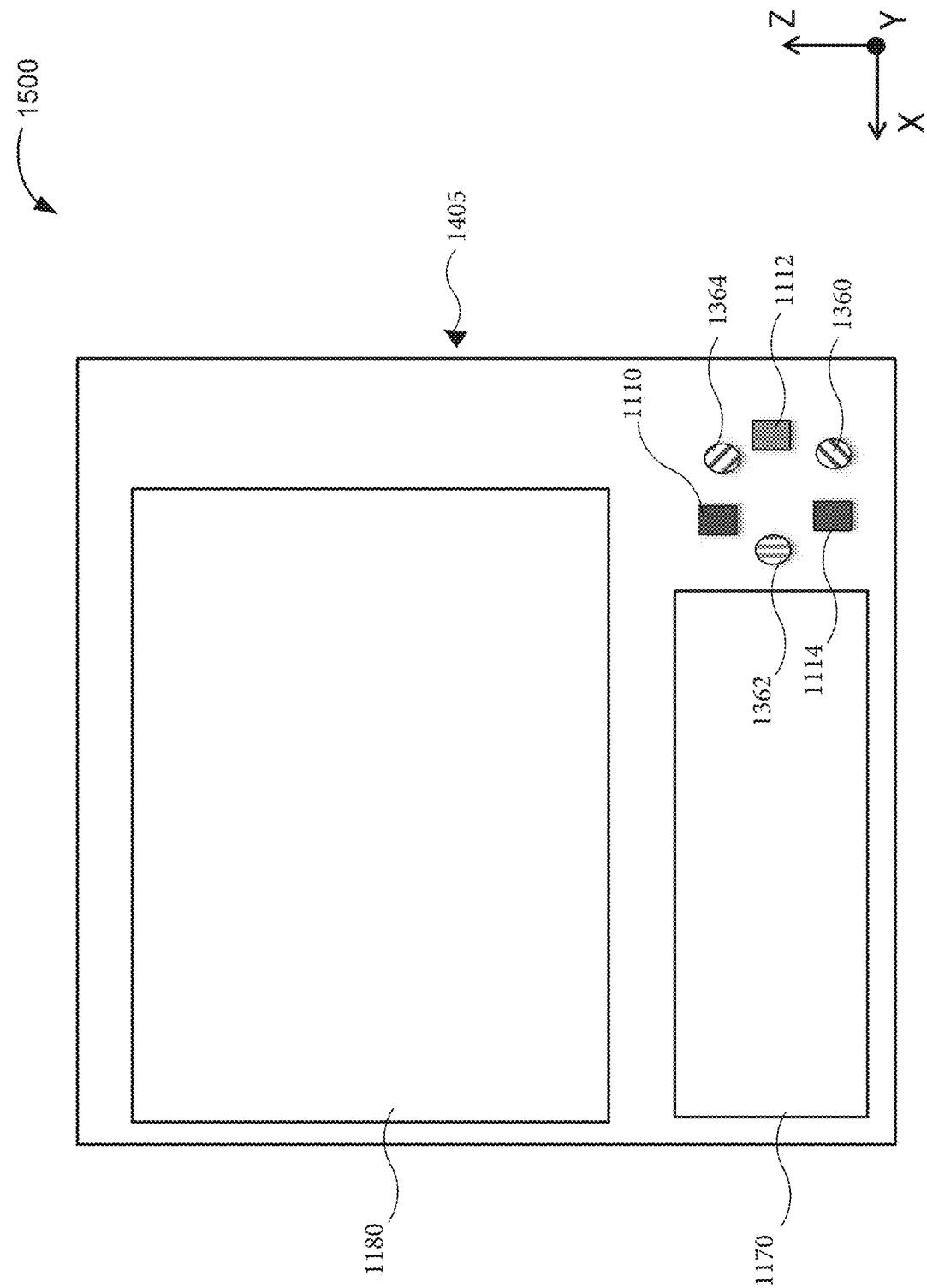
FIG. 15 is a top view of an augmented reality display system including a set of stacked waveguides, different waveguides including different in-coupling optical elements. The light sources and in-coupling optical elements are arranged in an alternative configuration than that shown in FIG. 14A-14C.

Still other configurations are possible. FIG. 15 is a top view of a system 1500 showing an alternative configuration of the light sources 1110, 1112, 1114 and the in-coupling optical elements 1360, 1362, 1364. In contrast to having all light sources 1110, 1112, 1114 generally on one side (for example of a ring like pattern) and all in-coupling optical elements 1360, 1362, 1364 generally on one side (i.e., an opposite side) as in FIG. 13C, the light sources 1110, 1112, 1114 and in-coupling optical elements 1360, 1362, 1364 are interspersed or alternate along the circumference of the ring like pattern.

In some implementations, however, the in-coupling optical elements 1360, 1362, 1364 and the associated one or more light sources 1110, 1112, 1114 are also disposed in a ring-like pattern about a center point. As a result, the light source 1110, 1112, 1114 and corresponding in-coupling optical element 1360, 1362, 1364 may be disposed roughly about equidistant from a center. In some designs, this center may correspond to the center of the optics 1130 along a common central axis that intersects the center of the optics 1130 and/or a location along an optical axis of the optics). Accordingly, the light from the first light source 1110 may be coupled via the optics 1130 into the in-coupling optical element 1360 across the center or central axis or optical axis of the optics 1130 (as seen from the top view of FIG. 15). Similarly, the light from the second light source 1112 may be coupled via the optics 1130 into the in-coupling optical element 1362 across the center or central axis or optical axis of the optics 1130. Likewise, the light from the third light source 1114 may be coupled via the optics 1130 into the in-coupling optical element 1364 across the center or central axis or optical axis of the optics 1130. Also as a result, the non-color selective in-coupling optical elements 1360, 1362, 1364 as well as the light sources 1110, 1112, 1114 are laterally displaced with respect to each other (e.g., in the x and z directions). The optics 1130 may be designed such that the focus is more into the stack 1405 so that locations of sub-pupils and the in-coupling optical elements 1360, 1362, 1364 are closer in the y-direction. In this configuration, the in-coupling optical elements 1360, 1362, 1364 may be smaller since they are closer to the focus of the optics 1130. The light source 1110 may be on a user side of the stack 1405 (e.g., similar to FIGS. 17 and 18) and thus decrease a distance or optical path between the light source 1110 and the optics 1130.

In various implementations above such as shown in FIGS. 12A-15, a stack (e.g., stack 1205, 1305, 1405) including multiple waveguides (e.g., stack 1205 including waveguides 1120, 1122, 1124, stack 1305 including waveguides (not labeled), and stack 1405 including waveguides (not labeled)) may be included to handle different colors, (e.g., red, green, and blue). Different waveguides may be for different colors. Similarly, multiple stacks can be included to provide different optical properties to the light out-coupled from the respective stack. For example, the waveguides 1120, 1122, 1124 of the stack 1205 of FIGS. 12A-12B may be configured to output light having an optical property (e.g., optical power to provide a particular wavefront shape) possibly associated with the apparent depth from which the light appears to be emanating. For example, wavefronts having different amounts of divergence, convergence, or collimation may appear as if projected from different distances from the eye 210. Accordingly, multiple stacks may be included with different stacks configured such that light out-coupled by out-coupling optical elements have different amounts convergence, divergence, or collimation and thus appear to originate from different depths. In some designs, the different stacks may include different lenses such as diffractive lenses or other diffractive optical elements to provide different amounts of optical power to the different stacks. Consequently, different stacks will produce different amounts of, convergence, divergence, or collimation and thus light from the different stacks will appear as if associated with different depth planes or objects at different distances from the eye 210.

Figure 16A:
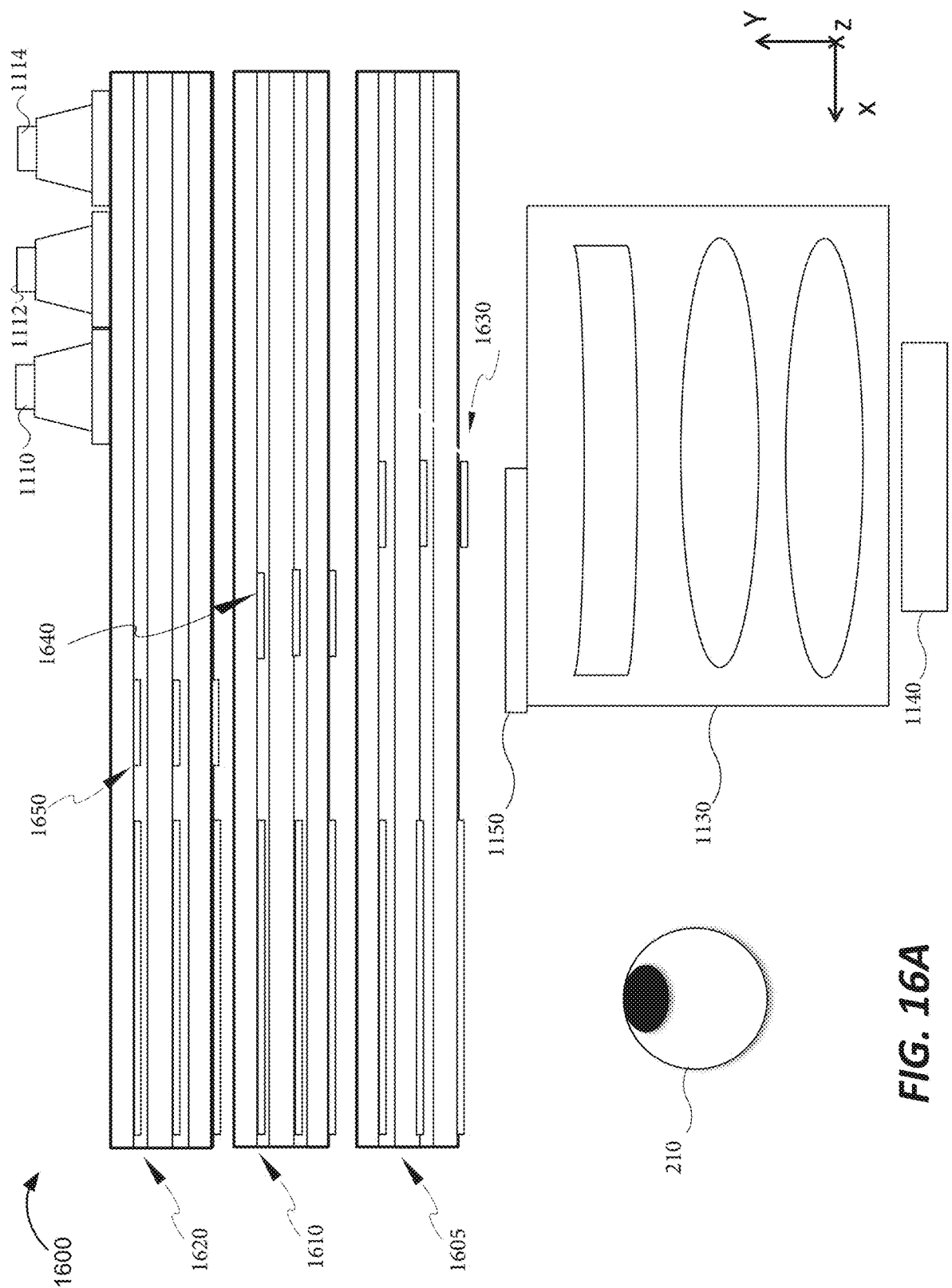
FIG. 16A is a side view of an augmented reality display system including groups of in-coupling optical elements that are laterally displaced with respect to each other, each group including one or more color-selective in-optical coupling optical elements.

FIG. 16A is a side view of a system 1600 including stacks 1605, 1610, 1620. As illustrated in FIG. 16A, the system 1600 includes three stacks 1605, 1610, 1620, however, this need not be the case. A system may be devised with fewer or more stacks. Each of the stacks 1605, 1610, and 1620 includes one or more (e.g., three) waveguides. FIG. 16A also shows groups 1630, 1640, 1650 of in-coupling optical elements. A first group 1630 is associated with a first stack 1605, a second group 1640 is associated with a second stack 1610, and a third group 1650 is associated with a third stack 1620. The groups 1630, 1640, 1650 are laterally displaced with respect to each other. The groups 1630, 1640, 1650 each include color-selective in-coupling optical elements configured to in-couple different respective colors substantially similar to in-coupling optical elements 1260, 1262, 1264 of FIG. 12A. As illustrated in FIG. 16A, the in-coupling optical elements within each of the groups 1630, 1640, 1650 are not laterally displaced with respect to each other, however, this need not be the case. A system may be devised in which in-coupling optical elements in a group are laterally displaced with respect to each other. The system 1600 may be configured such that light out-coupled from each of the stacks 1605, 1610, 1620 have different amounts of optical power. For example, waveguides in a stack may have out-coupling optical elements or diffractive lenses having a given optical power. The optical power for the different stacks 1605, 1610, 1615 may be different such that light from one stack may appear to be originating at a depth different from light from another stack. The optical power of one stack, for example, may cause the light from that stack to be collimated whereas the optical power of another stack may cause the light therefrom to be diverging. The diverging light may appear to originate from an object that is close distance from the eye 210 while the collimated light may appear to originate from an object that is at a far distance. Accordingly, light out-coupled from the first stack 1605, the second stack 1610, and the third stack 1620 may have different amounts of at least one of convergence, divergence, and collimation and thus appear to originate from different depths. In some implementations, the light out-coupled from one of the stacks may be collimated, while light out-coupled by a different stack may diverge. The light out-coupled from one of the other stacks might also diverge, but diverge a different amount.

As illustrated in FIG. 16A, the light source 1110 may be disposed with respect to the optics 1130 and the SLM 1140 to direct light into the group 1630 of in-coupling optical elements, the light source 1112 may be disposed with respect to the optics 1130 and the SLM 1140 to direct light into the group 1640 of in-coupling optical elements, and the light source 1114 may be disposed with respect to the optics 1130 and the SLM 1140 to direct light into the group 1650 of in-coupling optical elements. The light sources 1110, 1112, 1114 may be configured to emit different color light at different times. Likewise, light of different respective colors may be coupled into different waveguides within a stack as a result of the color selective in-coupling optical elements in a manner as described above. For example, if blue light is emitted from the second light source 1112, the optics 1130 and SLM 1140 will direct the blue light to the second group 1640 of in-coupling optical elements. The light may pass through a first red color in-coupling optical element and a second green color in-coupling optical element in the second group 1640 and be turned by a third blue color in-coupling optical element in the second group 1640 into a third waveguide in the second stack 1610. The waveguides in the second stack 1610 may include an out-coupling optical element or other optical element that has optical power (e.g., diffractive lens) so as to provide a beam to the eye 210 associated with a particular depth plane or object distance associated with the second stack 1610.

Figure 16B:
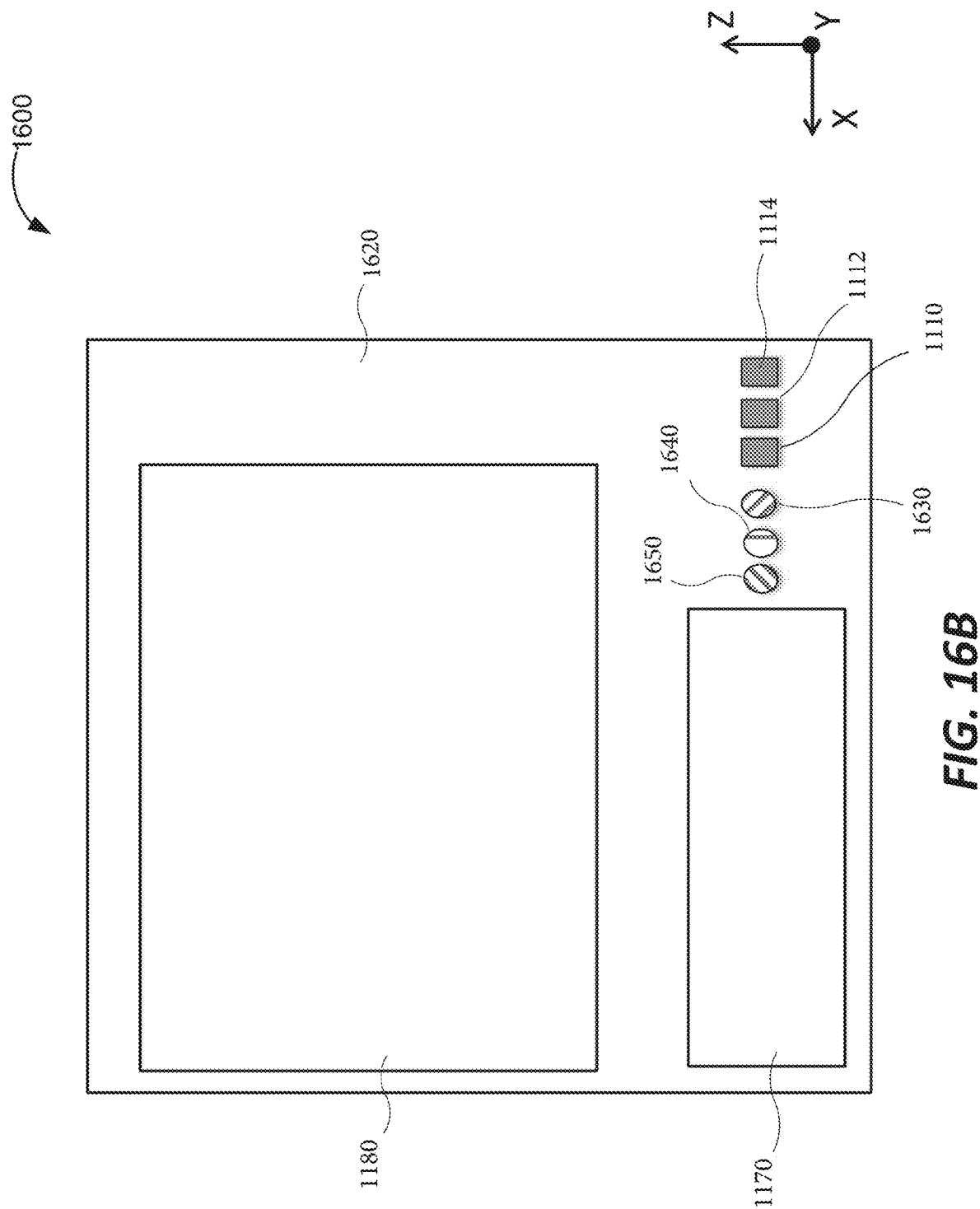
FIG. 16B is a top view of the display system in FIG. 16A.

FIG. 16B is a top view of the system 1600 in FIG. 16A. The different groups 1630, 1640, 1650 of in-coupling optical elements are shown laterally displaced with respect to each other (e.g., in the x direction). Similarly the light sources 1110, 1112, 1114 are shown laterally displaced with respect to each other (e.g., in the x direction).

Figure 17:
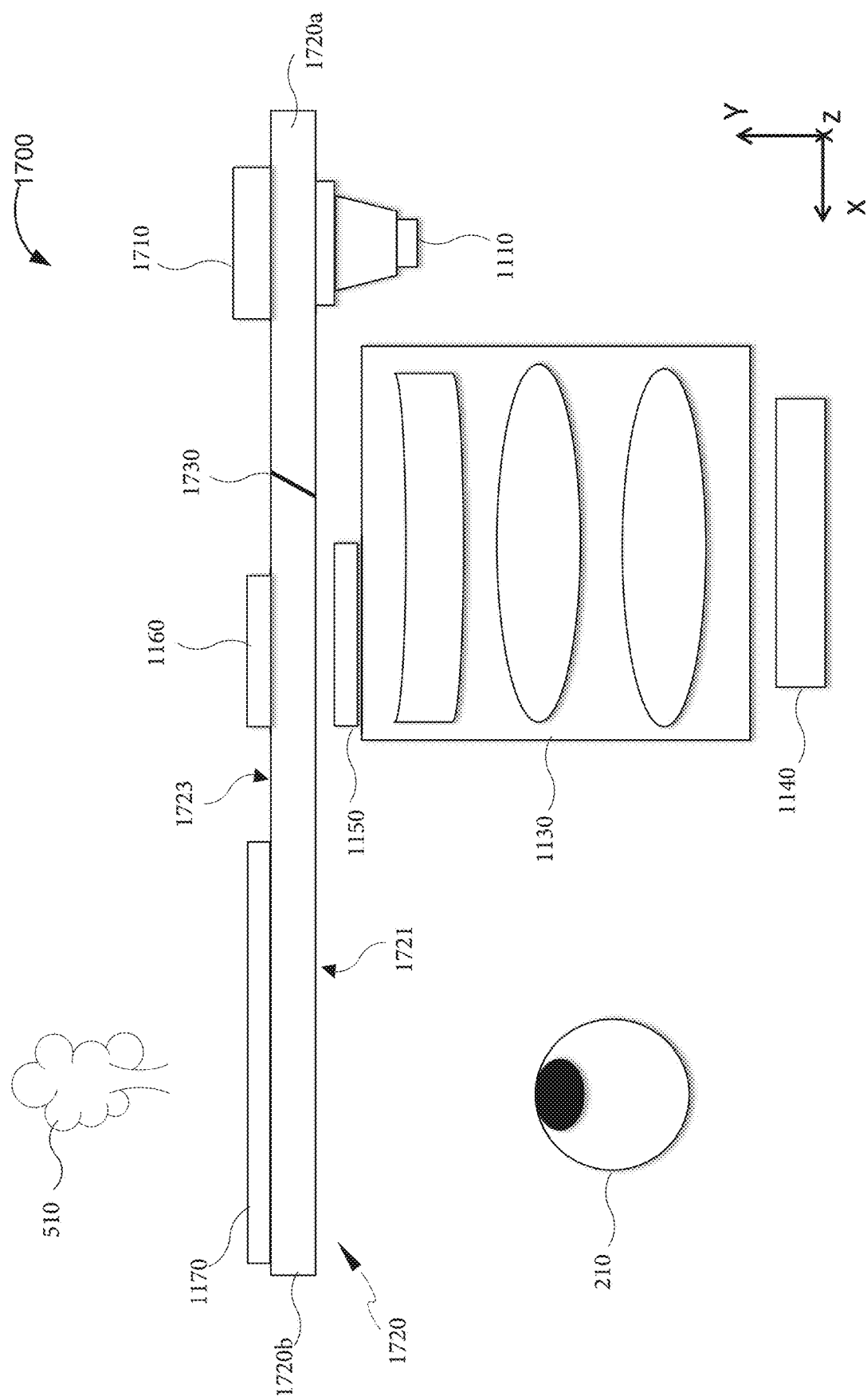
FIG. 17 is a side view of an augmented reality display system including a waveguide that is divided with a reflective surface that can couple light guided in a portion of the waveguide proximal to a light source out of that portion of the waveguide and into optics toward a spatial light modulator. In this example, the optics and a light source are shown disposed on a same side of the waveguide.

A wide variety of different variations in the aforementioned systems are possible. For example, the location of the light source 1110 with respect to the waveguide(s) and optics 1130 may be different. FIG. 17, for example, is a side view of a system 1700 that has a light source 1110 at a different location with respect to a waveguide 1720 and optics 1130 than shown in FIGS. 11-16B. Additionally, FIG. 17 shows a design with the waveguide 1720 divided into a first portion 1720*a* and a second portion 1720*b*. The waveguide 1720 may further include a reflector 1730 configured to couple light that is guided in the first portion 1720*a* proximal to the light source 1110 out of the first portion 1720*a* and into optics 1130 toward the SLM 1140. Additionally or in the alternative, the system 1700 may include a diffractive out-coupling optical element to out-couple light in the first portion 1720*a* of the waveguide 1720 and into optics 1130 toward the SLM 1140. This reflector 1730 may be opaque and include an isolator that reduces cross-talk between the first portion 1720*a* and the second portion 1720*b*. The waveguide 1720 has a first side 1721 and a second side 1723 opposite the first side 1721, the optics 1130 and the SLM 1140 are disposed on the first side 1721 such that light from the SLM 1140 is directed onto the first side 1721. In this example, the light source 1110 is disposed on the first side 1721 of the waveguide 1720 such that light from the light source 1110 is incident on the first side 1721 prior to passing through the optics 1130 to the SLM 1140. The system 1700 may further include in-coupling optical element 1710 disposed on or in the first portion 1720*a*. The in-coupling optical element 1710 may be configured to receive light from the light source 1110 and to couple the light into the first portion 1720*a*. The in-coupling optical element 1710 may include a diffractive optical element or reflector configured to turn light incident thereon into the first portion 1720*a* at an angle to be guided therein by TIR.

The reflector 1730 may be configured to direct light guided in the first portion 1720*a* out of the first portion 1720*a* and toward the optics 1130 and the SLM 1140. (As discussed above, in some implementations, a diffractive optical element may in addition or in the alternative be used to direct the light in the first portion 1720*a* out of the first portion 1720*a* and toward the optics 1130 and the SLM 1140.) Accordingly, the reflector 1730 may be a mirror, reflective grating, one or more coatings that reflect light of the waveguide 1720 toward the SLM 1140. The light ejected from the first portion 1720*a* by the reflector 1730 passes through the optics 1130, is incident on the SLM 1140, and passes through the optics 1130 once again and is incident onto the second portion 1720*b*. As described above, light reflected from the SLM 1140 transmitted through the optics 1130 may be incident on an in-coupling optical element 1160 and turn light to be guided in the second portion 1720*b*. Light guided in the second portion 1720*b* may be out-coupled therefrom by an out-coupling optical element 1180 (not shown) and directed to the eye 210.

As discussed above, the reflector 1730 may be an isolator that reduces cross-talk between the first portion 1720*a* and the second portion 1720*b*. The reflector 1730 may include an opaque and/or reflective surface. The reflector 1730 may be disposed within the waveguide 1720 and, in some cases, may define a side of the first portion 1720*a* and second portion 1720*b*.

Figure 18:
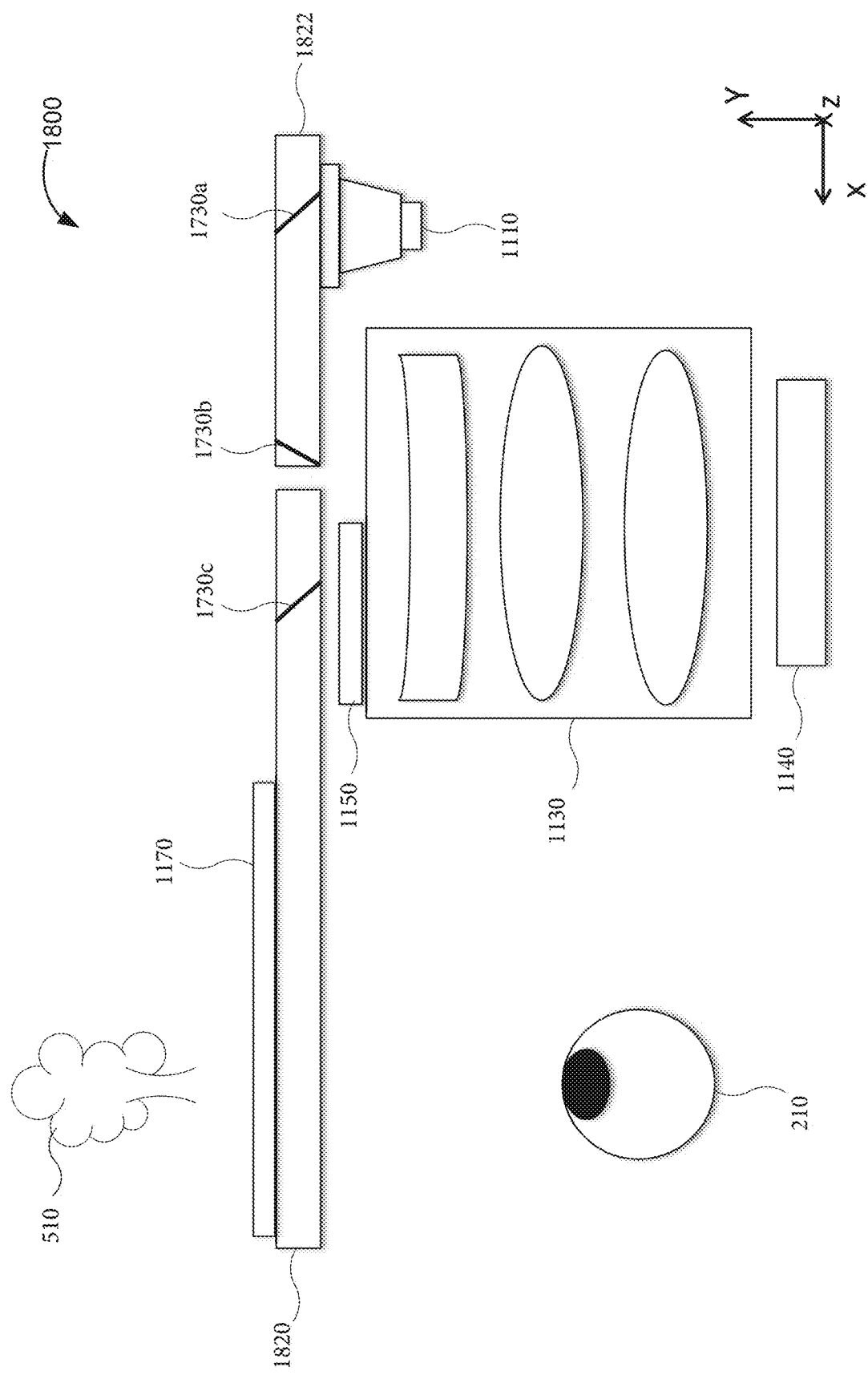
FIG. 18 is a side view of an augmented reality display system that includes a waveguide for receiving light from a light source and directing the light guided in the waveguide into optics and toward a spatial light modulator. The display system additionally includes a waveguide that receives light from the spatial light modulator that passes again through the optics. The waveguide includes a reflective surface to out-couple light. The waveguide also includes a reflective surface to in-couple light therein. In this example, the optics and the light source are shown disposed on the same side of the waveguide.

Instead of having the first and second portions 1720*a*, 1720*b* of the waveguide 1720, separate waveguides may be used. FIG. 18 is a side view of a system 1800 that includes a first waveguide 1822 for receiving light from a light source 1110 and directing light guided therein to the optics 1130 and toward the SLM 1140. The system 1800 additionally includes a second waveguide 1820 that receives light from the SLM 1140 after the light has again passed through the optics 1130. The first waveguide 1822 includes in-coupling and out-coupling optical elements 1730*a*, 1730*b*, respectively. These in-coupling and out-coupling optical elements 1730*a*, 1730*b* may include reflective surfaces oriented to in-couple and out-couple light in and out of the waveguide 1822. The in-coupling optical element 1730*a* may, for example, include a reflective surface disposed to receive light from the light source 1110 and oriented (e.g., tilted) to direct the light into the waveguide 1822 at an angle so as to be guided therein by TIR. The out-coupling optical element 1730*b* may, for example, include a reflective surface oriented (e.g., tilted) to direct light guided within the waveguide 1822 at an angle so as to be ejected from the waveguide 1822. The out-coupling optical element 1730*b* may be located so light turned out of the waveguide 1822 is directed into the optics 1130, reflected from the SLM 1140, passes again through the optics 1130 and is incident on an in-coupling optical element 1730*c* of a second waveguide 1820.

The in-coupling optical element 1730*c* in the second waveguide 1820 may include a reflective surface that may be located and oriented (e.g., tilted) so as to receive and turn light incident thereon from the SLM 1140 to be guided in the second waveguide 1820 by TIR. FIG. 18 illustrates the optics 1130 and the light source 1110 disposed on a same side of the waveguides 1820, 1822. The system 1800 may further include an isolator to reduce cross-talk between the waveguide 1822 and the waveguide 1820. The isolator may include an opaque and/or reflective surface. The isolator may be disposed in or on at least one of the waveguides 1820, 1822.

Figure 19:
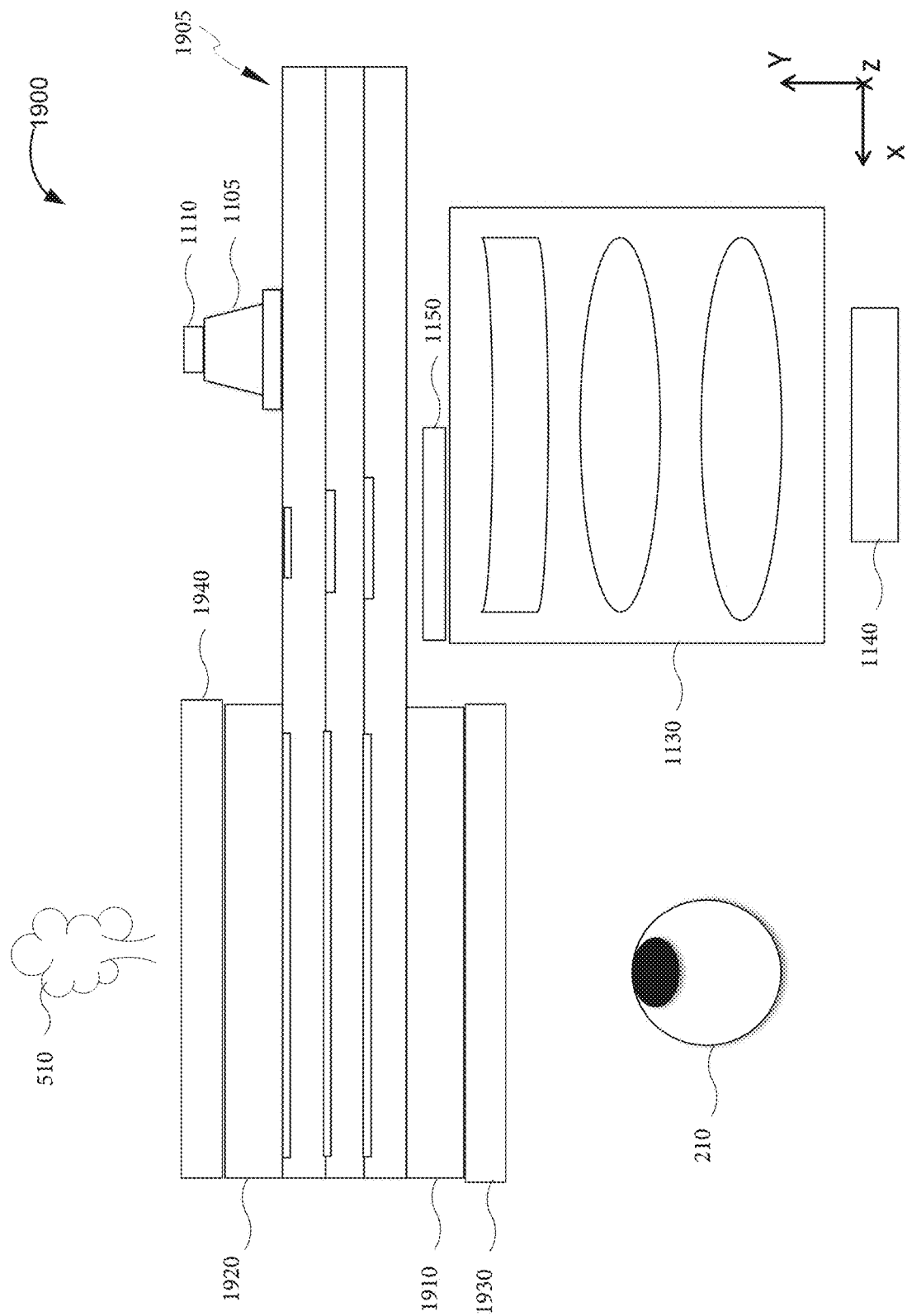
FIG. 19 is a side view of an augmented reality display system including adaptive optical elements or variable focus optical elements. A first variable optical element between the stack of waveguides and the eye can vary the divergence and collimation of light coupled out from the waveguides and directed to the eye to vary the depth at which the objects appear to be located. A second variable optical element on the opposite side of the stack of waveguides can compensate for the effect of the first optical element on light received from the environment in front of the augmented reality display system and the user. The augmented reality display system further includes a prescription lens to provide ophthalmic correction such refractive correction for a user who has myopia, hyperopia, astigmatism, etc.

A variety of the designs, such as the designs discussed above, can include additional features or components. FIG. 19, for example, shows a side view of a system 1900 that includes variable focus optical elements (or adaptive optical elements) 1910, 1920. The variable focus optical elements 1910, 1920 may include optical elements that are configured to be altered to provide variable optical power. The variable focus optical elements 1910, 1920 may include multiple states such as a first state and a second state, wherein in the first state the variable focus optical elements 1910, 1920 have different optical power than when in the second state. For instance, the variable focus optical elements 1910, 1920 may have negative optical power in the first state and zero optical power in the second state. In some implementations, the variable focus optical elements 1910, 1920 have positive optical power in the first state and zero optical power in the second state. In some implementations, the variable focus optical elements 1910, 1920 have a first negative or positive optical power in the first state and a second different negative or positive optical power in the second state. Some adaptive optical elements or variable focus optical elements 1910, 1920 may have more than two states and may possibly provide a continuous distribution of optical powers.

The variable focus optical elements 1910, 1920 may include a lens (e.g., a variable lens) and be transmissive. Transmissive or transparent adaptive optical elements or variable focus optical elements 1910, 1920 are shown in FIG. 7. The variable focus optical elements 1910, 1920 may include liquid lenses (e.g., movable membrane and/or electro-wetting). The variable focus lens may also include liquid crystal lenses such as switchable liquid crystal lenses such as switchable liquid crystal polarization lenses, which may for example comprise diffractive lenses. Alverez lens may also be used. Other types of variable focus optical elements 1910, 1920 may possibly be employed. Examples of variable focus optical elements can be found in U.S. Application No. 62/518,539, filed on Jun. 12, 2017, entitled AUGMENTED REALITY DISPLAY HAVING MULTI-ELEMENT ADAPTIVE LENS FOR CHANGING DEPTH PLANES, which is hereby incorporated by reference in its entirety. The variable focus optical elements 1910, 1920 may have electrical inputs that receive electrical signals that control the amount of optical power exhibited by the variable focus optical elements 1910, 1920. The variable focus optical elements 1910, 1920 may have positive and/or negative optical power. In addition to variable focus elements (e.g., polarization switches, geometric phase (GP) lenses, fluid lenses, and the like), the variable focus elements 1910, 1920 may include fixed lenses (e.g., diffractive lenses, refractive lenses, and the like) to generate depth planes desired in a light field.

A first variable focus optical element 1910 may be disposed between a stack 1905 and the eye 210. The stack 1905 may include different waveguides for different colors as discussed above. The first variable optical element 1910 may be configured to introduce different amounts of optical power, negative and/or positive optical power. The variable optical power may be used to vary the divergence and/or collimation of light coupled out from the stack 1905 to vary the depth at which virtual objects projected into the eye 210 by the system 1900 appear to be located. Accordingly, a 4 dimensional (4D) light field may be created.

A second variable focus optical element 1920 is on the opposite side of the stack 1905 as the first variable focus optical element 1920. The second variable focus optical element 1920 can thus compensate for the effect of the first optical element 1910 on light received from the world 510 in front of the system 1900 and the eye 210. Thus, a world view maybe effectively unaltered or altered as desired.

The system 1900 can further include a static or variable prescription or corrective lens 1930. Such a lens 1930 may provide for refractive correction of the eye 210. Additionally, if the prescription lens 1930 is a variable lens it may provide different refractive corrections for multiple users. Variable focus lenses are discussed above. The eye 210 may for example have myopia, hyperopia, and/or astigmatism. The lens 1930 may have a prescription (e.g., optical power) to reduce the refractive error of eye 210. The lens 1930 may be spherical and/or cylindrical and may be positive or negative. The lens 1930 may be disposed between the stack 1905 and the eye 210 such that light from both the world 510 and from the stack 1905 undergoes the correction provided by the lens 1930. In some implementations, the lens 1930 may be disposed between the eye 210 and the first variable focus optical element 1910. Other locations for the lens 1930 are possible. In some embodiments, prescriptive lenses may be variable and allow multiple user prescriptions to be implemented.

In some designs, the system 1900 may include an adjustable dimmer 1940. In some implementations, this adjustable dimmer 1940 may be disposed on a side of the stack of waveguides 1900 opposite to the eye 210 (e.g., world side). Accordingly, this adjustable dimmer 1940 may be disposed between the stack of waveguides 1900 and the world 510. The adjustable dimmer 1940 may include an optical element that provides variable attenuation of light transmitted there through. The adjustable dimmer 1940 may include electrical inputs to control the level of attenuation. In some cases the adjustable dimmer 1940 is configured to increase attenuation when the eye 210 is exposed to bright light, such as when the user goes outdoors. Accordingly, the system 1900 may include a light sensor to sense the brightness of the ambient light and control electronics to drive the adjustable dimmer 1940 to vary the attenuation based on the light levels sensed by the light sensor.

Different types of adjustable dimmers 1940 may be employed. Such adjustable dimmers 1940 may include variable liquid crystal switches with a polarizer, electrochromic material, photochromic material, and the like. The adjustable dimmer 1940 may be configured to regulate the amount of light entering and/or transmitted through the stack 1905 from the world 510. The adjustable dimmer 1940 can be used in some cases to reduce the amount of light from the ambient that passes through the waveguide stack 1900 to the eye 210 that may otherwise provide glare and decrease the user's ability to perceive virtual objects/images injected into the eye 210 from the stack 1905. Such an adjustable dimmer 1940 may reduce the incident bright ambient light from washing out the images that are projected into the eye 210. The contrast of the virtual object/image presented to the eye 210 may therefore be increased with the adjustable dimmer 1940. In contrast, if ambient light is low, the adjustable dimmer 1940 may be adjusted to reduce attenuation so that the eye 210 can more readily see objects in the world 510 in front of the user. The dimming or attenuation may be across the system or localized to one or more portion of the system. For example, multiple localized portions may be dimmed or set to attenuate light from the world 510 in front of the user 210. These localized portions may be separated from each other by portions without such increased dimming or attenuation. In some cases, only one portion is dimmed or caused to provide increased attenuation with respect to other portions of the eyepiece. Other components may be added in different designs. Also the arrangement of the components can be different. Similarly, one or more components may be excluded from the system.

Figure 20A:
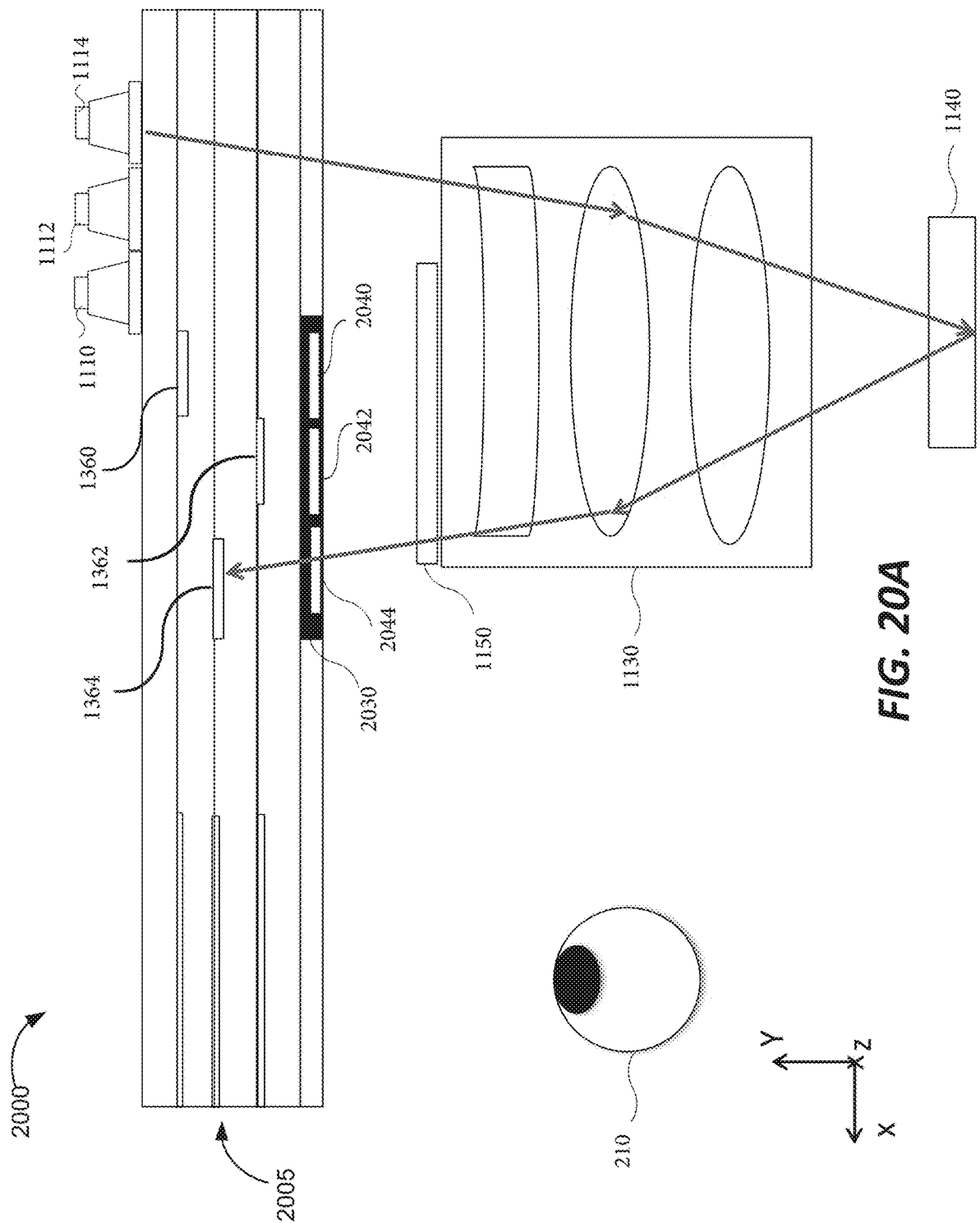
FIG. 20A is a side view of an augmented reality display system including color filter array. One or more laterally displaced in-coupling optical elements are located on different waveguides and laterally displaced color filters are aligned with respective in-coupling optical elements.

An example of another configuration is shown in FIG. 20A. FIG. 20A shows a side view of a system 2000 including laterally displaced in-coupling optical elements 1360, 1362, 1364 on different waveguides as well as a color filter array 2030 including laterally displaced color filters 2040, 2042, 2044 aligned with respective in-coupling optical elements 1360, 1362, 1364. The color filter array 2030 may be disposed on the side of a stack 2005 proximate the eye 210 and optics 1130. The color filter array 2030 may be between the stack 2005 and the optics 1130. The color filter array 2030 may be disposed in or on a coverglass 2050 that is located between the stack 2005 and the optics 1130. The color filter array 2030 may include one or more different color filters 2040, 2042, 2044 such as a red color filter, a green color filter, and a blue color filter, laterally dispose with respect to each other. The system 2000 includes lights sources 1110, 1112, 1114 laterally displaced with respect to each other. These light sources 1110, 1112, 1114 may include different color light sources such as red, green, and blue light sources. The color filters 2040, 2042, 2044 may be transmissive or transparent filters. In some implementations, the color filters 2040, 2042, 2044 include absorption filters, however, the color filters 2040, 2042, 2044 may also include reflective filters. The color filters 2040, 2042, 2044 in the color filter array 2030 may be separated and/or surrounded by a mask such as an opaque mask that would reduce propagation of stray light. The filters in the color filter array 2030 may be used to reduce or eliminate undesired reflections within the system such as from the waveguides and/or in-coupling optical elements 1360, 1362, 1364 from re-entering the waveguides used for different colors through in-coupling optical elements 1360, 1362, 1364 for different colors. Examples of color filter arrays can be found in U.S. application Ser. No. 15/683,412, filed on Aug. 22, 2017, entitled "PROJECTOR ARCHITECTURE INCORPORATING ARTIFACT MITIGATION, which is hereby incorporated by reference in its entirety; and U.S. application Ser. No. 62/592,607 filed on Nov. 30, 2017, entitled PROJECTOR ARCHITECTURE INCORPORATING ARTIFACT MITIGATION, which is hereby incorporated by reference in its entirety. The mask may be a black mask and may include absorbing material to reduce propagation and reflection of stray light. The light sources 1110, 1112, 1114 may be disposed with respect to the optics 1130 and SLM 1140 to couple light in to corresponding color filters 2040, 2042, 2044 in the color filter array 2030. For example, the color filter array 2030 may include first, second, and third, (e.g., red, green, and blue) color filters 2040, 2042, 2044 that are disposed to receive light from the first, second, and third, light sources 1110, 1112, 1114, respectively. The first, second, and third, (e.g., red, green, and blue) color filters 2040, 2042, 2044 may be aligned (e.g., in the x and z direction) with the respective in-coupling optical elements 1360, 1362, 1364. Accordingly, light from the first light source 1110 will be directed through the first color filter 2040 and to a first in-coupling optical element 1360, light from the second light source 1112 will be directed through the second color filter 2042 and to a second in-coupling optical element 1362, and light from the third light source 1114 will be directed through the third color filter 2044 and to a third in-coupling optical element 1364. In some implementations, the in-coupling optical elements 1360, 1362, 1364 may be color specific. For example, the first and second in-coupling optical elements 1360, 1362 may be configured to couple light of respective first and second colors into the first and second waveguides, respectively. Similarly, the first, second, and third in-coupling optical elements 1360, 1362, 1364 may be configured to couple light of respective first, second, and third colors into the first, second, and third waveguides, respectively. The first in-coupling optical element 1360 may be configured to couple more light of the first color than the second color (or the third color) into the first waveguide. The second in-coupling optical element 1362 may be configured to couple more light of the second color than the first color (or the third color) into the second waveguide. The third in-coupling optical element 1364 may be configured to couple more light of the third color than the first color or the second color into the second waveguide. In other configurations, the in-coupling optical elements 1360, 1362, 1364 may be broad band. For example, the first in-coupling optical element 1360 may be configured to couple light of first, second, and third colors into the first waveguide. The second in-coupling optical element 1362 may be configured to couple light of first, second, and third colors into the second waveguide. The third in-coupling optical element 1364 may be configured to couple light of first, second, and third colors into the third waveguide. The plurality of color filters 2040, 2042, 2044, may, however, be color specific, selectively transmitting light of a particular color. For example, the first color filter 2040 may transmit more of the first color than the second color (and third color). The second color filter 2042, may transmit more of the second color than the first color (and third color). The third color filter 2044, may transmit more of the third color than the first color and second color. Likewise, the first, second, and third color filters 2040, 2042, 2044 may be color filters that selectively transmit the first, second, and third color, respectively. Accordingly, the first, second, and third color filters 2040, 2042, 2044 may be band pass filters that selectively pass the first, second, and third colors, respectively. In some implementations, the first, second, and third light sources 1110, 1112, 1114, may selectively emit the first, second, and third colors, respectively. For example, the first light source 1110, may emit more of the first color than the second color (and third color). The second light source 2042, may emit more of the second color than the first color (and third color). The third light source 2044, may transmit more of the third color than the first color and second color. The color filters 2040, 2042, 2044, may reduce the amount of stray light that is inadvertently directed to a particular in-coupling optical element. In other implementations, the one or more of the light sources 1110, 1112, 1114 are broad band light sources. For example, the first light source 1110 may emit the first and second (and possibly third) colors. The second light source 1112 might also emit the first and second, (and possibly third) colors. The third light source 1114 might also emit the first and second (and possibly third) colors. Although three filters are shown in FIGS. 20A-20G, more or less filters may be included. For example, in some implementations, two filters (not three) may be used. Accordingly, two colors corresponding to the two color filters may be selectively transmitted into by the filters. In some such implementations, two corresponding in-coupling optical elements may be used and be aligned with the two filters. In some implementations, the two in-coupling optical elements selectively couple the two colors, respectively, into the two respective waveguides. In some implementations, two light sources may be used instead of three. Other variations and other numbers of components may be used. Also, the color filters 2040, 2042, 2044 may or may not be integrated together in a single array.

As discussed above, the components and their location and arrangement may vary. For example, although FIG. 20A shows an analyzer 1150 disposed between the optics 1130 and the stack 1905, the analyzer 1150 may be located at a different position. FIG. 20B shows an analyzer 1150 located between the optics 1130 and the SLM 1140. In some designs, the analyzer (e.g., polarizer) 1150 may attach directly to the SLM 1140. For instance, the analyzer 1150 may be adhered to or mechanically coupled to the SLM 1140. For example, the analyzer 1150 may be glued, cemented to the SLM 1140 (e.g., to the SLM window) using adhesive. Accordingly, although FIG. 20B shows a gap between the analyzer 1150 and the SLM 1140, in some designs no gap between the analyzer 1150 and SLM 1140 is present. The analyzer 1150 may be affixed to the SLM 1140 mechanically (e.g., using a mechanical fixture), and in such cases may or may not include a gap between the analyzer 1150 and SLM 1140. Birefringence from the optics 1130 may be cleaned up by positioning a polarizer directly on the SLM 1140 as described above. In some implementations, an analyzer 1150 disposed between the optics 1130 and the in-coupling optical elements 1360, 1362, 1364 may also be included to clean up the polarization of light outbound from the optics 1130 (e.g., as illustrated in dashed lines in FIG. 20B). In addition, a retarder (not shown) such as a quarter waveplate may be included proximal the SLM 1140, for example, between the optics 1130 and the SLM 1140. As used herein a quarter waveplate may refer to a quarter wave retarder regardless of if the quarter wave retarder comprises a plate, film, or other structure for providing a quarter wave of retardance. In FIG. 20B, for example, the retarder (e.g., quarter waveplate) may be disposed between the analyzer 1150 and the SLM 1140. The retarder (e.g., quarter waveplate) may be used for skew ray management. For example, the retarder (e.g., quarter waveplate) may, for example, compensate for variations caused by differences in wavelength and angle of incidents on the SLM 1140. As discussed above, a compensator may be included and may provide a more consistent polarization rotation (e.g., of 90°) of the SLM 1140 for different angles of incidence and different wavelengths. The compensator may be used to increase contrast of the display by providing more consistent orthogonal rotation. The compensator may be attached or affixed to the SLM 1140 such as described above. For example, glue, cement or other adhesive may be used. The compensator may also be attached to the SLM 1140 using a mechanical fixture. A gap or no gap may be included between the compensator or SLM 1140. Other light conditioning optics may also be included in addition or in the alternative and may be affixed to the SLM 1140 such as described above with respect to the analyzer 1150 and/or compensator.

In some embodiments, large angle spreads (e.g., ~70 degrees) may be used. The angle spread may refer to an angle of light entering into the optics 1130, for example, from the light sources 1110. 1112, 1114, and/or an angle of light exiting the optics 1130 into the in-coupling optical elements 1360, 1362, 1364. In these embodiments, a thinner SLM 1140 may be used. For example, if the SLM 1140 is a liquid crystal (LC) SLM (e.g., a liquid crystal on silicon (LCOS) SLM), the LC layer may be made thinner to accommodate the large angle spread.

A double pass retardance through a polarizer and the analyzer 1150 may need to be a half wave. The polarizer may be between the optics 1130 and the analyzer 1150. The double pass retardance may be a function of a ratio of a refractive index of the LCOS SLM 1140 and a thickness of the LCOS SLM 1140. For a given refractive index of the LCOS SLM 1140 and a given thickness of the LCOS SLM 1140, going in and out of the LCOS SLM 1140 at large angles makes a path length of light longer than going in and out of the LCOS SLM 1140 at small angles. The path length is related to the thickness of the LCOS SLM 1140. In one example, a LCOS SLM may have a first refractive index and a first thickness. For small angles, a double pass retardance of the LCOS SLM having the first refractive index and the first thickness may be a half wave. For large angles, a double pass retardance of the LCOS SLM having the first refractive index and the first thickness may not be a half wave (e.g., may be greater than a half wave). The thickness of the LCOS SLM may be changed from the first thickness to a second thickness, where the second thickness is less than the first thickness. For small angles, a double pass retardance of the LCOS SLM having the first refractive index and the second thickness may not be a half wave (e.g., may be less than a half wave). For large angles, a double pass retardance of the LCOS SLM having the first refractive index and the second thickness may be a half wave.

Figure 20C:
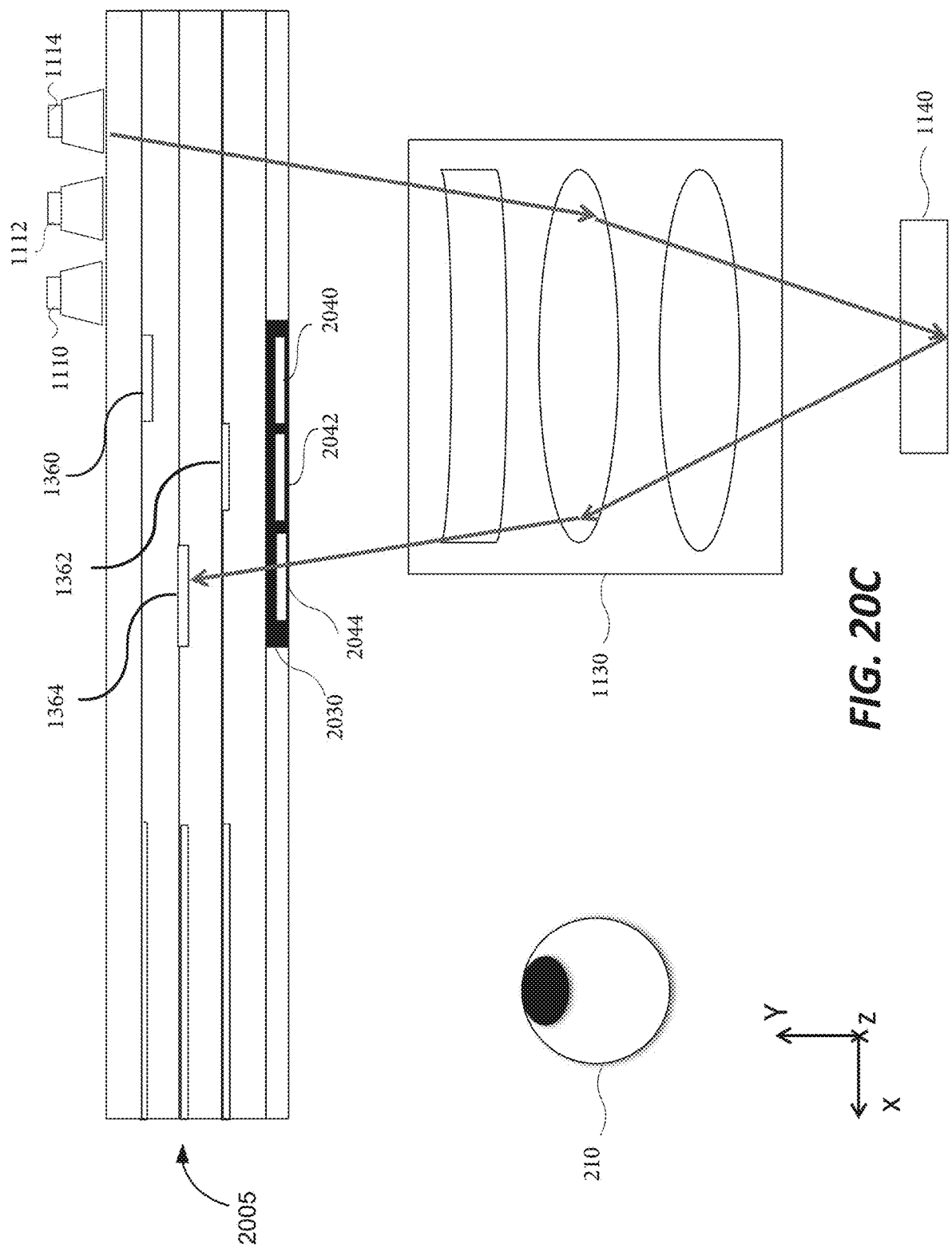
FIG. 20C shows the augmented reality display system similar to that shown in FIGS. 20A and 20B however using a deflection-based spatial light modulator such as a movable micro-mirror based spatial light modulator.
Figure 20D:
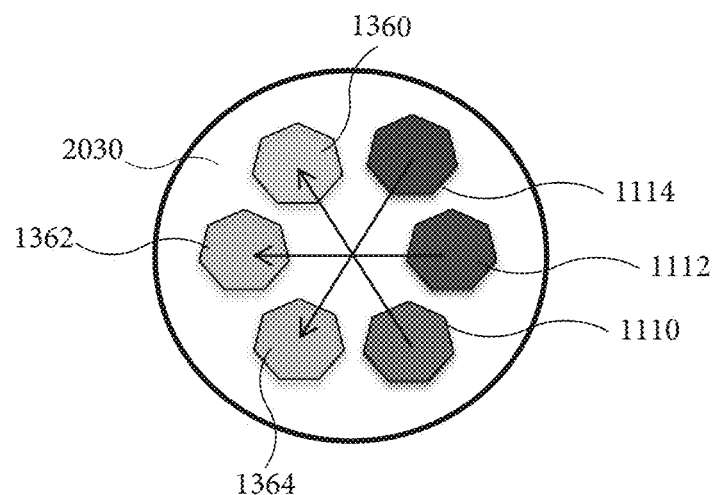
FIG. 20D is a top view of a portion of an augmented reality display system such as shown in FIG. 20C schematically illustrating the laterally displaced light sources and corresponding laterally displaced in-coupling optical elements above a color filter array.
Figure 20E:
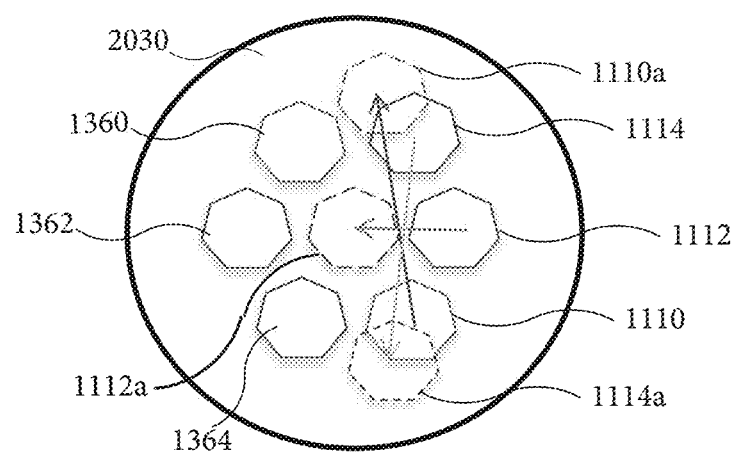
FIG. 20E illustrates how the deflection-based spatial light modulator directs the light away from the corresponding in-coupling optical elements and onto the mask surrounding the filters in the filter array for the augmented reality display system of FIG. 20D.

Also, although FIGS. 20A and 20B illustrate the use of a polarization-based SLM 1140, other types of SLMs may be utilized. FIG. 20C, for example, illustrates use of a deflection-based SLM 1140 such as a movable micro-mirror based SLM. As discussed above, such SLM 1140 may include Digital Light Processing (DLP™) and digital micromirror device (DMD) technology. As discussed above, the deflection-based SLM 1140 can couple light from one of the light source 1110, 1112, 1114 into the respective in-coupling optical element 1360, 1362, 1364, depending on the state of the pixel of the SLM 1140. In one state, the light from the light source 1110, 1112, 1114 would be directed to the respective in-coupling optical element 1360, 1362, 1364 as illustrated in FIG. 20D. In another state, the light from the light source 1110, 1112, 1114 would be directed away from the in-coupling optical element 1360, 1362, 1364 as illustrated in FIG. 20E. In some implementations, while in the off state, the black absorbing mask between color filters 2040, 2042, 2044 in the color filter array 2030 may serve as a light dump. As described above, the color filters 2040, 2042, 2044 may be surrounded and/or separated by a mask such as an absorbing mask (e.g., a black mask). This mask may include absorbing material such that of the light incident more is absorbed than reflected therefrom. This mask may also be opaque.

Other variations are possible. Although the light sources are shown as emitters 1110, 1112, 1114 (e.g., LEDs, laser diodes) coupled to coupling optic 1105 such as non-imaging optical coupling element (e.g., compound parabolic collectors (CPC) or cones), other configurations are possible. For example, the coupling optic 1105 (e.g., CPC) may be tilted with respect to a stack of waveguides. In some cases the projector (i.e., the optics 1130 and the SLM 1140) may be tilted relative to the eyepiece (e.g., the stack of waveguides). In some implementations, the lens optics 1130 is tilted with respect to the SLM 1140 to reduced distortion such as keystone distortion. A Scheimplug configuration may be employed to reduce such distortion. Components may be tilted (e.g., optics 1130 and/or spatial light modulator 1140) as needed, for example, to fit more conformally about a head and/or face. As described above, the light emitter(s) and/or coupling optic 1105 may be tilted. In some configurations, the assembly including the waveguides may be tilted with a side closer to a side of the eye 210 (e.g. temporal side) being closer to the eye 210 to increase perceived field of view of a binocular system as a whole (at a cost of binocular overlap).

Figure 20F:
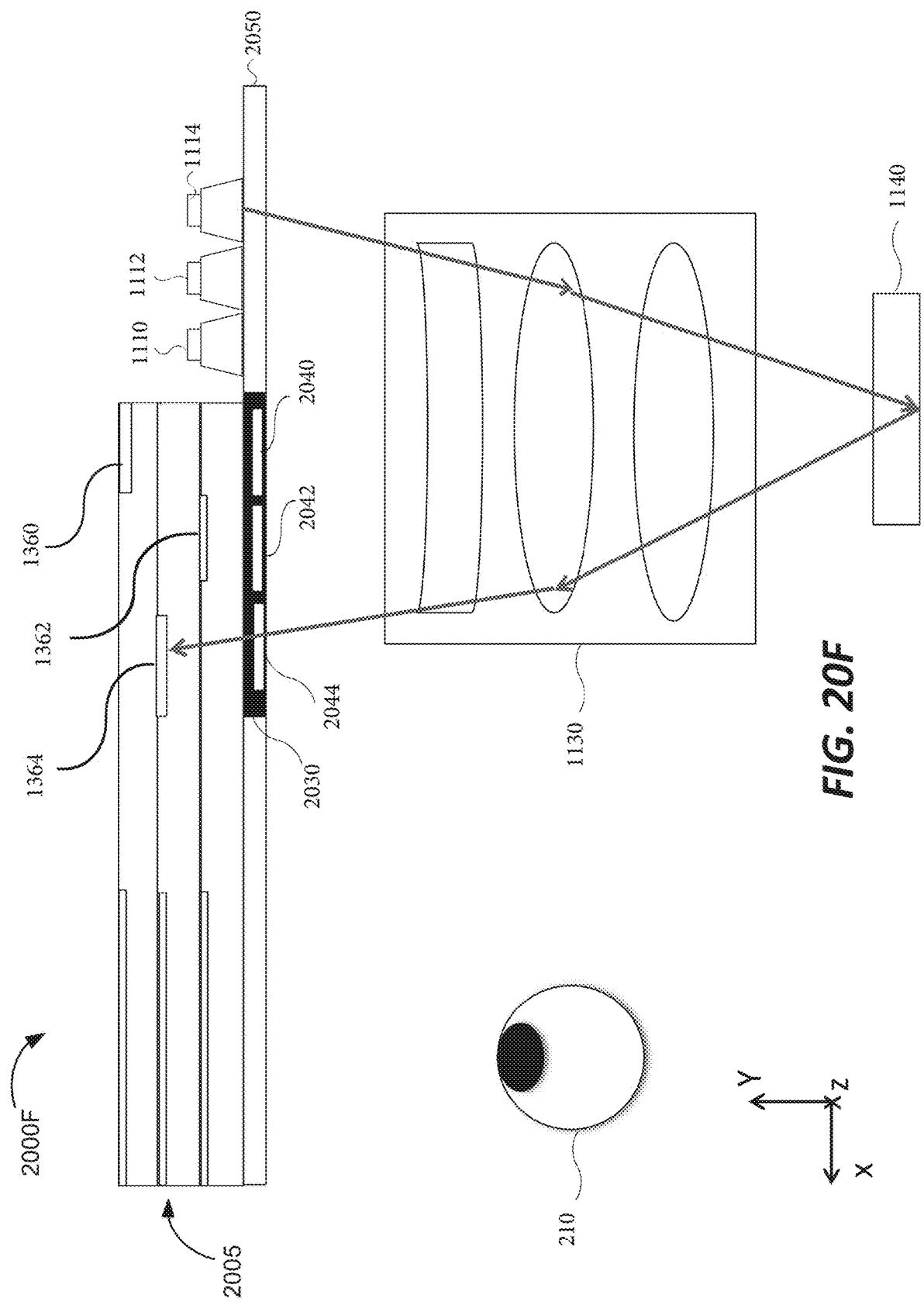
FIG. 20F is a side view of an augmented reality display system including a cover glass disposed on a user side of a stack of waveguides and a light source disposed on a world side of the cover glass.

As discussed above, components and their location and arrangement may vary. For example, FIG. 20F is a side view of a system 2000F including cover glass 2050 disposed between the stack 2005 and the optics 1130. In some designs, the light sources 1110, 1112, 1114 may be disposed on a world side of the cover glass 2050 and configured to propagate light through the cover glass 2050 to the optics 1130 and SLM 1140. As illustrated, the cover glass 2050 may extend laterally (e.g., parallel to the x axis) beyond the stack 2005 such that light emitted by the light sources 1110, 1112, 1114 enters the optics 1130 without passing through waveguides in the stack 2005. Although the system 2000F depicts a deflection-based SLM 1140, similar configurations of the light source may also be used with a non-deflection-based SLM or in with any other configuration or features disclosed herein.

Figure 20G:
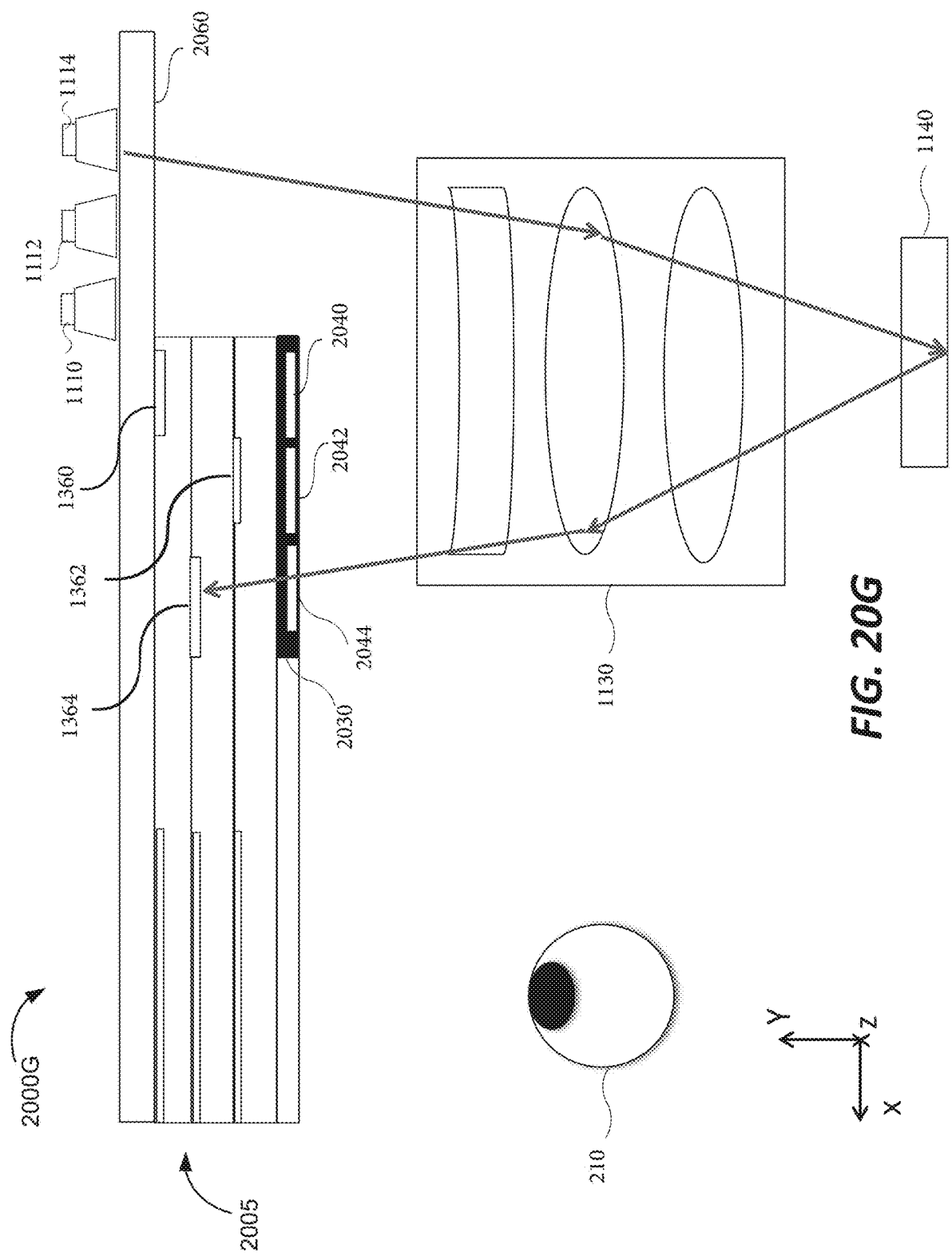
FIG. 20G is a side view of an augmented reality display system including a cover glass disposed on a world side of a stack of waveguides and a light source disposed on a world side of the cover glass.

FIG. 20G is a side view of a system 2000G including cover glass 2060 disposed on the world side of the stack 2005 (i.e., opposite the side of the stack 2005 proximal the optics 1130. In some designs, the light sources 1110, 1112, 1114 may be disposed on a world side of the cover glass 2050 and configured to propagate light through the cover glass 2050 to the optics 1130 and SLM 1140. As illustrated, the cover glass 2060 may extend laterally (e.g., parallel to the x axis) beyond the stack 2005 such that light emitted by the light sources 1110, 1112, 1114 enters the optics 1130 without passing through waveguides in the stack 2005. Although the system 2000G depicts a deflection-based SLM 1140, similar configurations of the light source may also be used with a non-deflection-based SLM or in or with any other configuration or features disclosed herein.

Figure 21:
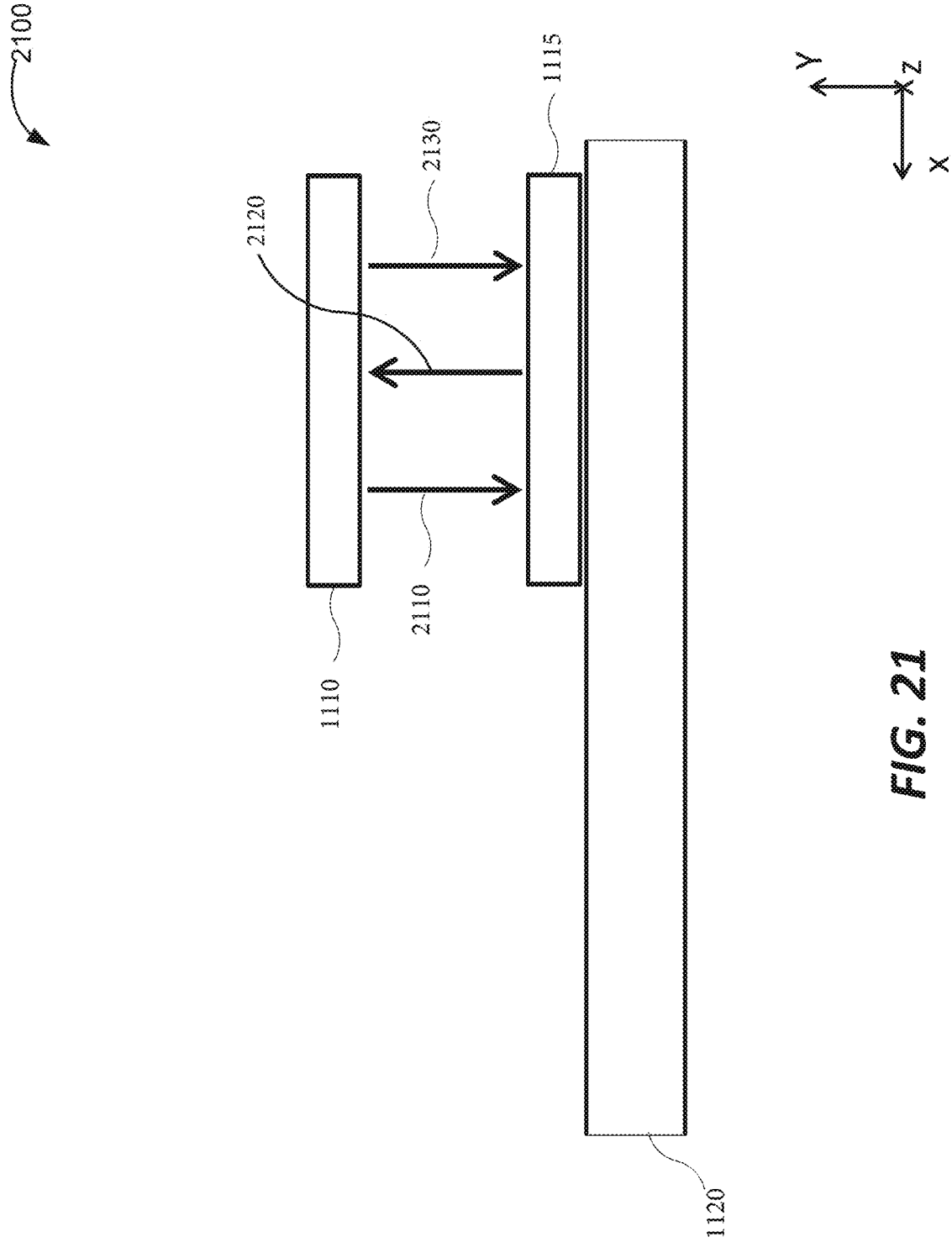
FIG. 21 is a side view of an augmented reality display system including a light source outfitted with a light recycler configured to recycling light such as light of one polarization.

Additionally, as discuss above, a configuration that facilitates light recycling may be employed. FIG. 21, for example, is a partial side view of a system 2100 outfitted with a configuration that provides light recycling of light from the light source 1110. The light source 1110 may be disposed with respect to a polarizer 1115 configured to recycle light having an undesired polarization. The polarizer 1115 may include, for example, a wire grid polarizer that transmits light of a first polarization and retro reflects light of a second opposite polarization. Accordingly, light 2110 may be emitted from the light source 1110 and impinge on the polarizer 1115. The polarizer 1115 may transmit light of the first polarization, for which a projector (not shown) is configure to use. For example, an SLM may properly operate with light of this first polarization. Light of the second polarization 2120 is reflected back toward the light source 1110 and can be recycled. The polarization of the light 2120 may be altered, for polarization rotated, after reflecting off portions (e.g., sidewalls) of the coupling optic (not shown) such as non-imaging optics like the compound parabolic collector (CPC) at various angles. Some light having suitable polarization (e.g., polarization orientation), that may be passed by the polarizer 1115 may result. Multiple reflections may change polarization of the light and may cause light to exit with a desired polarization. This recycled light 2130 is then emitted back toward the polarizer 1115. Such a configuration may improve efficiency, e.g., energy efficiency as more of the desired polarization is produced. Also, in addition or in the alternative, a retarder may be used to change a reflected polarization state and reclaim light.

Figure 22:
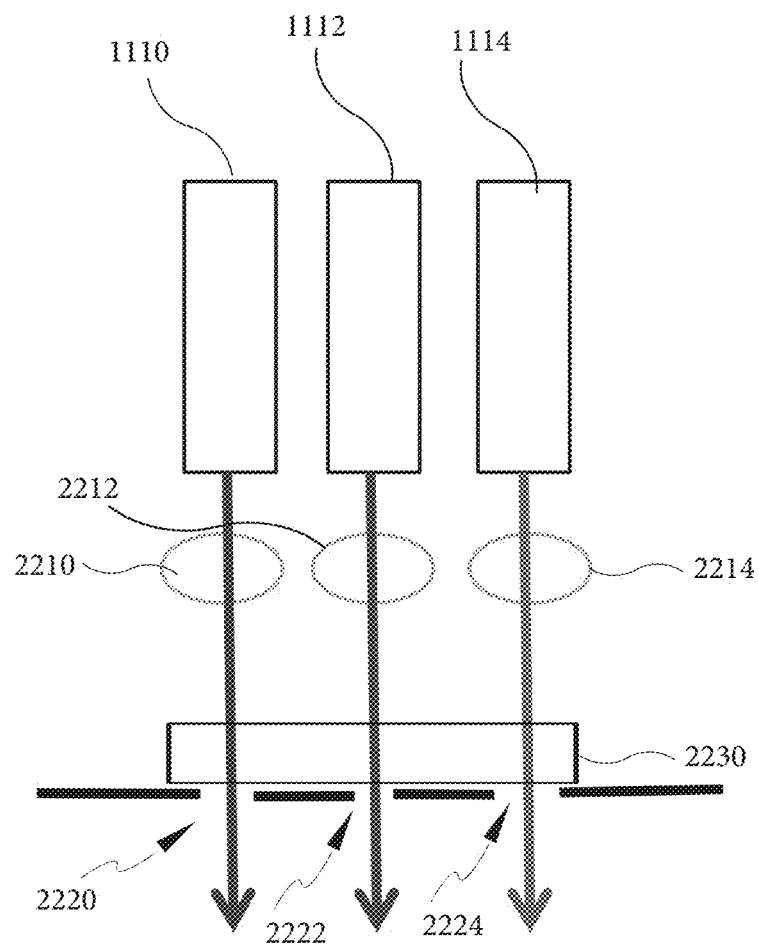
FIG. 22 is a side view of one or more light sources propagating light through corresponding light collection optics and one or more apertures. The light may also propagate through a diffuser located proximal the one or more apertures.

FIG. 22 shows another configuration that includes light sources 1110, 1112, 1114 and corresponding light collection optics 2210, 2212, 2214. The light collection optics 2210, 2212, 2214 may include lenses or other optics to collect light from the light sources 1110, 1112, 1114. The light sources 1110, 1112, 1114 may be laser diodes or other emitters that emit light over a wide range of angles. The light collection optics 2210, 2212, 2214 may be used to collect much of that light. The light sources 1110, 1112, 1114 may emit light asymmetrically. For example, light may be emitted in a wider range of angles in one direction (e.g., x or z direction) than in the orthogonal directions (e.g., z or x direction). Accordingly, the light collection optics 2210, 2212, 2214 may be asymmetric. For example, the light collection optics 2210, 2212, 2214 may be have different optical power in different possible orthogonal directions. The light collection optics 2210, 2212, 2214 may, for example, include lenses such as anamorphic lenses. The light collection optics 2210, 2212, 2214 may also possibly include non-imaging optics. Apertures 2220, 2222, 2224 may be included. A diffuser 2230 may also be included proximal the apertures 2220, 2222, 2224, for example, when the light sources 1110, 1112, 1114 lasers such as laser diode. With the diffuser proximal the apertures 2220, 2222, 2224, the apertures may appear to be the location of the laterally displaced light sources. The apertures 2220, 2222, 2224 may be matched with in-coupling optical elements on a waveguide or waveguides via optics and SLM as discussed above. For example, each aperture 2220, 2222, 2224 may be matched with a respective in-coupling optical element. Similarly, in certain implementations, such as shown in FIG. 16A, each aperture 2220, 2222, 2224 may be matched with respective groups of (e.g., color selective) in-coupling optical elements.

A wide range of system variations and configurations are possible. For example, although the linearly polarized light is described as being propagated through the optics 1130 to the SLM 1140 and back through the optics to the waveguide stack, in some designs circular polarized light may be used instead. For example, circularly polarized light may be directed into the optics 1130. A retarder such as a quarter wave plate may be disposed such that this light passes through the retarder prior to being incident on the SLM. The retarder (e.g., quarter waveplate) may be disposed between the optics 1130 and the SLM 1140. In some cases, such as described above, the retarder (e.g., quarter waveplate) may be affixed to the SLM 1140, such as for example, using adhesive or a mechanical fixture. The retarder (e.g., quarter wave plate) may transform the linearly polarized light into circularly polarized light after reflection from the SLM 1140. Accordingly, in some implementations, circular polarized light may again pass through the optics 1130 toward the stack. Another retarder (e.g., quarter wave plate), for example, proximal to the analyzer 1150 may transform the circular polarized light into linearly polarized light that may or may not pass through the analyzer depending on the linear polarization (e.g., orientation). Pixels of the SLM 1140 may be have states that can be varied to rotate or not rotate the polarization. Still other configurations are possible.

Figure 23A:
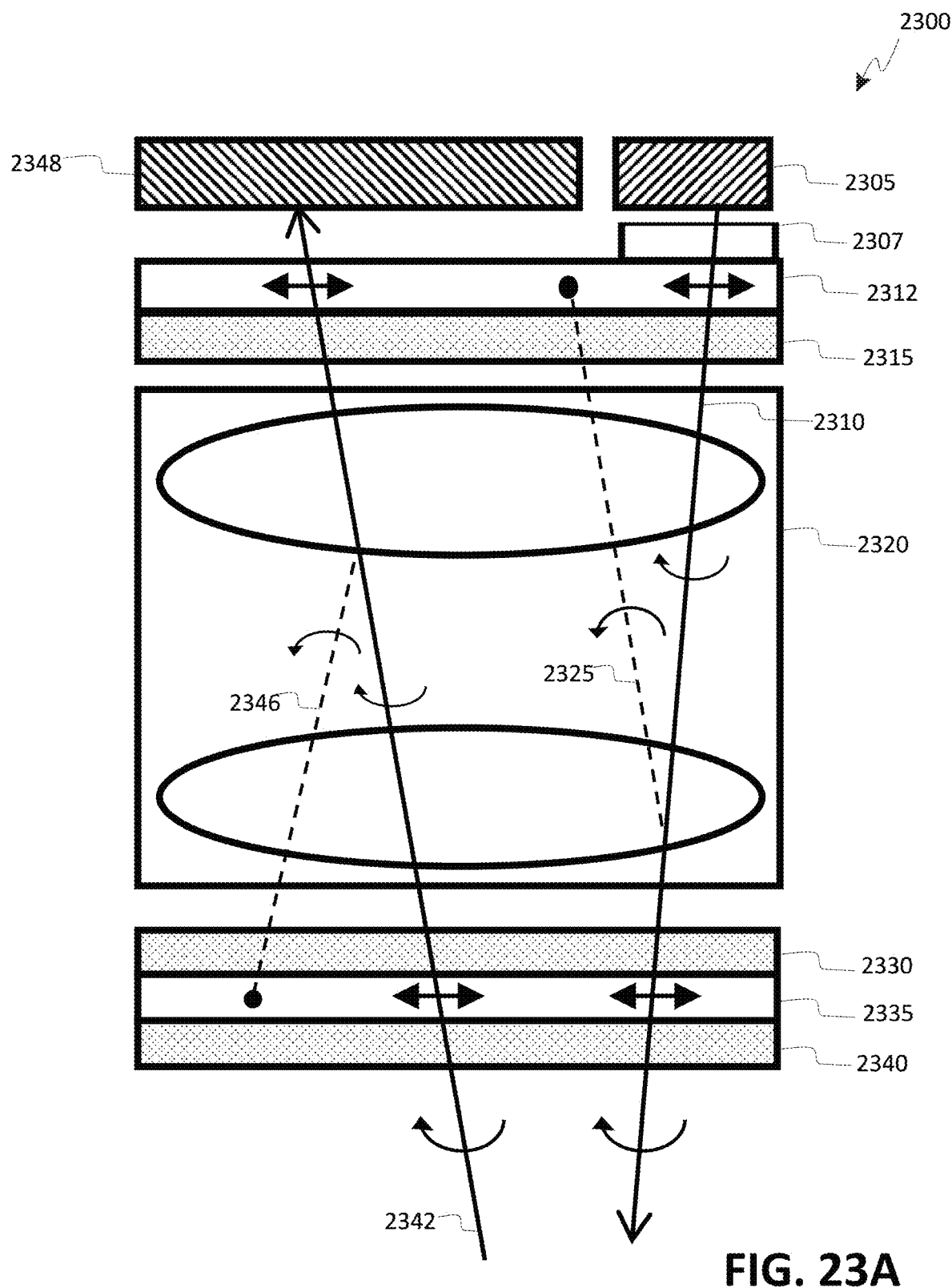
FIG. 23A is a side view of a portion of an augmented reality display system including a light source, optics having optical power, a waveguide for receiving and outputting image information to a user's eye, wherein the system further includes one or more retarders and polarizers configured to reduce reflection from optical surfaces that may be input to the waveguide as a ghost image.

FIG. 23A is a side view of an augmented reality display system 2300 including a light source 2305, a polarization rotator 2307, optics having optical power (e.g., lenses) 2320, polarizers 2312, 2335 such as linear polarizers (e.g. horizontal or vertical polarizers), retarders 2315, 2330, 2340 such as quarter wave retarders (e.g., quarter wave plates), and at least one waveguide 2348 for outputting image information to a user. Such a configuration can be used to illuminate a reflective spatial light modulator (not shown) such that light emitted from light source 2305 is reflected from the spatial light modulator and is coupled into the at least one waveguide 2348 to be directed to a user's eye. The configuration and placement of these elements, particularly the polarizers and retarders, may reduce or eliminate reflections from optical surfaces within the system such as surfaces from the optics 2320, which may otherwise result in ghost images being visible to the user. For example, optical elements that are polarization selective and/or that have retardance (e.g., polarizers 2312, 2335 and retarders 2315, 2330, 2340) can be arranged and configured to convert linearly polarized light into circularly polarized light that changes from left-handed to right-handed or right-handed to left-handed upon reflection from optical surfaces. Similarly, such optical elements that are polarization selective and/or that have retardance (e.g., polarizers 2312, 2335 and retarders 2315, 2330, 2340) can be arranged and configured to convert circularly polarized light into linearly polarized light that can be attenuated or filtered out by the polarizers (e.g., linear polarizers). Circular polarizers that transform linearly polarized light into circularly polarized light and vice versa may be fabricated with such optical elements that are polarization selective and that have retardance (e.g., polarizers 2312, 2335 and retarders 2315, 2330, 2340). For example, a circular polarizer may comprise a linear polarizer and a quarter wave retarder. Circular polarizers can be used to convert linearly polarized light into circularly polarized light having a first state (e.g., handedness) and to filter out circularly polarized light having a second state (e.g., handedness) that is of a different first state. For example, circular polarizers can be used to convert linearly polarized light having a certain orientation into left-handed circular polarized light and to filter out circular polarized light that is right-handed circularly polarized. Circular polarizers can also be used to convert linearly polarized light having a certain orientation into right-handed circular polarized light and to filter out circular polarized light that is left-handed circularly polarized. Circular polarizers or other configurations of optical elements that include retardance that can be used to transform linearly polarized light into circular polarizer light and back and that can selectively filter linearly polarized light can be used to reduce back reflection from optical surfaces as discussed below in connection with FIGS. 23A and 23B.

Figure 23B:
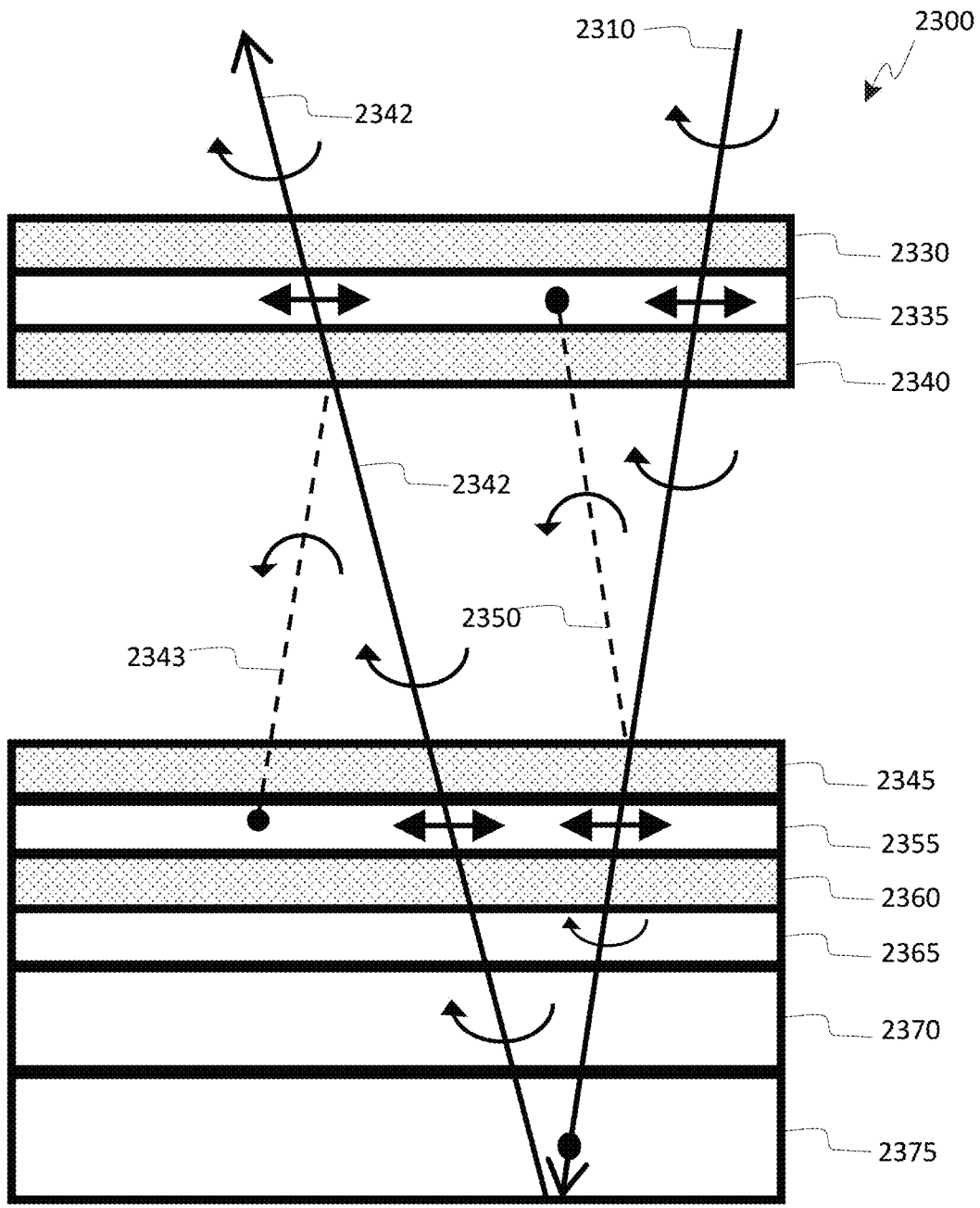
FIG. 23B is a side view of a portion of an augmented reality display system such as shown in FIG. 23A with additional retarders and polarizers configured to reduce reflections that may produce ghost images.

It is noted that left-hand and right-hand circular polarization is illustrated with clockwise and counter-clockwise arrows, respectively, in FIGS. 23A and 23B. Further, horizontal and vertical linear polarization is depicted using horizontal arrows and circular dots respectively.

As discussed above, FIG. 23A illustrates a configuration of an augmented reality display system 2300 where polarizers 2312, 2335 such as linear polarizers (e.g., horizontal polarizers) and retarders 2315, 2330, 2340 such as quarter wave retarders (e.g., quarter wave plates) are arranged to reduce back reflection from optical surfaces such as the surfaces of optics 2320 in the path of light illuminating and reflecting from a spatial light modulator (not shown). The first polarizer 2312 and first retarder 2315 are disposed between the light source 2305 and the optics 2320. The first polarizer 2312 is disposed between the light source 2305 and the first retarder 2315. Likewise, the first retarder 2315 is disposed between the first polarizer 2312 and the optics 2320.

As illustrated, the light source 2305 emits light as represented by a light ray 2310. In some implementation, the ray 2310 can pass through the polarization rotator 2307. The rotator 2307 is optional and can be used to rotate the polarization of the light from the light source 2305, e.g., ray 2310. In various implementations, the rotator 2307 can rotate the angle of the polarization (e.g., of the linear polarization). For example, the rotator 2307 can rotate the linear polarization of the ray 2310 to an orientation aligned with the first polarizer 2312 so as to be transmitted therethrough. In some implementations, the polarization rotation 2307 may comprise a retarder, for example, a half-wave retarder in some cases. The optic axis of the half-wave retarder may be oriented to rotate the polarization of the light from the light source 2305 from vertical to horizontal or vice versa. Alternatively the polarization rotator 2307 may be configured to rotate the angle of polarization of linearly polarized light emitted from the light source 2305 by different amounts. The polarization rotator 2307 need not be included in the system. For example, in implementations where the light source 2305 emits light having the same polarization as the first polarizer 2312, the polarization rotator 2307 may be excluded. As illustrated, the light, for example, the ray 2310, passes through a polarizer 2312, here shown as a horizontal polarizer. In instance where light from the light source 2305 is unpolarized, the light transmitted through the horizontal polarizer 2312, shown as ray 2310, is linearly polarized (e.g., horizontally polarized) after passing through the polarizer 2312. While horizontal linear polarizers are used in this example, it will be understood that the principles taught can be applied using vertical linear polarizers. Alternatively, linear polarizers having different orientations other than vertical or linear may also be used.

The horizontally polarized light ray 2310 travels through the retarder 2315, here shown as a quarter wave retarder. This retarder 2315 may include sufficient retardance to transform the linearly polarized light into circularly polarized light. For example, the horizontally polarized light may be converted into left-handed circularly polarized light as illustrated by the curved (e.g., clockwise directed) arrow. In this example, the combination of the polarizer 2312 and the retarder 2315 (e.g., quarter wave) forms a circular polarizer, referred to here as the first circular polarizer, that can convert light of a particular linear polarization (e.g., horizontal or vertical polarization) into a particular circular polarization (e.g., left- or right-handed circular polarization or vice versa). A circular polarizer may also block light of a particular circular polarization (e.g., right- or left-handed circular polarization) depending on the configuration.

In some implementations, various optical elements have birefringence. In certain such cases, the retarder 2315 may include an amount of retardance sufficient to convert linearly polarized light into circularly polarized light and need not be a quarter waveplate. More or less than a quarter wave of retardance may be included in the retarder 2315 as retardance may be contributed by other optical elements. Similarly, retardance can be distributed in a number of optical elements. As another example, multiple retarders may be employed to provide the appropriate amount of retardance.

The circularly polarized ray 2310 (here left-handed circularly polarized) then passes through the optics 2320. Undesirable reflections may occur at any interface in the system with media having dissimilar refractive indices such as, for example, air to material interfaces. These reflections can be problematic if they are allowed to enter the at least one waveguide 2348 as this reflected light may be directed into the user's eye and form "ghost" images visible in the user's eye. For example, in an instance where the display projects a first image into the viewer's eye with the at least one waveguide 2348, a second faint duplicate image that is displaced (e.g., laterally displaced) with respect to the first image may also be seen by the user. Such "ghost" images, formed by reflections from optical surfaces that are directed into the user's eye, may be distracting or otherwise degrade the viewing experience. For example, as illustrated in FIG. 23A, light such as a reflected ray 2325 can be reflected from a lens within the optics 2320. This light may be directed toward the at least one waveguide 2348, which is configured to direct light into the user's eye for presenting images thereto. However, in this case, the circularly polarized light reverses handedness. For example, upon reflecting off of the lens, the direction of the circular polarization is changed (e.g., from left-handed to right-handed). The right-handed reflected ray 2325 then travels through the retarder 2315 and is transformed into linearly polarized light having a different (e.g., orthogonal) linear polarization than that which is transmitted by the polarizer 2312. In this case, for example, the light reflected from the optical surface of the lens is converted by the retarder 2315 into vertical linear polarization, which is orthogonal to the polarization transmitted by the horizontal linear polarizer 2312. The horizontal linear polarizer 2312 selectively passes horizontally polarized light and filters out vertically polarized light. Thus, the reflected ray 2325 is attenuated and/or not transmitted by the horizontal linear polarizer 2312 and is prevented from reaching the at least one waveguide 2348 or at least a reduced amount of such reflected light reaches the at least one waveguide 2348 or is coupled therein, for example, through in-coupling optical elements (e.g., one or more in-coupling gratings). The result would be similar for left-handed circularly polarized rays reflected from different optical surfaces of the optics 2320 or other optical surfaces on different optical elements.

As illustrated, the display system 2300 further includes a second retarder 2330 (e.g., quarter wave retarder or quarter waveplate) as well as second polarizer 2335 (e.g., linear polarizer) disposed between the optics 2320 and the spatial light modulator (not shown). This second retarder 2330 and this second linear polarizer 2335 may form a second circular polarizer in certain implementations. The second retarder 2330 is disposed between the optics 2320 and the second polarizer 2335. Likewise, the second polarizer 2335 is disposed between the second retarder 2330 and the spatial light modulator. Accordingly, after passing through the optics 2320, the ray 2310 may pass through the second retarder 2330 (e.g., quarter wave retarder). The second retarder 2330 is configured (e.g., the optic axis is appropriately oriented) such that the ray 2310 is converted from a left-handed circular polarization to a horizontal linear polarization. Likewise, the second retarder 2330 converts the circularly polarized light back to the original linear polarization state that was output by the first polarizer 2312. As will be discussed below, this second retarder 2330 and second polarizer 2312 may be useful in reducing "ghost" images caused by light reflected from the spatial light modulator that passes through optical surfaces (e.g., on the powered optics or lenses 2320) as the light travels to the at least one light guide 2348.

A third retarder 2340 (e.g., a quarter wave retarder or quarter wave plate) is disposed between the second polarizer 2335 and the spatial light modulator. Accordingly, the third retarder 2340 is disposed between the second retarder 2330 and spatial light modulator. Also, in various implementations such as shown, the second polarizer 2335 is between the second and third retarders 2330, 2340. As illustrated, the ray 2310 upon passing through the second polarizer 2335 is linearly polarized and in some implementations, the second retarder 2330/second polarizer 2335 may convert the light to the original linear polarization of the first polarizer 2312 (e.g., horizontally polarized). This linearly polarized light is incident on the third retarder 2340. The third retarder 2340 is configured such that the ray is converted back into a circularly polarized light and in some implementations to the same polarization as output by the first retarder 2315 (e.g., left-handed circularly polarized light in this example). In certain implementations, the spatial light modulator is configured to operate on circularly polarized light. In some implementations, the spatial light modulator is a reflective spatial light modulator that reflects the incident circularly polarized light back as circularly polarized light. In some embodiments, the circularly polarized light reflected from the spatial light modulator may have the same handedness (e.g., left-handed circularly polarized) as that incident thereon depending possibly on whether the spatial light modulator pixels are in the "on" or "off" states. In some embodiments, the spatially light modulator may reflect circularly polarized light of the different handedness (e.g., right-handed circularly polarized) as that incident thereon depending possibly on whether the spatial light modulator pixels are in the "on" or "off" states. Other types of spatial light modulators, however, may be used.

FIG. 23A shows light, illustrated as ray 2342, reflected from the spatial light modulator and travelling toward the waveguide 2385. The reflected ray 2342 is depicted as left-hand circularly polarized light. The ray 2342 passes through the third retarder 2340. The third retarder 2340 converts the circular polarized light into linearly polarized light. In this example, left-handed circularly polarized light is converted into horizontally polarized light. The linearly polarized light is transmitted through the second polarizer 2335. In this example, the horizontally polarized light passes through the second polarizer 2335. The linearly polarized light is incident on the second retarder 2330 and is converted into circularly polarized light. In this example, the horizontally polarized light is converted into left-hand polarized light and is transmitted to the optics 2320. Here again, reflections from optical surfaces such as the surfaces of the optics 2320 having optical power may create ghost images by reflecting back off the spatial light modulator into the at least one waveguide 2348 and to the user's eye. As described above, undesirable reflections may occur at any interface with media having dissimilar refractive indices such as air to material interfaces. As referenced above, the inclusion of the second retarder and polarizer 2330, 2335, may attenuate these reflections and lower the likelihood of ghost reflections. FIG. 23A, for example, depicts light, illustrated as ray 2346, reflected from an optical surface of the optics 2320. The act of being reflected from the surface causes the reflected ray 2346, which is circularly polarized to switch handedness, in this example, to switch from left-handed circular polarization to right-handed circular polarization. The switched circular polarized light is attenuated by the second circular polarizer formed by the second retarder and polarizer 2330, 2335. As illustrated in FIG. 23A, for example, the reflected circularly polarized light 2346 is incident on the second retarder 2330 and transformed by the second retarder into linearly polarized light having a different, e.g., orthogonal, linear polarization than that which is selectively transmitted by the second linear polarizer 2335. In this case, for example, the right-handed circularly polarized light reflected from the optical surface of the optics 2320 is converted by the retarder 2330 into vertical linear polarization, which is orthogonal to the polarization selectively transmitted by the polarizer 2335. The second polarizer 2335 attenuates or prevents transmission of this linearly polarized light. In this example, the light 2346 is vertically polarized while the second polarizer 2335 is a horizontal polarizer that selectively passes horizontally polarized light and filters out vertically polarized light.

In contrast, the light 2342 passing through the optics 2320 and incident on the first retarder 2315 is circularly polarized and has a different handedness than light reflected from optical surfaces of the optics 2320. This light 2342 directed toward the at least one waveguide 2348 has a polarization (e.g., left-handed polarized) that is converted by the first retarder 2315 into linearly polarization (e.g., horizontal linearly polarized light) that is selectively transmitted by the first polarizer 2312. In this manner, the light 2342 can reach and be coupled into the at least on one waveguide 2348 and be directed to the user's eye.

In the example shown in FIG. 23A, first circular polarizer, formed by the first polarizer 2312 and the first retarder 2315, and second circular polarizer, formed by the second retarder 2330 and the second polarizer 2335, on opposite sides of the optics 2320, one closer to the light source 2305 and one closer to the spatial light modulator, are used to reduce reflections that may result in "ghost images". An additional retarder 2340 is included between the second circular polarizer (e.g. the second polarizer 2335) and the spatial light modulator to convert the light into circularly polarized light. A wide range of variations are possible, however. For example, only one circular polarizer may be included. Alternately, additional circular polarizers or other types of polarization optics may be included.

FIG. 23B illustrates a third circular polarizer that can be added to an augmented reality system 2300 such as shown in FIG. 23A. In particular, FIG. 23B depicts the second circular polarizer including the second polarizer 2335 and second retarder 2330 as well as the third retarder 2340 as introduced above, and further depicts a spatial light modulator 2375. This spatial light modulator (SLM) 2375 may include a liquid crystal spatial light modulator (e.g., liquid crystal on silicon or LCOS). In some implementations, the SLM 2375 can be covered with a cover glass 2370.

FIG. 23B also shows a third circular polarizer including a fourth retarder 2345 such as a quarter wave retarder (e.g. quarter wave plate) and a third polarizer 2355 such as a linear polarizer disposed between the second circular polarizer including the second polarizer 2335 and second retarder 2330 and the spatial light modulator 2375. The third polarizer 2355 is between the fourth retarder 2345 and the spatial light modulator 2375. An additional fifth retarder 2360 such as a quarter wave retarder (e.g., quarter wave plate) as well as a compensator 2365 are disposed between the third circular polarizer including the fourth retarder 2345 and the third polarizer 2355 and the spatial light modular 2375 or more specifically the cover glass 2370 shown in FIG. 23B. The fifth retarder 2360 is between the third polarizer 2355 and the compensator 2365. The compensator 2365 is between the fifth retarder 2360 and spatial light modulator 2375 or specifically the cover glass 2370.

FIG. 23B shows how light, for example, ray 2310, from the light source 2305 (shown in FIG. 23A) can propagate through the second circular polarizer including the retarder 2330 and second polarizer 2335, as well as the third retarder 2340 to the third circular polarizer including the fourth retarder 2345 and third polarizer 2355. The light ray 2310 from the light source 2305 after passing through the second circular polarizer including the second retarder 2330 and second polarizer 2335 is incident on the third circular polarizer and in particular on the fourth retarder 2345. The fourth retarder 2345 may convert the circular polarizer light of ray 2310 into linearly polarized light. In the example shown in FIG. 23B, ray 2310 is circularly polarized (e.g., left-hand circularly polarized) and is converted by the fourth retarder 2345 into linearly polarized light (e.g. horizontally polarized light). This linearly polarized light proceeds through the third polarizer 2355, which in FIG. 23B includes a horizontal polarizer that selectively transmits horizontally polarized light. This linearly polarized light propagates through the fifth retarder 2360, which may include a quarter wave retarder that converts the linearly polarized light into circularly polarized light. In the example shown in FIG. 23B, the horizontally linearly polarized light 2310 incident on the fifth retarder 2360 is transformed into left-handed circularly polarized light. This circularly polarized light is incident on and passes through the compensator 2365. The compensator 2365 may include a polarization element that adjusts the polarization to the desired polarization. The compensator 2365 may be used to offset birefringence of various optical elements in the system. For example, the light may be slightly elliptically polarized due to retardance contributions of one or more optical elements. In various implementations, the light output from the compensator 2365 is circularly polarized light. In the example shown in FIG. 23B, the light output from the compensator 2365 is left-handed circularly polarized light. In various implementations, the compensator 2365 may be used to offset residual retardance within the SLM, which may comprise, for example, a liquid crystal (e.g., LCOS) SLM cell. The compensator may introduce in-plane retardance and/or out of plane retardance. In some implementations, the compensator 2365 may include a combination of optical retarders that when combined, produce the retardance that may potentially offset the residual retardance from the SLM (e.g., LCOS panel).

In FIG. 23B, the light after passing through the compensator 2365 is incident on the cover glass 2370 and the SLM 2375. This light incident on the cover glass 2370 and the SLM 2375 is depicted as left-hand circularly polarized light. Depending on the type of and the state of the spatial modulator, the SLM 2375 may reflect circularly polarized light of the same handedness. For example, when a pixel of the SLM 2375 is in an "on" state (although this state may be an undriven state in some implementations), the SLM 2375 may introduce a quarter wave of retardance on each pass through the SLM 2375. Accordingly, on reflection, incident circularly polarized light may remain circular polarized on reflection. In various configurations, the handedness may also remain the same. For example, as shown in FIG. 23B, the incident left-hand circularly polarized light may remain left-handed circularly polarized on reflection. This circularly polarized light reflected from the SLM 2375, represented by ray 2342, may pass through the cover glass 2370 and compensator 2365 and be incident on the fifth retarder 2360, which converts the circularly polarized light into linearly polarized light. In the example shown in FIG. 23B, the circularly polarized light incident on the fifth retarder 2360 is left-handed and the fifth retarder 2360 converts this circularly polarized light into horizontally polarized light. The third polarizer 2355 may be configured to selectively transmit the polarization of light output by the fifth retarder 2360. Accordingly, in the example shown in FIG. 23B where the light output from the fifth retarder 2360 is horizontally polarized, the third polarizer 2355 selectively transmits the horizontally polarized light. This linearly polarized light transmitted by the polarizer 2355 is incident on the fourth retarder 2345 and converted into circularly polarized light. In the example shown in FIG. 23B, this circularly polarized light is left-hand circularly polarized. This light can travel through the second circular polarizer comprising the second retarder 2330 and second polarizer 2335, the optics 2320, as well as the first circular polarizer comprising the first polarizer 2312 and the first retarder 2315 onto the at least one waveguide 2348 and into the eye of the user as discussed above in connection with FIG. 23A.

Light reflected from optical surfaces may, however, be attenuated by the third circular polarizer thereby reducing the likelihood that such reflections will reach the at least one waveguide 2348 and be directed to the user's eye producing ghost images. To illustrate, FIG. 23B shows and example ray 2343 reflected from an optical surface of the third retarder 2340, for example, from the interface between the air and the third retarder 2340. As discussed above, reflections may occur at any interface between media having dissimilar refractive indices such as air to material interfaces or interfaces between different dielectric layers. However, circularly polarized light reverses handedness upon reflection. For example, upon reflecting off of the surface of the third retarder 2340, the direction of the circular polarization is changed (e.g., from left-handed to right-handed). The right-handed reflected ray 2343 then travels through the fourth retarder 2345 and is transformed into linearly polarized light having a different, for example, orthogonal, linear polarization than that which is selectively transmitted by the third polarizer 2355. In this case, for example, the light reflected from the optical surface of the third retarder 2340 is converted by the fourth retarder 2345 into vertical linear polarization, which is orthogonal to the polarization selectively transmitted by the third polarizer 2355. The third polarizer 2355 selectively passes horizontally polarized light and filters out vertically polarized light. Thus, the reflected ray 2343 is attenuated and/or not transmitted by the third polarizer 2355 and is prevented from reaching the at least one waveguide 2348 (e.g., by reflecting off another surface) or at least a reduced amount of such reflected light reaches the at least one waveguide 2348 or is coupled therein.

The result may be the similar for circularly polarized rays reflected from different optical surfaces. FIG. 23B, for example, shows a reflection of incident light ray 2310 off the optical surface of the fourth retarder 2345. The reflection 2350 off of the fourth retarder 2345 switches the handedness of the polarization. For example, the incident ray 2310 depicted as left-handed circularly polarized is converted upon reflection into a ray 2350 that is shown as having right-handed circularly polarization. The reflected ray 2350 passes through the third retarder 2340 and is transformed into vertically polarized light. This vertically polarized light is selectively attenuated or filtered out by the second polarizer 2335.

As described above, a pixel of the SLM 2375 may, for example, be in an "on" state (although an undriven state in some implementations) where light incident on this pixel of the SLM 2375 is reflected therefrom and coupled into the at least one waveguide 2348 and directed to the eye of the user. However, a pixel of the SLM 2375 can be in an "off" state (which may be a driven state in some implementations), in which light incident on the pixel of the SLM 2375 is not coupled into the at least one waveguide 2348 and is not coupled into the user's eye. In this "off" state, for example, various implementations of the SLM 2375 may introduce no retardance upon reflection therefrom. Accordingly, in the example shown in FIG. 23B, circularly polarized light incident on the SLM 2375 may remain circularly polarized on reflection from the SLM 2375. This handedness of the circularly polarized light may, however, change upon reflection from the SLM 2375. For example, the ray 2310 shown in FIG. 23B that is left-handed circularly polarized that is incident on the SLM 2375, may be transformed into right-hand circularly polarized light upon reflection from the SLM 2375. This reflected light, however, may be selectively attenuated by the third polarizer 2355. For example, the right circularly polarized light reflected from the SLM 2375 may pass through the cover glass 2370, the compensator 2365, and the fifth retarder 2360. The fifth retarder 2360 may convert the right-handed circularly polarized light into vertically polarized light, which is selectively attenuated by the third polarizer 2355, which may include a horizontal polarizer. Accordingly, in various implementations, the fifth retarder 2360 may convert light reflected from a pixel of the SLM 2375 when the pixel of the SLM is in the "off" state, into a linear polarization that is orthogonal to the linear polarization selectively transmitted by the third polarizer 2355. This third polarizer 2355 may thus selectively attenuate this linearly polarized light thereby reducing or blocking the light from that pixel of the SLM 2375 from reaching the at least one waveguide 2348 and being directed into the eye.

Figure 23C:
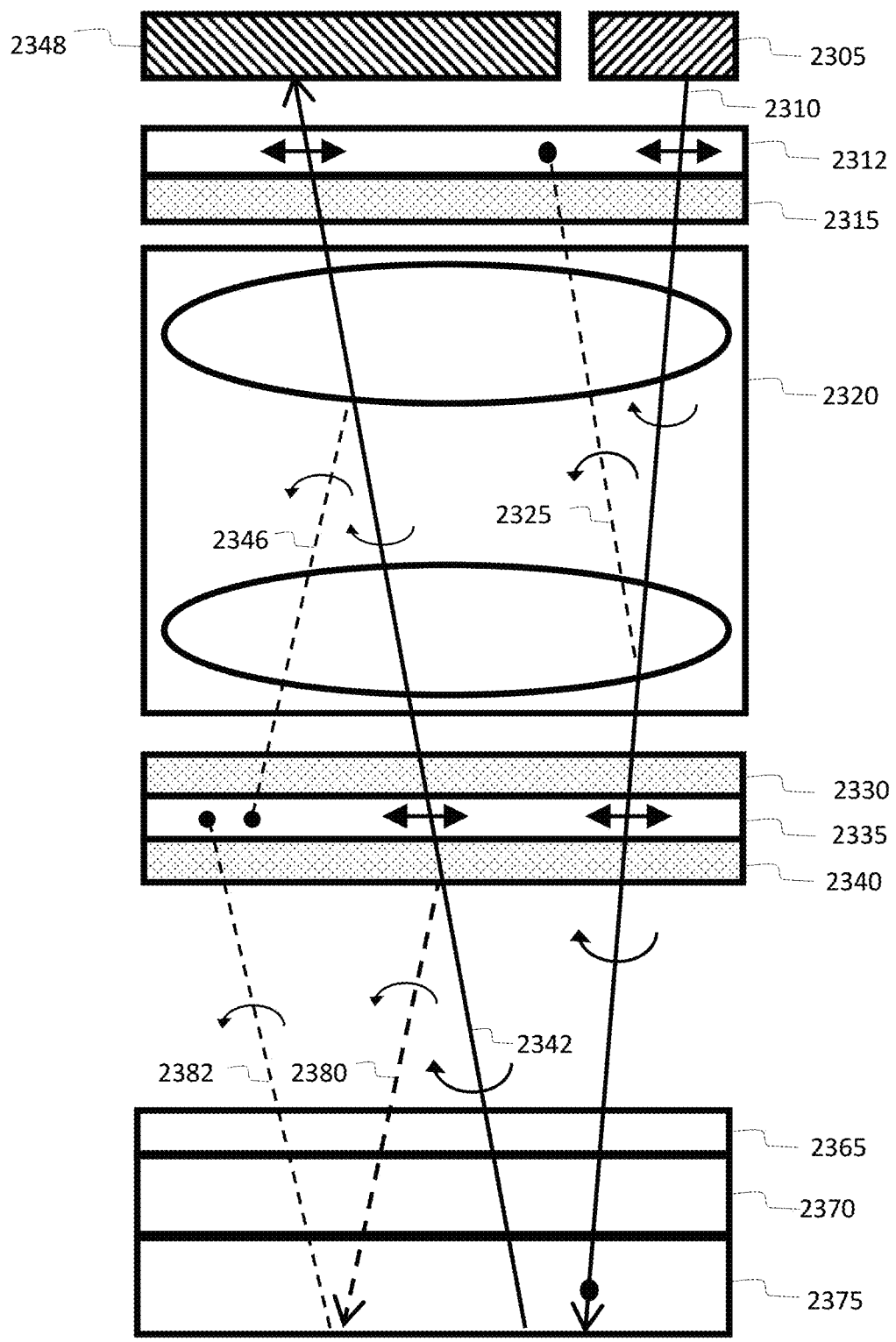
FIG. 23C is a side view of an augmented reality display system such as shown in FIGS. 23A and 23B with reduced retarders and polarizers configured to reduce reflection that may produce ghost images.

Variations in the configurations, such as variations in the polarization optical elements, are possible. For example, more or less circular polarizers may be included. In various implementations, for example, the third circular polarizer including the fourth retarder 2345 and third polarizer 2355 is excluded such as shown in FIG. 23C. In this particular implementation, the fourth retarder 2345, third polarizer 2355, and the fifth retarder 2360 are not included in the system. FIG. 23C illustrates a design of the augmented reality system 2300 that includes components illustrated in FIGS. 23A and 23B, with the exception of the fourth retarder 2345, third polarizer 2355, and the fifth retarder 2360. Nevertheless, despite excluding the third circular polarizer, the augmented reality display system is still configured to reduce ghost images. The second circular polarizer, for example, reduces reflection that would otherwise contribute to ghost images. To illustrate, FIG. 23C, depicts light, illustrated as ray 2380, reflected from the third retarder 2340. The act of being reflected from the surface of the third retarder 2340 causes the reflected ray 2380, which is circularly polarized to switch handedness. In this example, the polarization is switched from left-handed circular polarization to right-handed circular polarization. The switched circular polarized light 2380 then passes through the compensator 2365 and is incident on the cover glass 2370 and the SLM 2375. As discussed above, the SLM 2375 may reflect circularly polarized light of the same handedness. Accordingly, the incident right-hand circularly polarized light may remain right-handed circularly polarized on reflection. This circularly polarized light reflected from the SLM 2375, represented by ray 2382, may then pass through the cover glass 2370 and compensator 2365 and be incident on the third retarder 2340. The switched circular polarized light 2382 is attenuated by the second circular polarizer and in particular by the third retarder 2340 and polarizer 2335. As illustrated in FIG. 23C, for example, the circularly polarized light 2382 reflected from the SLM 2375 is incident on the third retarder 2340 and transformed by the third retarder 2340 into linearly polarized light having a different, e.g., orthogonal, linear polarization than that which is selectively transmitted by the second linear polarizer 2335. In this case, for example, the right-handed circularly polarized light 2382 is converted by the third retarder 2340 into vertical linear polarization, which is orthogonal to the polarization selectively transmitted by the second polarizer 2335. The second polarizer 2335 attenuates or prevents transmission of this linearly polarized light.

Figure 24:
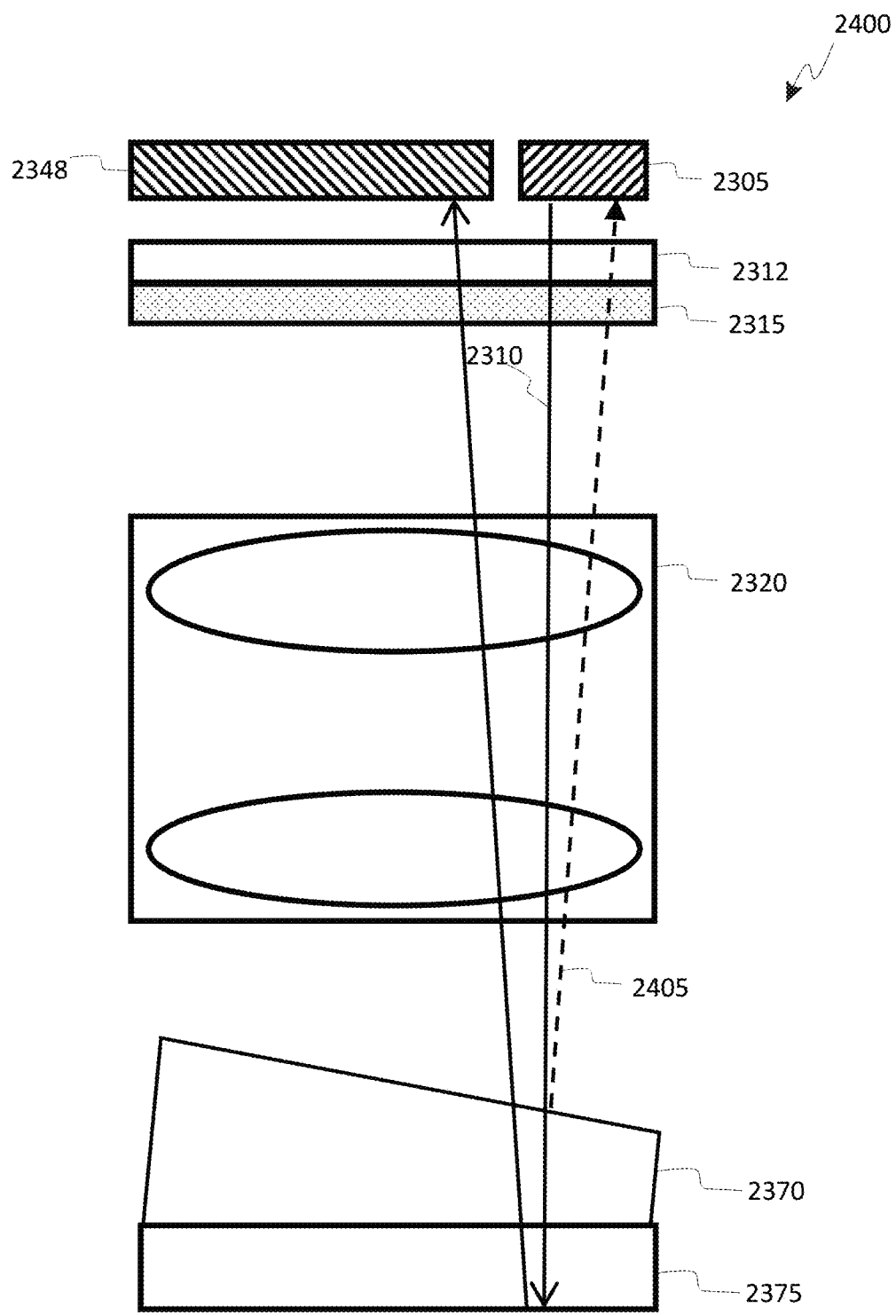
FIG. 24 is a side view of an augmented reality display system that utilizes a tilted surface such as a tilted surface on a cover glass to direct reflections away from being directed into an eye of a user potentially reducing ghost reflections.

Reflections that may contribute to ghost reflections may also potentially be reduced by tilting the optical surfaces in the system. FIG. 24 illustrates an example configuration having a tilted optical surface for reducing reflections that may produce ghost reflections. FIG. 24 shows an augmented reality display system 2400 including a light source 2305 that emits light represented by a ray 2310 that passes through any number of polarizers, retarders, lenses and/or other optical components as the light travels toward a spatial light modulator (SLM) 2375. A first polarizer 2312 and a first retarder 2315 possibly forming a first circular polarizer as well as lenses 2320 are shown in FIG. 24 for illustrative purposes. However, additional components may be included or components may be excluded or arranged or configured differently. In the example illustrated, the SLM 2375 includes therewith a cover glass 2370. The cover glass 2370 can be a contributor to reflections that produce ghost images. As such, in some implementations, the cover glass 2370 can be shaped so as to direct reflections that may yield ghost images away from being directed into a user's eye. As illustrated, the cover glass 2370 has a surface that can be tilted such that the surface is not parallel with other components or optical surfaces of the system (e.g., the SLM 2375, first retarder 2315, first polarizer 2312, at least one waveguide 2348, etc., or optical surfaces thereof). A major surface of the cover glass 2370 may, for example, have a normal that is tilted so as not to be aligned or parallel to the optical axis of the augmented reality display system 2400 or optical components therein such as optics 2320. By being tilted, reflections from the optical surface of the cover glass 2370 can be directed away from the at least one waveguide 2348 or in-coupling optical elements (e.g., in-coupling gratings or diffractive optical elements) for in-coupling light into the at least one waveguide 2348 and reduce the likelihood that reflections from the cover glass 2370 enter the at least one waveguide 2348. As depicted, reflected light 2405 is directed back toward the light source 2305 and away from the at least one waveguide 2348 where such light could ultimately reach the eye of a user. In some implementations, the reflected light 2405 can be directed back to the light source and a least a portion recycled at the light source 2305.

Although FIG. 24 depicts the cover glass 2370 having a surface that is tilted, optical surfaces that are tilted to divert reflections away from being coupled into the at least one waveguide 2348 can be included on any component in the system where undesired reflection is possible. Accordingly, optical surfaces on other components, such as polarizers, retarders, etc., may be tilted to reduce reflection being coupled into the at least one waveguide 2348 and to the eye of the user. Variations in the shape and size of the cover glass 2370 or other optical components are possible. The cover glass 2370 or other optical component may, for example, be thinner. Similarly, the cover glass 2370 or other optical component may have a different aspect ratios (length to thickness) than shown in FIG. 24. In some implementations, the cover glass 2370 or other optical component is wedge shaped. Other shapes, however, are possible.

Figure 25:
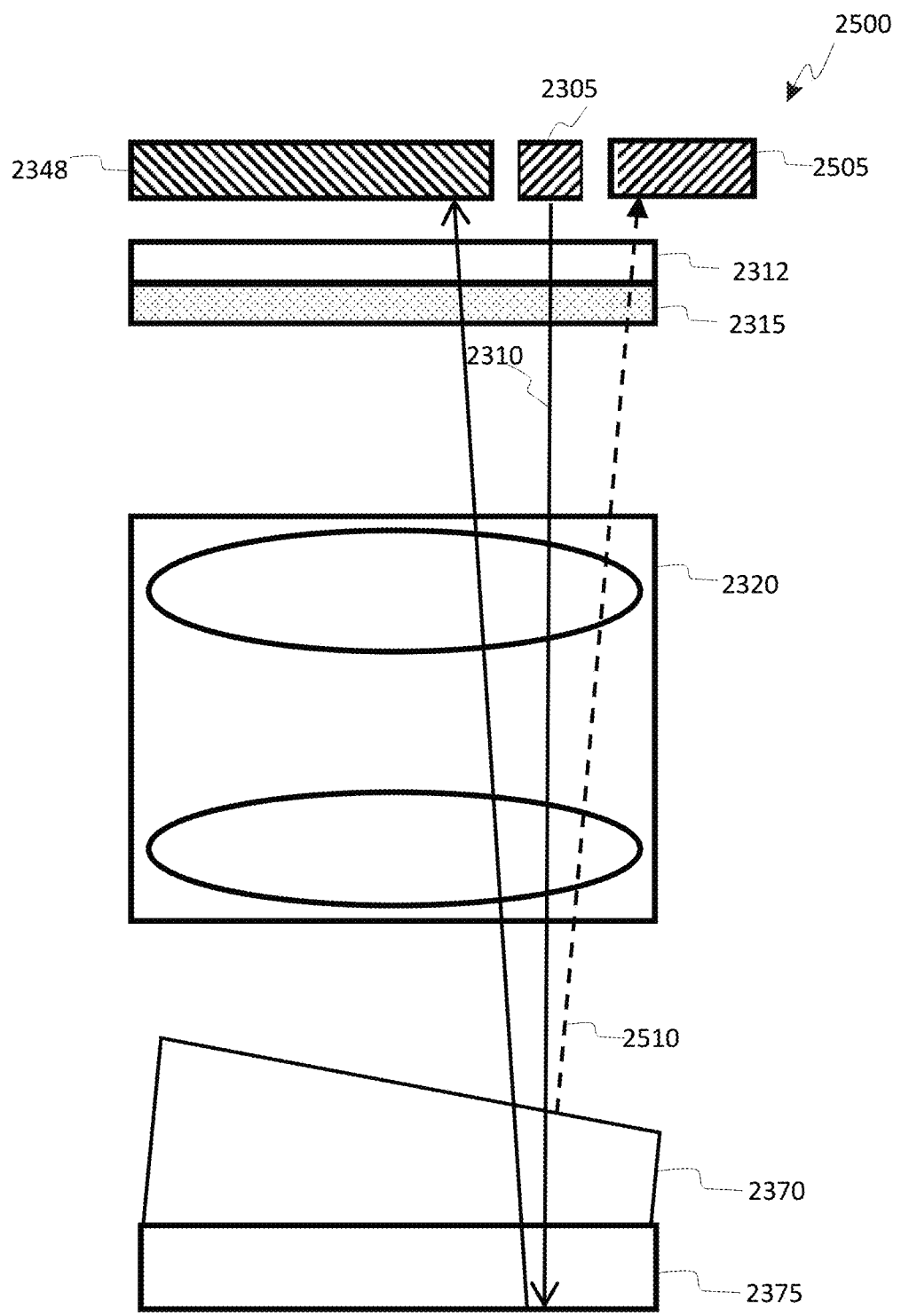
FIG. 25 is an embodiment of the system of FIG. 24 wherein the tilted surface on the cover glass is configured to direct reflections toward a light dump that absorbs the light.

Still other arrangements are possible. FIG. 25, for example, illustrates an implementation of an augmented reality display system 2500 similar to the system 2400 shown in FIG. 24 but further including a light dump 2505 for absorbing light directed thereto. The system 2500 includes the tilted cover glass 2370 to direct reflections 2510 from the cover glass 2370 to the light dump 2505 instead of being directed back to the light source 2305. The light dump 2505 may include an absorbing material or structure that is configured to absorb light. The location of the light dump 2505 can change depending on the implementation, for example, depending on the angle of the tilted cover glass 2370. As discussed above, this approach can be applied to other optical surfaces in the system. In addition, the shapes and sizes of the optical elements may be different.

A wide range of variations in the augmented reality display are possible. Variations in the polarization optical elements are possible. For example, although horizontal polarizers are used, in some implementations, vertical polarizers or a combination of horizontal and vertical polarizers are employed. Additionally, polarizers characterized by polarization other than vertical or horizontal may be used. Likewise, the light shown in the figures need not be horizontally polarized but may be vertically polarized. Similarly, light shown as vertically polarized may be horizontally polarized or vice versa in different implementations. Linearly polarized light having polarizations other than vertical or horizontal may also be used.

Additionally, the retarders may be configured differently. For example, the polarized light in the figures need not be left-hand circularly polarized but may be right-hand circularly polarized light and/or the right-hand polarized light may be left-hand circularly polarized. Still other variations are possible. Different retarder configurations can be employed to produce different combinations of left-handed and/or right-handed polarized light than shown. Also, in some implementations, elliptical polarized light may possibly be used instead of circularly polarized light. Retarders may be employed, for example, to convert elliptically polarized light into linear polarized light and vice versa. Linear polarizers can be used to filter light and may be used to reduce ghost reflections such as described herein.

In some implementations, other types of polarization elements and configurations thereof are employed. For example, the retarders are not limited to quarter wave retarders or quarter wave plates. For example, in some implementations, various optical elements have birefringence. In certain such cases, any one or more of the retarders 2315, 2330, 2340 may include an amount of retardance sufficient to convert linearly polarized light into circularly polarized light and need not be a quarter wave retarder. More or less than a quarter wave of retardance may be included in any one or more of the retarders 2315, 2330, 2340 as retardance may be contributed by other optical elements. Similarly, retardance can be distributed in a number of optical elements. As another example, multiple retarders may be employed to provide the appropriate amount of retardance. Also, as described above, in some implementations, elliptical polarized light may possibly be used instead of circularly polarized light. Retarders may be employed, for example, to convert elliptically polarized light into linear polarized light and vice versa. Linear polarizers can be used to filter light and may be used to reduce ghost reflections such as described herein.

Additionally, the optical components may be in the form of optical layers, sheets and/or films as well as stacks or one or more layers, sheets and/or films. Accordingly, different polarization elements, in different amounts, locations, and arrangements may be used. For example, one or more of the retarders and/or polarizers may comprise films.

In some implementations, the spatial light modulator may operate differently. For example the spatial light modulator may operate on light other than circularly polarized light and/or may output light other than circularly polarized light.

In the foregoing specification, the disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways.

All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display system configured to project light to an eye of a user, the display system comprising:
    at least one light source;
    a spatial light modulator having one or more pixels and configured to form an image; and
    at least one waveguide having a first major surface and a second major surface disposed in an X-Z plane and opposite the first major surface, and first and second edges between the first and second major surfaces, the spatial light modulator being closer to the first major surface of the at least one waveguide and the at least one light source closer to the second major surface of the at least one waveguide, wherein a diffractive optical element is disposed on the second major surface,
    wherein the display system is configured such that light from the light source is received into the at least one waveguide through the second major surface at a first location in the X-Z plane and is transmitted through the first major surface towards the spatial light modulator such that the light from the light source does not pass through the diffractive optical element, and at least a portion of the light illuminating the spatial light modulator is redirected back and diffractively coupled into the at least one waveguide by the diffractive optical element at a second location that is offset in the X-Z plane from the first location to be guided therein, and
    wherein the at least one waveguide is configured to be positioned on a head of the user in front of the user's eye such that at least a portion of the light from the spatial light modulator diffractively coupled into the at least one waveguide and guided therein is output from the at least one waveguide to the eye of the user to display image content to the user.

2. The display system of claim 1, wherein the at least one light source comprises a plurality of laterally displaced light emitters configured to output light.

3. The display system of claim 1, further comprising a reflective coupling optic configured to collect light output from the light source.

4. The display system of claim 3, wherein the coupling optic comprises a compound parabolic collector (CPC).

5. The display system of claim 1, wherein the at least one waveguide comprises a stack of waveguides.

6. The display system of claim 5, wherein different waveguides of the stack of waveguides are configured to output light with different respective colors.

7. The display system of claim 5, wherein the stack of waveguides comprises first, second, and third waveguides configured to output a first color light, a second color light, and a third color light, respectively, the first, second, and third color light being red, blue, and green color light, respectively.

8. The display system of claim 5, wherein the at least one light source comprises (i) a first light source disposed to direct light to a first in-coupling optical area of a first waveguide to couple light into the first waveguide to be guided therein, and (ii) a second light source disposed to direct light to the second in-coupling optical area of a second waveguide to couple light into a second waveguide to be guided therein.

9. The display system of claim 8, wherein the first and second in-coupling optical areas are laterally displaced with respect to each other for receiving light into the first and second waveguides, respectively.

10. The display system of claim 8, wherein the first and second in-coupling optical elements are configured to in-couple light of a predetermined polarization.

11. The display system of claim 1, wherein the at least one light source comprises a polarized light source.

12. The display system of claim 1, further comprising a polarizer disposed between the at least one light source and the spatial light modulator.

13. The display system of claim 12, wherein the polarizer is tilted with respect to the at least one waveguide.

14. The display system of claim 1, further comprising optics having optical power between the at least one waveguide and the spatial light modulator, the optics disposed so as to receive light output from the light source, the optics arranged with respect to the spatial light modulator such that the light received from the light source passes through the optics and illuminates the spatial light modulator.

15. The display system of claim 14, further comprising a static lens disposed in a path between the at least one waveguide and the user's eye.

16. The display system of claim 1, further comprising a prescription lens configured to provide refractive correction of the eye of the user.

17. The display system of claim 1, further comprising a circular polarizer.

18. The display system of claim 1, wherein the eye is closer to the first major surface than the second major surface.

19. The display system of claim 1, wherein the spatial light modulator comprises a liquid crystal (LC) display or a digital microdevice (DMD).

20. The display system of claim 1, wherein the light illuminating the spatial light modulator comprises illumination light.

* * * * *